(12) United States Patent
Boothroyd

(10) Patent No.: US 8,388,138 B1
(45) Date of Patent: Mar. 5, 2013

(54) PROJECTION DISPLAY SYSTEMS

(75) Inventor: Simon Andrew Boothroyd, Ottawa (CA)

(73) Assignee: Simon Boothroyd, Ottawa, ON (CA)

( * ) Notice: Subject to any disclaimer, the term of this patent is extended or adjusted under 35 U.S.C. 154(b) by 790 days.

(21) Appl. No.: 12/045,119

(22) Filed: Mar. 10, 2008

Related U.S. Application Data

(60) Provisional application No. 60/894,228, filed on Mar. 11, 2007.

(51) Int. Cl.
*G03B 21/00* (2006.01)
*G03B 21/14* (2006.01)
*G02B 27/22* (2006.01)
*G02B 27/26* (2006.01)
*G02F 1/1335* (2006.01)
*H04N 13/04* (2006.01)
*H04N 9/47* (2006.01)

(52) U.S. Cl. .............. 353/7; 353/8; 353/20; 359/464; 359/465; 348/51; 348/54; 348/57; 348/58; 348/60; 349/15

(58) Field of Classification Search ............ 353/7–8, 353/10, 20, 30–31, 34, 94; 359/462, 464–465, 359/483, 485, 494–497, 502, 483.01, 485.01; 348/42, 51, 54–55, 57–58, 60; 349/8–9, 349/13–15
See application file for complete search history.

(56) References Cited

U.S. PATENT DOCUMENTS

| | | | |
|---|---|---|---|
| 4,127,322 A | 11/1978 | Jacobson et al. | |
| 4,647,966 A | 3/1987 | Phillips et al. | |
| 5,172,254 A * | 12/1992 | Atarashi et al. | 349/9 |
| 5,517,340 A * | 5/1996 | Doany et al. | 349/5 |
| 5,537,476 A * | 7/1996 | Coteus et al. | 380/54 |
| 5,833,338 A * | 11/1998 | Barak | 353/20 |
| 5,982,541 A | 11/1999 | Li et al. | |
| 6,057,811 A * | 5/2000 | Edwards | 345/8 |
| 6,283,597 B1 * | 9/2001 | Jorke | 353/31 |
| 6,412,949 B1 * | 7/2002 | Halldorsson | 353/8 |
| 6,672,722 B2 * | 1/2004 | O'Connor et al. | 353/34 |
| 6,698,890 B1 | 3/2004 | Jorke | |
| 6,863,402 B2 * | 3/2005 | Roddy et al. | 353/31 |
| 7,204,592 B2 * | 4/2007 | O'Donnell et al. | 353/7 |
| 7,690,794 B2 * | 4/2010 | Boothroyd | 353/20 |
| 7,926,949 B1 * | 4/2011 | Boothroyd | 353/8 |
| 2003/0020809 A1 * | 1/2003 | Gibbon et al. | 348/51 |
| 2004/0114234 A1 * | 6/2004 | Sedlmayr | 359/485 |
| 2006/0197914 A1 * | 9/2006 | Robinson | 353/20 |
| 2007/0127121 A1 | 6/2007 | Maximus et al. | |
| 2007/0146880 A1 * | 6/2007 | Bleha et al. | 359/468 |

* cited by examiner

*Primary Examiner* — Tony Ko
*Assistant Examiner* — Jori S Reilly-Diakun
(74) *Attorney, Agent, or Firm* — Marks & Clerk; Richard J. Mitchell

(57) ABSTRACT

A projection apparatus has a first light beam having a first state of polarization and containing a first set of primary colors, a first light modulator arrangement for spatially modulating the polarization state of the first light beam to encode a first image thereon in the first set of primary colors, a second light beam having a second state of polarization and containing a second set of primary colors, and a second light modulator arrangement for spatially modulating the polarization state of the second light beam to encode a second image thereon. A polarizing beam splitter having first and second input ports to admit the first and second encoded light beams. Light of one polarization state incident on the first port is transmitted to the output port and light of another polarization state incident on the second port is reflected to said output port so that said transmitted and reflected light is combined into a common output beam at said output port. The first and second images having different polarizations contained in the output beam projected onto a display screen can be viewed with the aid of glasses with selective color filters responsive to the first and second sets of primary colors. By using different sets of primary colors considerable efficiencies and economies can be realized relative to a pure polarization-based system.

23 Claims, 31 Drawing Sheets

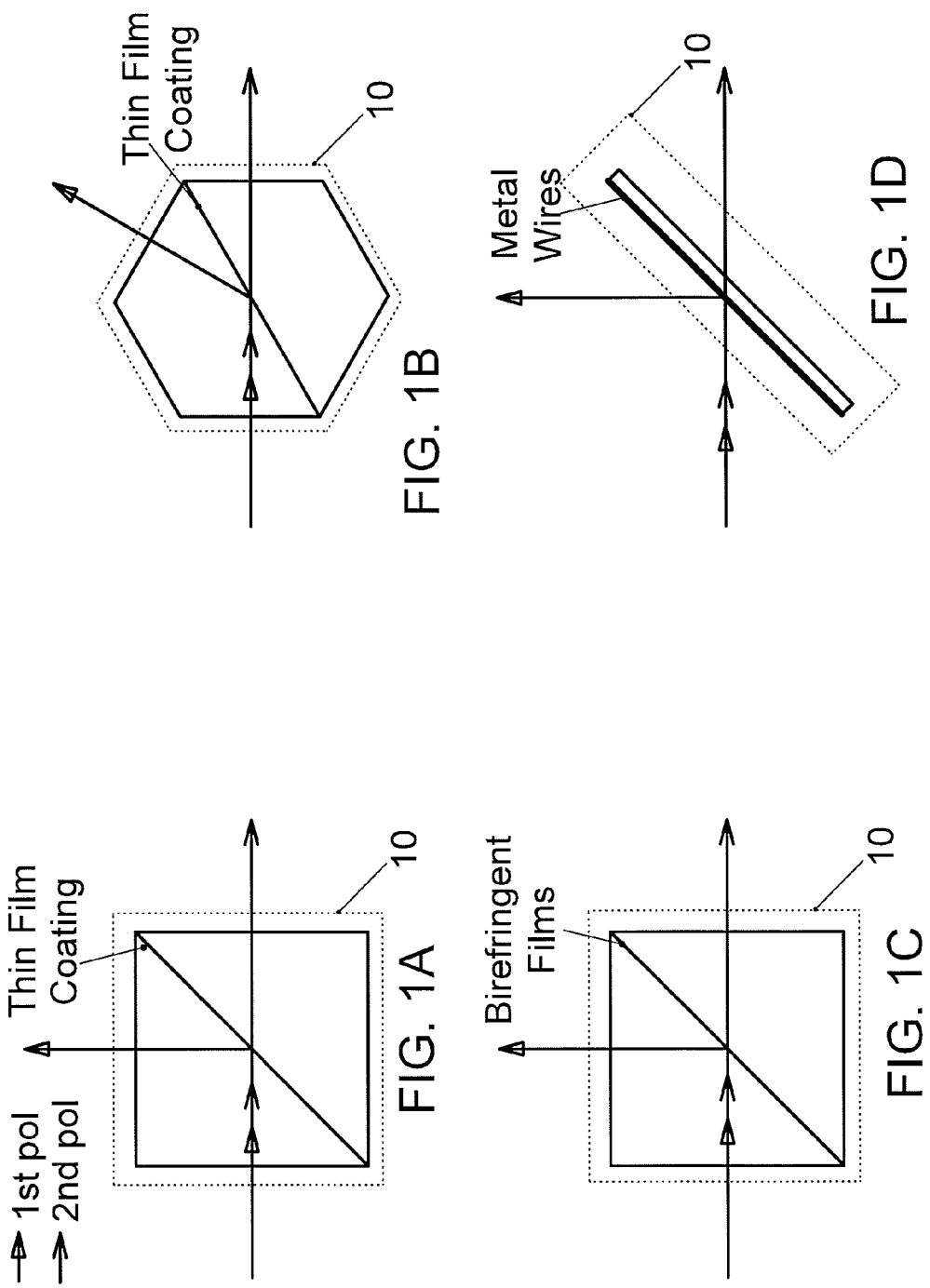

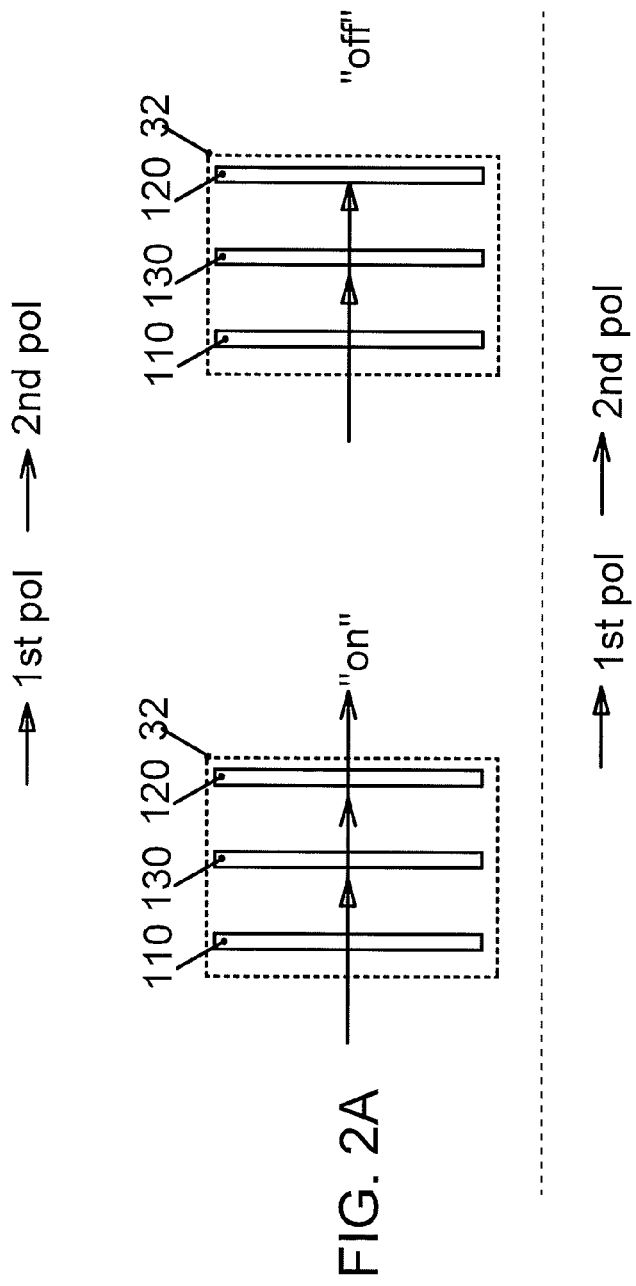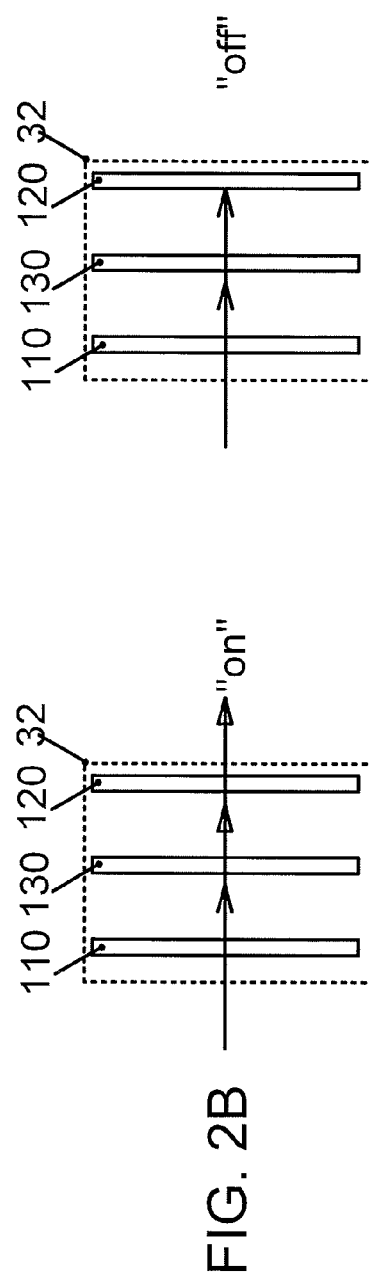
FIG. 2A
FIG. 2B

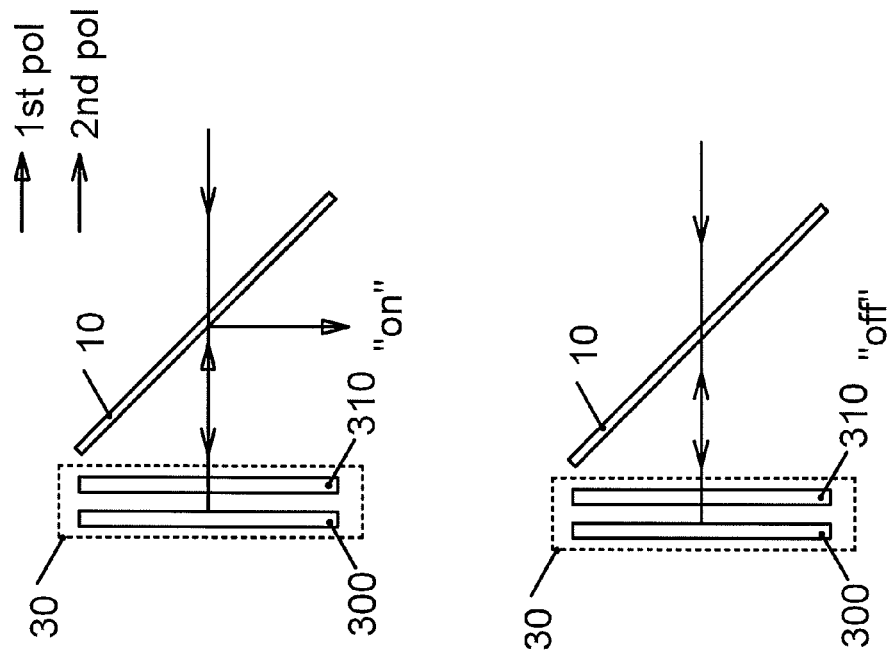
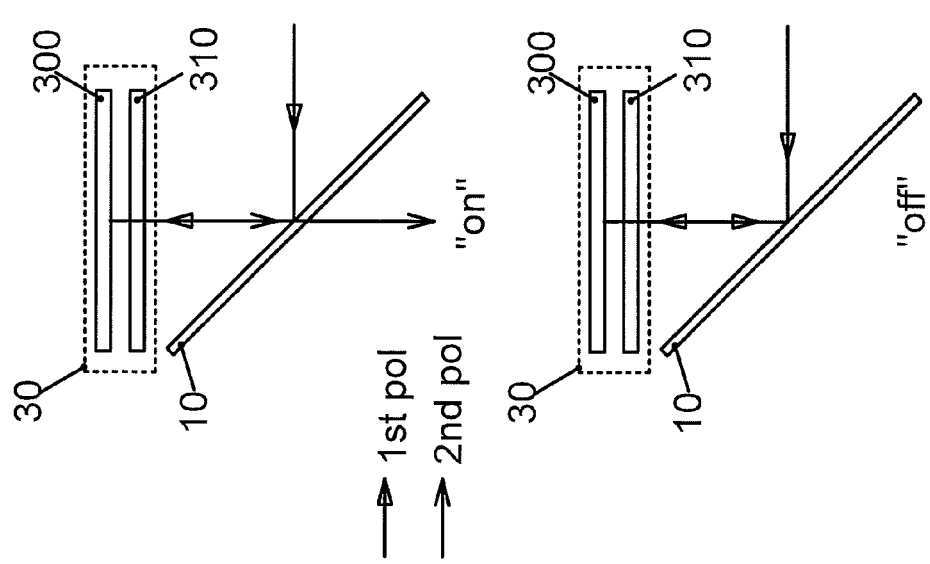
FIG. 3B
FIG. 3A

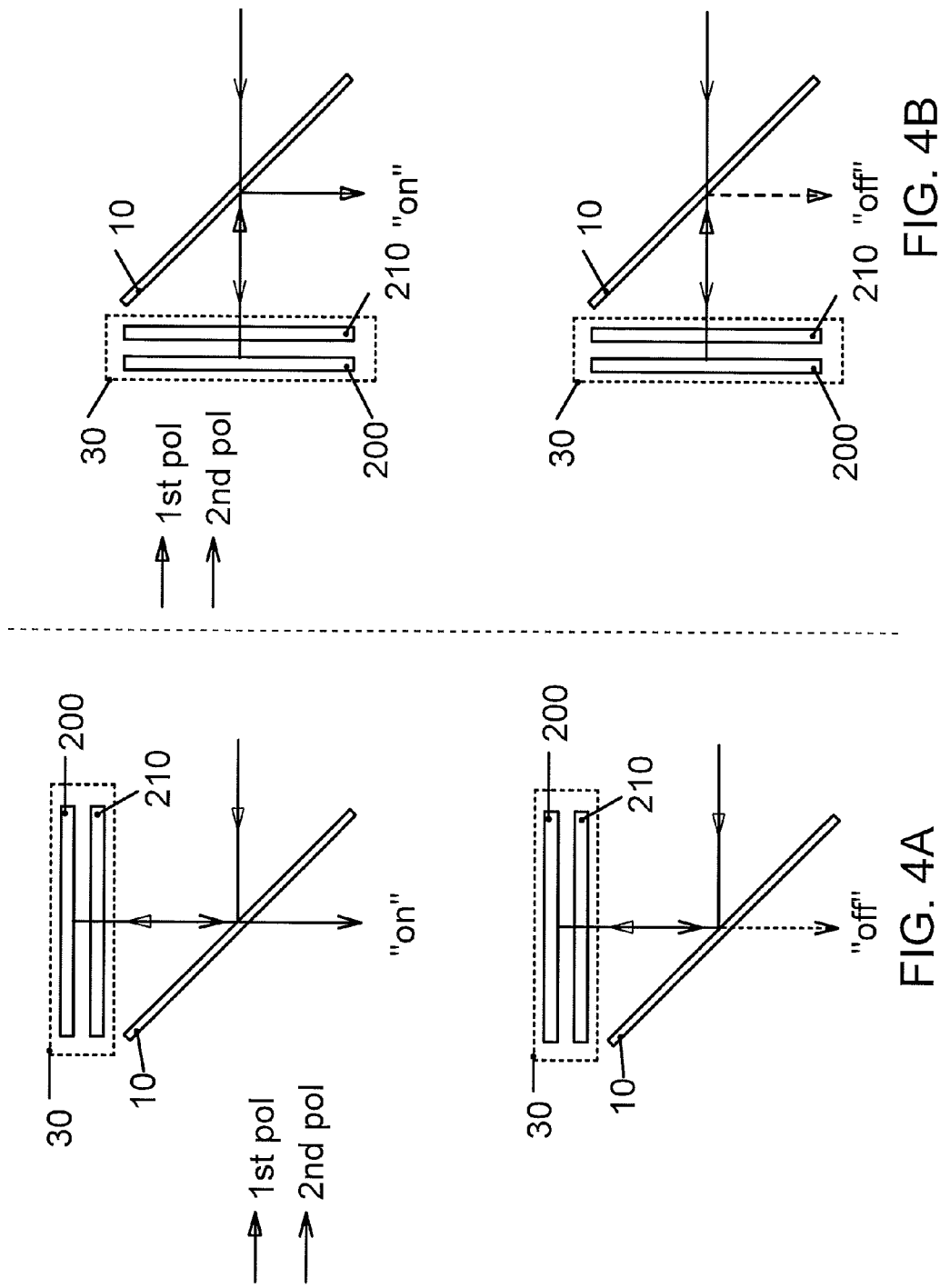

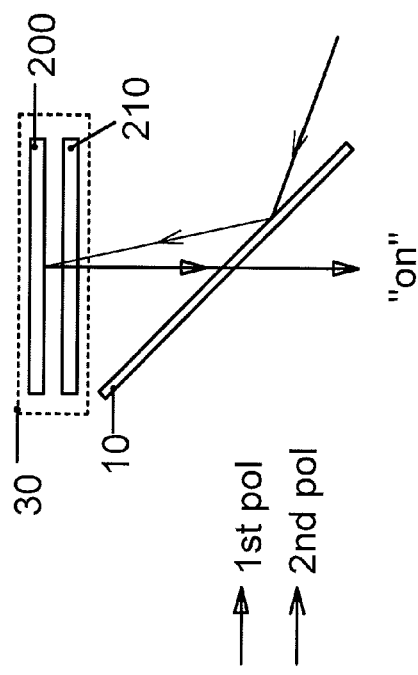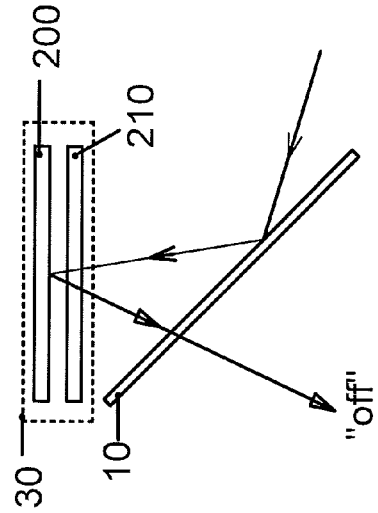
FIG. 4C
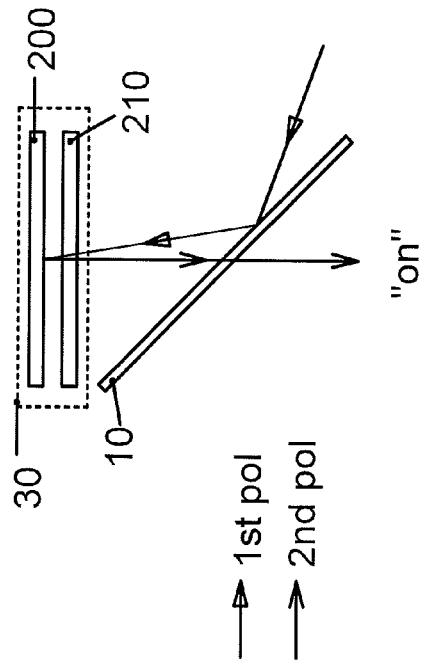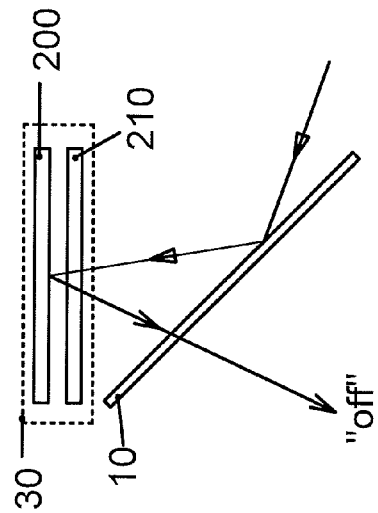
FIG. 4D

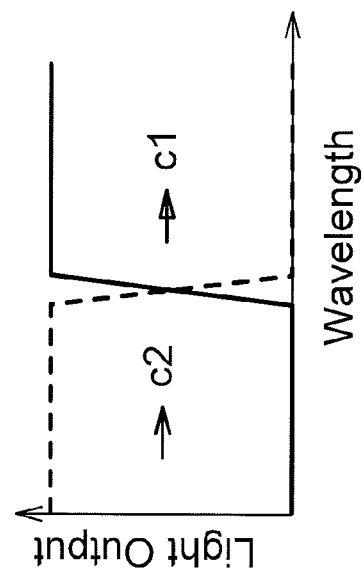
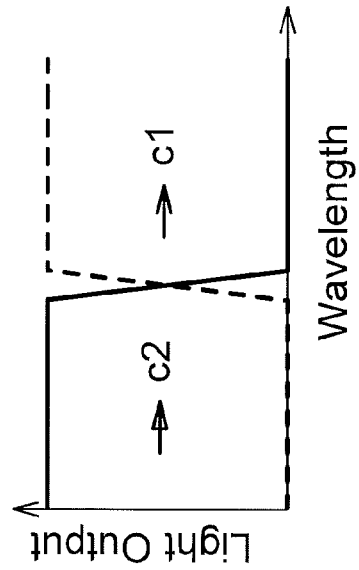
FIG. 5A
FIG. 5B
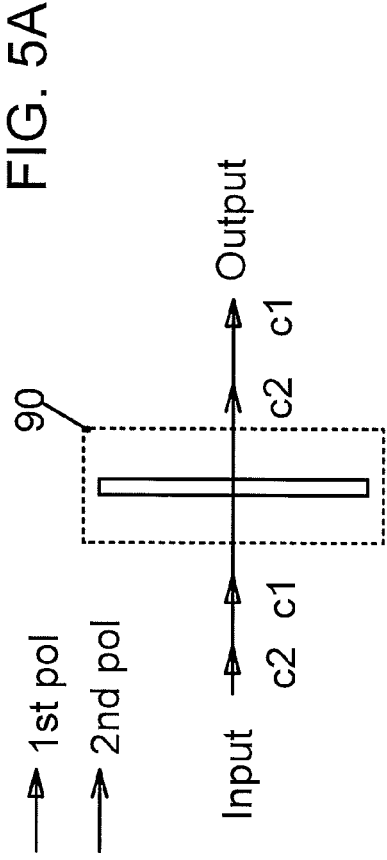
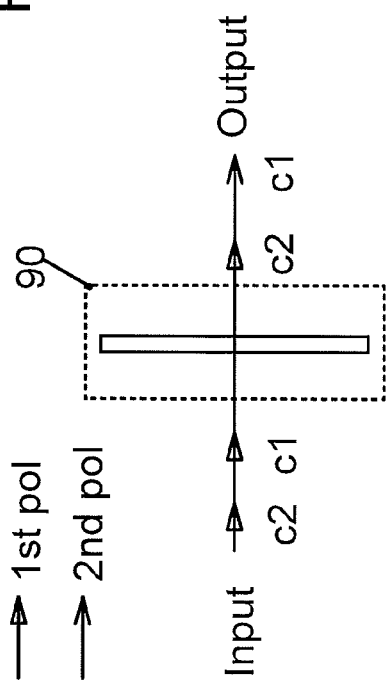

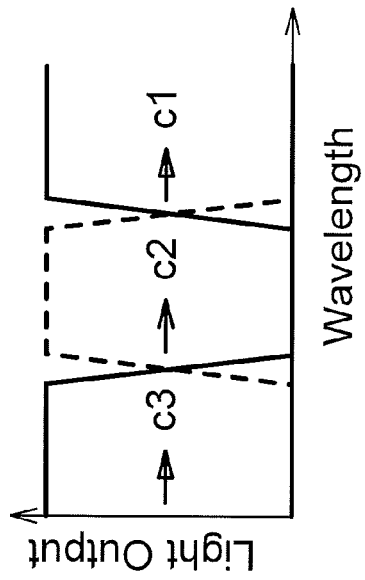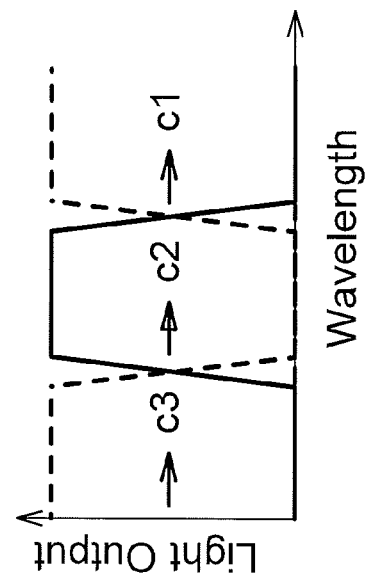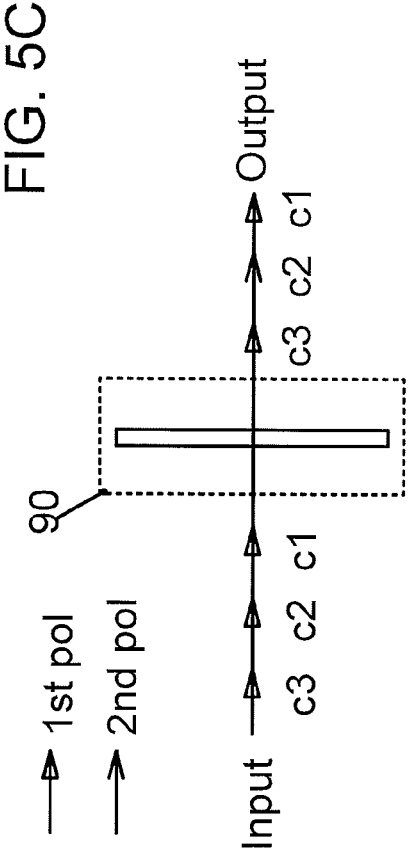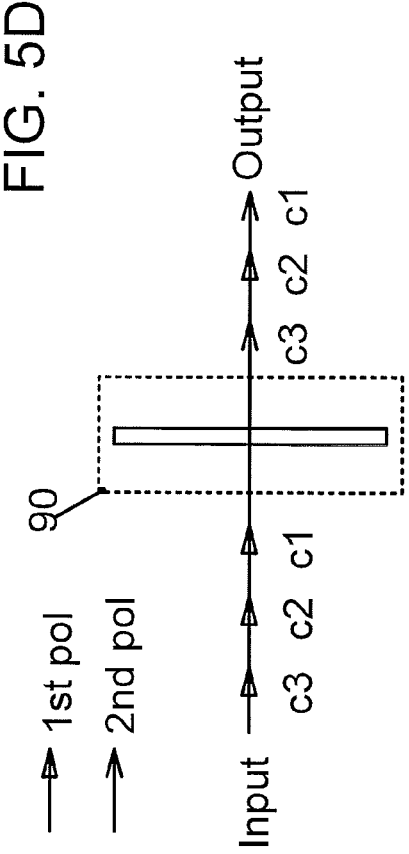
FIG. 5C
FIG. 5D

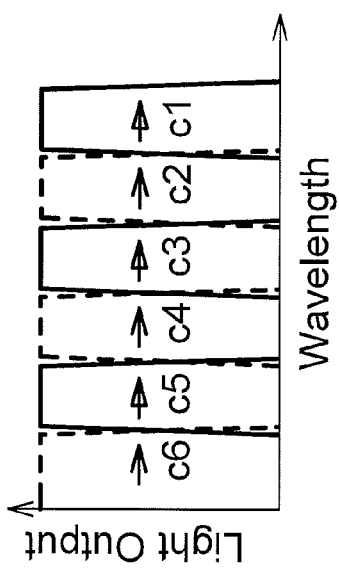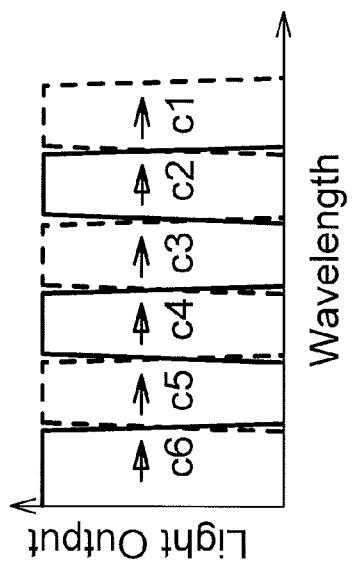
FIG. 5E
FIG. 5F
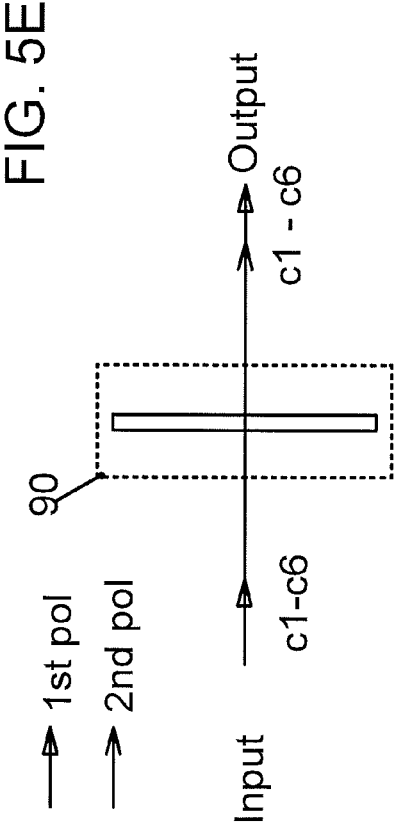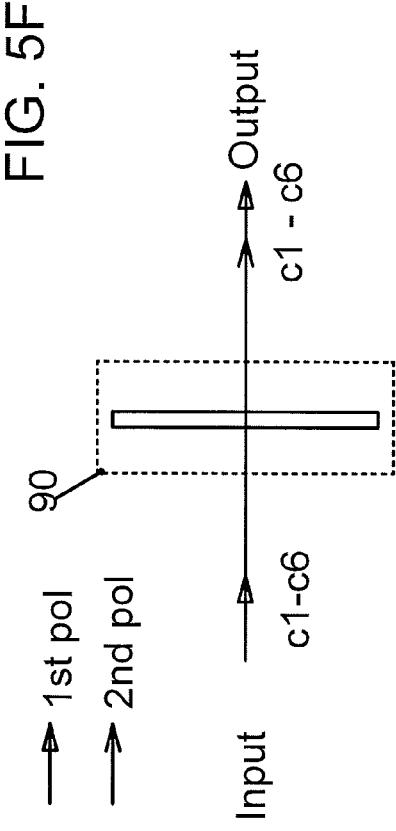

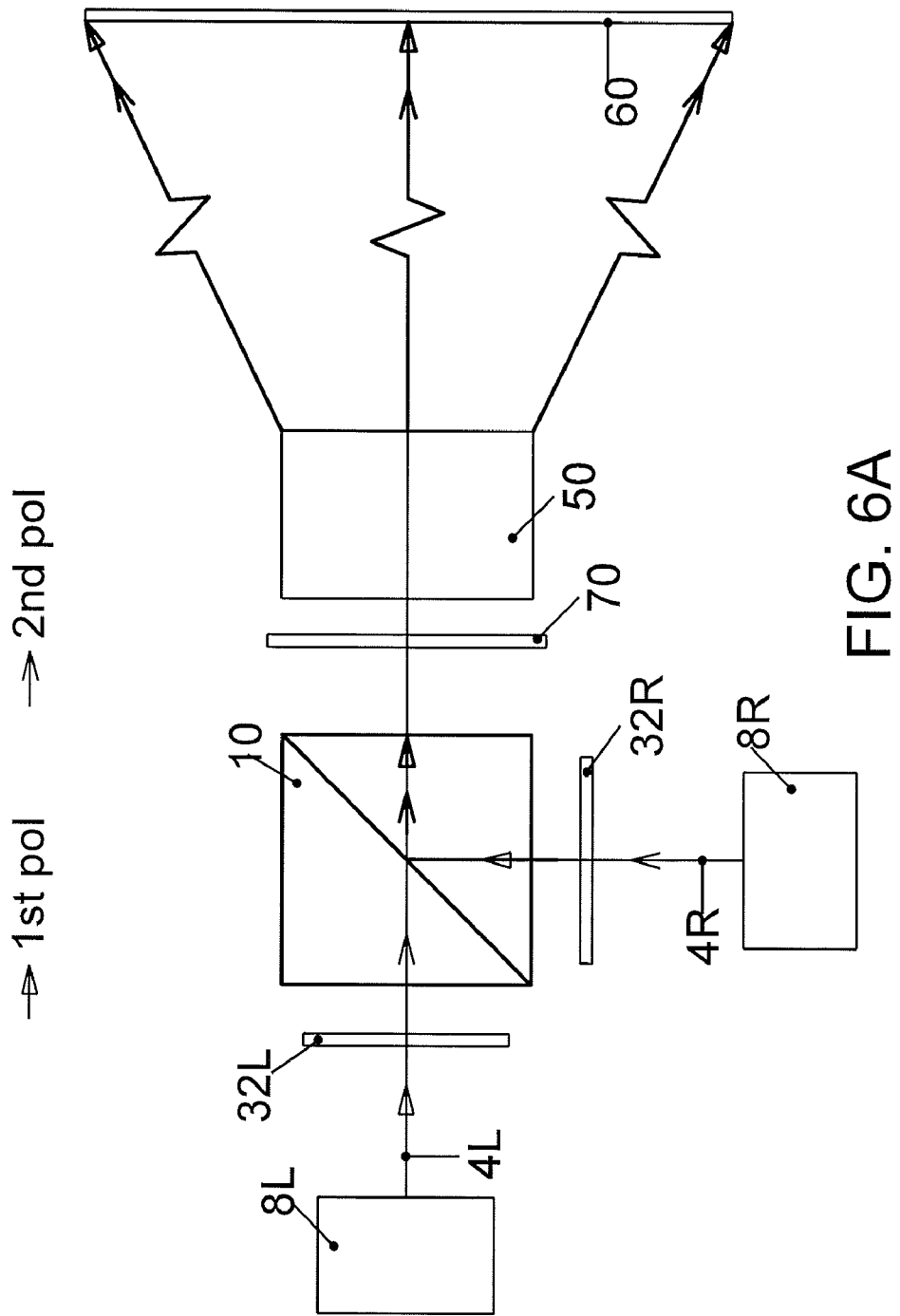

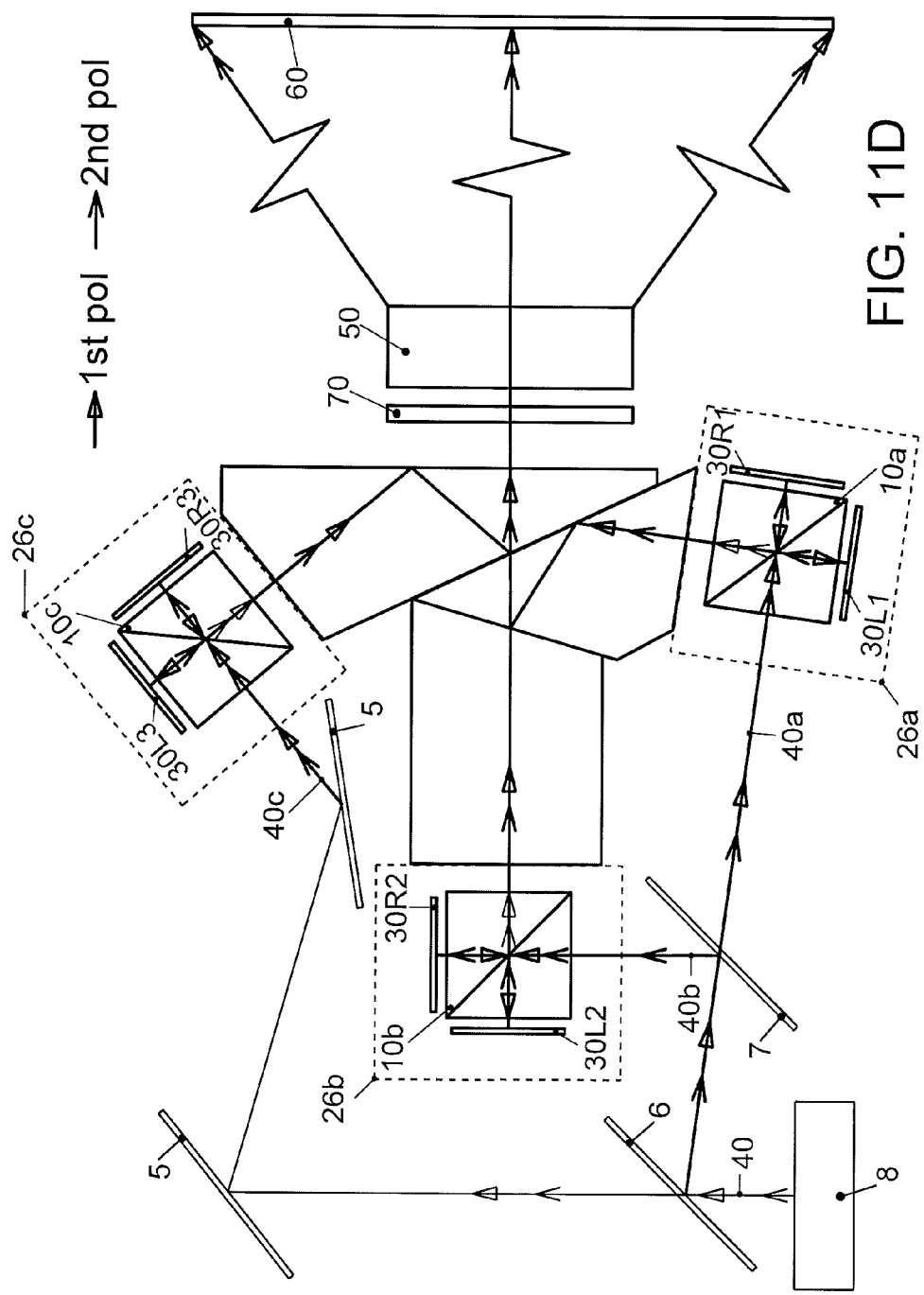

PROJECTION DISPLAY SYSTEMS

CROSS REFERENCE TO RELATED APPLICATION

This application claims the benefit under 35 USC 119(e) of prior U.S. application No. 60/894,228, filed Mar. 11, 2007, the contents of which are herein incorporated by reference.

FIELD OF THE INVENTION

This invention relates to projection display systems, and more particularly, to projection display systems having microdisplay panels, polarizing beam-splitter(s) and a single projection lens that are suitable for displaying high performance two-dimensional (2D) images or videos, and/or three-dimensional (3D) stereoscopic images or videos.

BACKGROUND OF THE INVENTION

Today, most projection displays are only capable of projecting 2-D images. Stereo 3D displays are useful for many applications. They provide additional depth information and allow viewers to extract information from complex data faster and more accurately. In addition, they create immersive environments that are very useful for visual simulations, 3D gaming and 3D movies.

In order to display stereo 3D images, a stereoscopic 3D projection display must be able to show at least two slightly different left-eye and right-eye images to be seen by the viewer's left and right eyes. There are several approaches to display three-dimensional stereoscopic images or videos by projection means. These include auto-stereoscopic displays which are limited to a single or a few viewers who do not need to wear 3D glasses; and projection displays where viewers wear active or passive 3D glasses. For multi-viewer and large screen applications, 3D stereoscopic projection displays that require viewers to wear 3D glasses are more suitable because they do not limit viewing positions or the number of viewers. Detailed description of each approach can be found in open literature.

There are two types of stereoscopic 3D projection displays using 3D glasses: passive and active. In passive stereoscopic 3D displays with glasses, the left- and right-eye images are displayed with light in two different polarizations or in two different sets of colors. They normally require two projectors: one to project the left-eye images in one polarization or set of colors, the other to project the right-eye images in the orthogonal polarization or a different set of colors. Polarizing glasses or color filter glasses are relatively inexpensive and suitable for large audiences such as in a meeting room or a 3D cinema. However, dual projectors are bulky, expensive, and difficult to align. In addition, they are not light efficient, only 12-30% of the light is used in 3D when compared to 100% for displaying 2D images. Single projector versions of passive stereoscopic display systems also exist, such as projection displays using Z-Screens. In this case, the left- and right-eye images are displayed time-sequentially, further reducing light efficiency because the left- and right-eye images are displayed at most only half of the time. Typical light efficiency is only about 12% and thus much higher power lamps must be used. In addition, 3D projectors using Z-screens must operate at faster frame rates. Only expensive 3-chip DLP projectors or cathode ray tubes (CRT) have such capability.

In 3D displays with active glasses, the left- and right-eye images are displayed time-sequentially and viewers wear LCD shutter glasses that are synchronized with the appearance of the correct eye image. Only about 16% of light from the projector is used for 3D. Active glasses require power and a wired/wireless link to the projector. In addition, they can generally only work with fast refresh rate CRTs or expensive 3-chip DLP projectors.

In stereoscopic 3D projection displays using passive filter glasses, the left- and right-eye images are projected in spectrally separated sets of primary colors, for example, R1, G1, B1, and R2, G2, B2, respectively. Each set of primary colors can form full color images although the color gamut seen by each eye can be slightly different. This difference can be corrected for by the projection system. Using two different sets of primary colors for stereoscopic 3D projection displays has been disclosed. U.S. Pat. No. 7,001,021 discloses an arrangement which combines the left and right-eye color images having different sets of primary colors with a dichroic filter or prism. For projection displays, the projection optical system usually requires reasonably large aperture in order to use as much illumination light as possible, for example, f/2.4 optics with divergent angle of ±12° in air. It is well known that dichroic filters are very sensitive to angles of incidence and polarization states of the incident light and their performance changes significantly with angles and polarization. Since colors R1 and R2 are usually very close to each other spectrally, so are colors G1, G2, and B1, B2. It is very difficult or impractical to combine the colors effectively with a dichroic filter or prism in order to project both sets of images simultaneously through a single lens projector. In order to make this type of projection system work, the divergence angle would have to be reduced significantly and this makes it very light inefficient and impractical for use in stereoscopic displays.

SUMMARY OF THE INVENTION

It is therefore an object of the invention to provide highly light efficient projection display systems that can project left-eye and right-eye images simultaneously on screen through a single projection lens;

It is another object of the invention to provide highly light efficient projection display systems that can be switched between 2D and 3D display modes electronically without comprising display performance.

According to a first aspect of the invention there is provided a projection apparatus comprising a source of a first light beam having a first state of polarization and containing a first set of primary colors; a first light modulator arrangement for spatially modulating the polarization state of the first light beam to encode a first image thereon in said first set of primary colors; a source of a second light beam having a second state of polarization and containing a second set of primary colors; a second light modulator arrangement for spatially modulating the polarization state of the second light beam to encode a second image thereon in said second set of primary colors; a polarizing beam splitter having first and second input ports for admitting said first and second encoded light beams, and an output port, and wherein light of one polarization state incident on the first port is transmitted to the output port and light of another polarization state incident on the second port is reflected to said output port so that said transmitted and reflected light is combined into a common output beam at said output port; and projection optics for projecting said first and second images having different polarizations contained in said output beam onto a display screen.

While it is known to use different polarization states to separate stereoscopic images, such systems require special non-depolarizing screens and expensive optics. By using different primary color sets to display stereoscopic images separated by using light of different polarization states, the equipment can use ordinary screens and achieve lower cross-talk between and left- and right-eye images compared with pure polarization based 3D stereoscopic displays that require the use of polarization preserving screens.

It is known that owing to the properties of the human eye, full color images can be formed by combining separate color images in each of a set of primary colors, typically red, green and blue. What is not so commonly known is that the red, green and blue components of the image can each cover a broad range of wavelengths, and it is thus possible to select specific wavelength ranges within this broad range, each of which will act as a primary color. For example, the red image could be formed either by a color R1 covering the wavelength range from 600 nm to 620 nm or a color R2 covering the wavelength range from 625 to 645 nm. Similar reasoning applies to the green G1, G2, and blue images B1, B2. It is thus possible to have two sets of primary colors, R1, G1, B1, and R2, G2, and B1, B2, each of which set is capable of forming a full color image.

Thus, although the color pairs R1, R2, and G1, G2, and B1, B2 can be similar in color appearance to the human eyes, they are different spectrally and cover different spectral ranges. The colors of pair R1 and R2 each appear to represent a red color. In some cases, the pairs can represent different colors also, for example, R1 could be orange and R2 red. The important point to realize is that two sets of primary colors, each of which have color components covering different wavelength ranges, are both capable of forming full color images. In the present invention the left-eye images may be formed by a first set of primary colors R1, G1 and B1 and the right-eye images may be formed by a second set R2, G2 and B2. Thus, by wearing color filter glasses that only allow the wavelength ranges of the components of the respective primary color image to enter the respective eye, a viewer will perceive a stereoscopic image without the need to wear polarizing glasses and have a non-depolarizing screen.

Unlike the prior art, the present invention uses both different polarizations as well as different primary color sets to display left- and right-eye images. The left-eye and right-eye images are combined by a polarizing beam-splitter rather than a dichroic filter to form single-lens 3D stereoscopic projection displays. Because the polarizing beam-splitter used in the present invention can work over a large angular field the present invention achieves much higher efficiency which is very important in particular for stereoscopic displays because the available illumination has to be shared by left- and right-eye images. In addition, the present invention can work in polarization and/or in color to delivery stereoscopic images and this makes it very versatile for 3D stereoscopic applications.

According to a second aspect of the invention there is provided a projection apparatus comprising a plurality of subsystems, each subsystem comprising a source of a first light beam having a first state of polarization; a first light modulator arrangement for spatially modulating the polarization state of the first light beam to encode a first image thereon; a source of a second light beam having a second state of polarization; a second light modulator arrangement for spatially modulating the polarization state of the second light beam to encode a second image thereon; and a polarizing beam splitter having first and second input ports for admitting said first and second encoded light beams, and an output port, and wherein light of one polarization state incident on the first input port is transmitted to the output port and light of another polarization state incident on the second port is reflected to said output port so that said transmitted and reflected light is combined into a common output beam at said output port; and wherein the source of light for each said subsystem is of a different color, and said projection apparatus further comprises a color combiner for combining the output beam of each said subsystem into a common output beam; and projection optics for projecting said common output beam onto a display screen.

In a still further aspect the invention provides a projection apparatus comprising a source of an unpolarized light beam containing a plurality of colors; a polarizing beam splitter for separating said unpolarized light beam into a pair of polarized light beams; a pair of subsystems, each subsystem admitting one of said polarized light beams and comprising: a plurality of light modulator arrangements for spatially modulating the polarization state of the said separate polarized light beams to encode respective color images thereon; a color combiner for splitting said polarized light into separate polarized color beams and for combining said encoded separate light beams into a composite beam; and wherein said polarizing beam splitter combines said composite beams of different polarization into an output beam; and projection optics for projecting said common output beam onto a display screen.

BRIEF DESCRIPTION OF THE DRAWINGS

The present invention and exemplary embodiments of the invention will be described in accordance to the following drawings in which:

FIG. 1A is a schematic view of a Type A thin film polarizing beam-splitter which reflects s-polarized light and transmits p-polarized light;

FIG. 1B is a schematic view of a Type B thin film polarizing beam-splitter with frustrated total internal reflection that reflects p-polarized light and transmits s-polarized light;

FIG. 1C is a schematic view of a Type C birefringent multilayer film polarizing beam-splitter that reflects s-polarized light and transmits p-polarized light, or vice versa;

FIG. 1D is a schematic view of a Type D metal-wire grid polarizing beam-splitter that reflects s-polarized light and transmits p-polarized light, or vice versa;

FIG. 2A is a schematic view showing a typical transmissive LCD micro-display panel used in the present invention;

FIG. 2B is a schematic view showing another typical transmissive LCD micro-display panel used in the present invention;

FIG. 3A is a schematic view showing a typical reflective LCOS micro-display panel used in the present invention;

FIG. 3B is a schematic view showing another typical reflective LCOS micro-display panel used in the present invention;

FIG. 4A is a schematic view showing a first typical reflective MEM micro-display panel used in the present invention (the incident light on, and reflected light from, the panel 30 are in the same plane, but they do not follow a co-linear path);

FIG. 4B is a schematic view showing a second typical reflective MEM micro-display panel used in the present invention (the incident light on, and reflected light from, the panel 30 are in the same plane, but they do not follow a co-linear path);

FIG. 4C is a schematic view showing a third typical reflective MEM micro-display panel used in the present invention;

FIG. 4D is a schematic view showing a fourth typical reflective MEM micro-display panel used in the present invention;

FIG. 5A is a schematic view showing a typical cut-off type wavelength selective polarization rotator used in the present invention;

FIG. 5B is a schematic view showing another typical cut-off type wavelength selective polarization rotator used in the present invention;

FIG. 5C is a schematic view showing a typical bandpass type wavelength selective polarization rotator used in the present invention;

FIG. 5D is a schematic view showing another typical bandpass type wavelength selective polarization rotator used in the present invention;

FIG. 5E is a schematic view showing a typical multiple bandpass type wavelength selective polarization rotator used in the present invention;

FIG. 5F is a schematic view showing another typical multiple bandpass type wavelength selective polarization rotator used in the present invention;

FIG. 6A is a schematic view of one of the first type embodiments of the projection display systems in accordance with the present invention having two illumination systems, two transmissive LCD panels, a polarizing beam-splitter with the central angle of incidence on the beam-splitter surface about 45° and a single projection lens;

FIG. 11D is a schematic view of one of the sixth type embodiments of the projection display systems in accordance with the present invention having an illumination system, six reflective LCOS or MEM panels, a Philips prism, three polarizing beam-splitters with the central angle of incidence on the beam-splitter surface about 45°, and a single projection lens;

DETAILED DESCRIPTION OF THE INVENTION

PBS Types

Figure 6B:
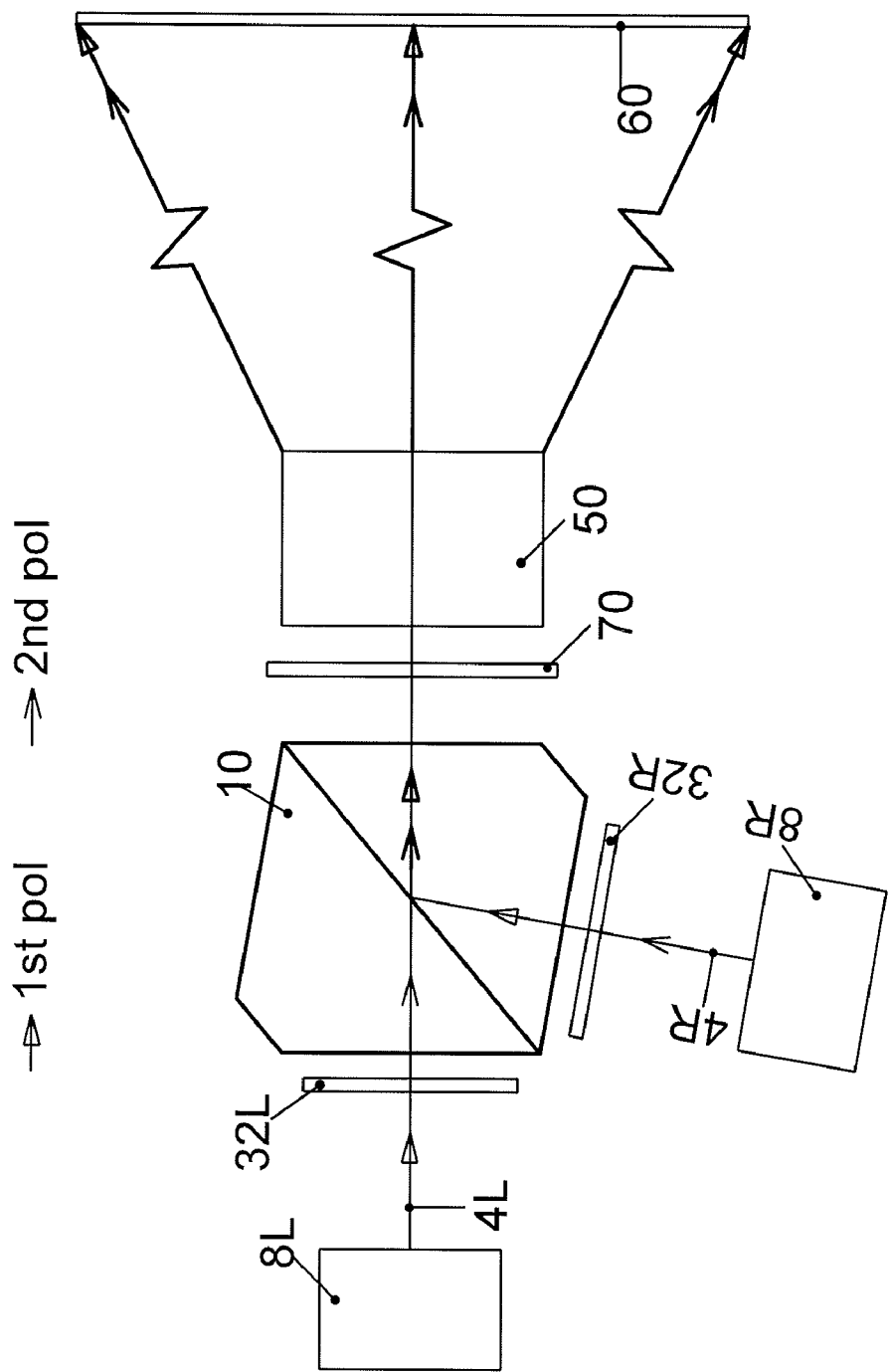
FIG. 6B is a schematic view of one of the first type embodiments of the projection display systems in accordance with the present invention having two illumination systems, two transmissive LCD panels, a polarizing beam-splitter with central angle of incidence larger than 45° and a single projection lens.

In the present invention of projection displays, polarizing beam-splitters are used to separate un-polarized light, and/or to combine polarized light. A polarizing beam-splitter (PBS) reflects light in a first polarization and transmits light in a second polarization. The first polarization and the second polarization are orthogonal to each other. Different types of PBSs can be used in the present invention. By way of examples, several PBS types are incorporated in the present invention and are described in the text below.

Type A PBS, shown in FIG. 1A, is based on thin film interference coatings where the thin film beam-splitting (BS) coating is between two transparent prisms. Type A is a Mac-Neille PBS that reflects s-polarized light and transmits p-polarized light and usually operates at 45° angle of incidence. Type B PBS, shown in FIG. 1B, is based on thin film interference as well as frustrated total internal reflection in thin film coatings, the thin film beam-splitting coating is also between two transparent prisms. Unlike Type A PBS, Type B PBS reflects p-polarized light and transmits s-polarized light, as disclosed in U.S. Pat. No. 5,912,762. Type C PBS, shown FIG. 1C, is based on birefringent multilayer thin plastic films, and the beam-splitting films are usually between two transparent prisms, such as the one disclosed in U.S. Pat. No. 6,690,795. Depending on the alignment of the birefringent films, Type C PBS can reflect s-polarized light and transmit p-polarized light, or vice versa. Type D PBS, shown in FIG. 1D, is based on metal-wire grids on a transparent plate, such as the one disclosed in U.S. Pat. No. 6,122,103, the beam-splitting metal-wire grids are on one side of the plate. Based on the alignment of the metal wires, Type D PBS can reflect s-polarized light and transmit p-polarized light, or vice versa. Type E PBS also reflects s-polarized light and transmits p-polarized light and operates at a central angle of incidence greater than 45° as described in the paper by Li Li and Dobrowolski, Applied Optics, Vol. 39, Issue 16, pp. 2754-2771. Type E is similar to type A that reflects s-polarized light and transmits p-polarized light except that the central angle of incidence is greater than 45°. Type E is also based on thin film interference coatings. Without departing from the spirit of the invention, other beam-splitting angles rather than the ones shown in FIGS. 1A-1D and other types of PBSs can be used in the present invention as well.

Micro-Display Devices

In the present invention of the projection display systems, several different micro-display panels can be used. Typical sizes of micro-display panels are from 0.55" to 2.0" in diagonal. The first type of micro-displays is based on transmissive liquid crystal displays (LCDs) that can form images by controlling the polarization states of each individual pixel. FIG. 2A shows a typical LCD panel 32 used in accordance with the present invention. The LCD panel 32 consists of a pixelated active liquid crystal structure 130 with addressing matrices and two polarizers 110 and 120. The polarizer 110 transmits light in a first polarization and blocks light in a second polarization, while the polarizer 120 transmits the second polarization and blocks the first polarization. The first and second polarizations are orthogonal to each other. For "on" pixels, the liquid crystal layer 130 rotates the polarization state of the incident light from the first polarization to the second polarization thus the light transmits through the panel. For "off" pixels, the liquid crystal structure does not rotate the polarization state of the incident light, thus the light is blocked by the second polarizer 120. FIG. 2B shows another typical LCD panel 32 used in accordance with the present invention. In this case, the polarizer 110 blocks light in the first polarization and transmits light in the second polarization, while the polarizer 120 blocks the second polarization and transmits the first polarization. For "on" pixels, the liquid crystal structure rotates the polarization state of the incident light from the second polarization to the first polarization thus the light transmits through the panel. For "off" pixels, the liquid crystal structure does not rotate the polarization state of the incident light, thus the light is blocked by the second polarizer 120. The micro-display 32 can be optimized to operate for a broadband of wavelengths such as from 400-700 nm in the visible, or it can be optimized to operate for a narrowband of wavelengths such as for red, blue or green colors only.

The second type of micro-displays is based on reflective liquid crystal displays that also can form images by controlling the polarization states of each individual pixel. These liquid crystal displays are also called liquid crystal on silicon (LCOS), or direct-drive image light amplifier (D_ILA). FIG. 3A shows a typical LCOS 30 panel used in accordance with the present invention with a polarizing beam-splitter 10 (although any type of PBS described above can be used, only a plate PBS is shown here for illustration purposes). The LCOS panel 30 consists of a pixelated reflective liquid crystal structure 300 and an optional waveplate 310. The PBS 10 reflects light in a first polarization and transmits light in a second polarization. The first and second polarizations are orthogonal to each other. The optional waveplate 310 is usually a quarter-wave plate or combinations of waveplates that can compensate for geometrical depolarization of the incident polarized light (resulting from reflection and transmission of skew rays at optical interfaces) and thus improve display contrast. In FIG. 3A, the incident light is polarized in the first polarization state and thus is reflected by the polarizing beam-splitter 10 towards the panel 30. For "on" pixels, the liquid crystal structure rotates the polarization state of the incident light from the first polarization to the second polarization thus the light transmits through the PBS 10 towards a projection lens which is not shown here. For "off" pixels, the liquid crystal structure does not rotate the polarization state of the incident light, thus the light is reflected back by the PBS 10. FIG. 3B shows another typical LCOS panel 30 used in accordance with the present invention with a polarizing beam-splitter 10. The LCOS panel 30 consists of a pixelated reflective liquid crystal structure 300 and an optional waveplate 310. The PBS 10 reflects the first polarization and transmits the second polarization. The optional waveplate 310 is usually a quarter-wave plate or combinations of waveplates that can compensate the geometrical depolarization of the incident polarized light and thus improve display contrast. The incident light is polarized in the second polarization state, thus is transmitted through the polarizing beam-splitter 10. For "on" pixels, the liquid crystal structure rotates the polarization state of the incident light from the second polarization to the first polarization thus the light is reflected by the PBS 10 towards a projection lens which is not shown here. For "off" pixels, the liquid crystal structure does not rotate the polarization state of the incident light, thus the light transmits through the PBS 10 back to the direction of the incident light. The micro-display 30 can be optimized to operate for a broadband of wavelengths such as from 400-700 nm in the visible, or it can be optimized to operate for a narrowband of wavelengths such as for red, blue or green colors only.

The third type of micro-displays is based on micro-electrical-mechanical (MEM) devices with plural digital micro-mirrors (digital micro-mirror devices—DMD) or pixels arranged in rows and columns used to form images. A typical MEM device for display applications is Texas Instruments' DLP™ or DMD panels. FIGS. 4A-4D shows a MEM panel 30 used in accordance with the present invention with a polarizing beam-splitter 10 (a plate PBS is shown here for illustration purposes). The MEM panel 30 consists of a pixelated reflective MEM device 200 and a waveplate 210. The PBS 10 reflects light in a first polarization and transmits light in a second polarization. The first and second polarizations are orthogonal to each other. The waveplate 210 is usually a quarter-wave plate or a combination of waveplates that rotate the polarization state of the incident light from the first polarization to the second polarization or vice versa. Preferably, it can also compensate the geometrical depolarization of the incident polarized light and thus improve display contrast or cross-talk. FIG. 4A shows a first typical MEM panel 30 used in accordance with the present invention. The incident light is polarized in the first polarization state. For "on" pixels, the light is reflected by the MEM device at a predefined angle and the polarization state of the incident light is rotated by the waveplate 210 from the first polarization to the second polarization, thus the light transmits through the PBS 10 towards a projection lens which is not shown here. For "off" pixels, the light is reflected by the MEM device at a predefined angle, but different than the angle of "on" pixels. Depending on the properties of the waveplate 210 and the PBS 10, the reflected "off" pixel light may be partially converted to the second polarization, and thus some of the light is reflected and some of the light is transmitted by the PBS 10. For the "off" pixel light transmitted by the PBS 10, it travels in a different direction than the "on" pixel light and thus does not reach the projection lens (not showing here) and is absorbed by a light absorber. For the "off" light reflected by the PBS 10, the light travels in a different direction than the incident light and is absorbed by a light absorber not showing here. FIG. 4B shows a second typical MEM panel 30 used in accordance with the present invention with a polarizing beam-splitter 10. The incident light is polarized in the second polarization state. For "on" pixels, the light is reflected by the MEM device at a predefined angle and the polarization state of the incident light is rotated by the waveplate 210 from the second polarization to the first polarization, thus the light is reflected by the PBS 10 towards a projection lens which is not shown here. For "off" pixels, the light is reflected by the MEM device at a predefined angle, but different than the angle of "on" pixels.

Depending on the properties of the waveplate 210 and the PBS 10, the reflected "off" pixel light may be partially converted to the first polarization, and thus some of the light is reflected and some of the light is transmitted by the PBS 10. For the "off" pixel light reflected by the PBS 10, it travels in a different direction than the "on" pixel light and thus does not reach the projection lens (not shown here) and is absorbed by a light absorber. For the "off" light transmitted by the PBS 10, the light travels in different direction than the incident light and is absorbed by a light absorber not shown here. Depending on the layout of the MEM device, different orientations of the MEM device surface with regard to the PBS surface can be used. The micro-display 30 can be optimized to operate for a broadband of wavelengths such as from 400-700 nm in the visible, or it can be optimized to operate for a narrowband of wavelengths such as for red, blue or green colors only.

FIGS. 4C-4D show a third and fourth typical MEM devices used in the present invention having different alignments between the polarizing beam-splitter and the MEM device. Detailed description of these alignments and other suitable alignments can be found in the U.S. patent application Ser. No. 11/770,247 which is incorporated in the present invention. FIGS. 4A and 4B use Type II alignment while FIGS. 4C and 4D use Type III or IV alignment as described in the U.S. patent application Ser. No. 11/770,247.

Without departing from the spirit of the invention, other arrangements of pixels or types of MEM devices can also be used in the present invention.

Wavelength Selective Polarization Rotators

In the present invention of the projection display systems, sometimes wavelength selective polarization rotators are used. These rotators are typically made of stretched multi-layer birefringent plastic films or crystal plates. They can selectively rotate the polarization state of incident light from a first polarization to a second polarization for some wavelengths but keep the polarization state unchanged for the other wavelengths. The first and the second polarizations are orthogonal to each other. FIG. 5A shows a typical cut-off type wavelength selective polarization rotator 90 used in the present invention. The incident light is in the first polarization and consists of colors c1 and c2 covering different wavelength regions. The rotator 90 rotates the polarization state of light in color c2 to the second polarization but keeps the polarization state of light in color c1 unchanged. FIG. 5B shows another typical cut-off type wavelength selective polarization rotator 90 used in the present invention. The rotator 90 rotates the polarization state of light in color c1 to the second polarization but keeps the polarization state of light in color c2 unchanged.

FIG. 5C shows a typical bandpass type wavelength selective polarization rotator 90 used in the present invention. The incident light is in the first polarization and consists of colors c1, c2 and c3 with different wavelengths. The rotator 90 rotates the polarization state of light in color c2 to the second polarization but keeps the polarization state of light in colors c1 and c2 unchanged. FIG. 5D shows another typical bandpass type wavelength selective polarization rotator 90 used in the present invention. The rotator 90 rotates the polarization state of light in colors c1 and c3 to the second polarization but keeps the polarization state of light in color c2 unchanged.

FIG. 5E shows a typical multi-bandpass type wavelength selective polarization rotator 90 used in the present invention. The incident light is in the first polarization and consists of colors c1, c2, c3, c4, c5 and c6 with different wavelengths. The rotator 90 rotates the polarization state of light in colors c2, c4 and c6 to the second polarization but keeps the polarization state of light in colors c1, c3 and c5 unchanged. FIG.

5F shows another typical multi-bandpass type wavelength selective polarization rotator 90 used in the present invention. The rotator 90 rotates the polarization state of light in colors c1, c3 and c5 to the second polarization but keeps the polarization state of light in colors c2, c4 and c6 unchanged.

The multi-bandpass wavelength selective polarization rotators can be made of combinations of the cut-off or bandpass types wavelength selective polarization rotators. Without departing from the spirit of the present invention, other wavelength selective polarization rotators and rotation combinations can be used as well. The wavelength selective polarization rotator 90 can include additional waveplates to correct depolarization effects due to geometry or non-normal incidence of the light at reflecting or transmitting surfaces.

First Type of Embodiments

Figure 6C:
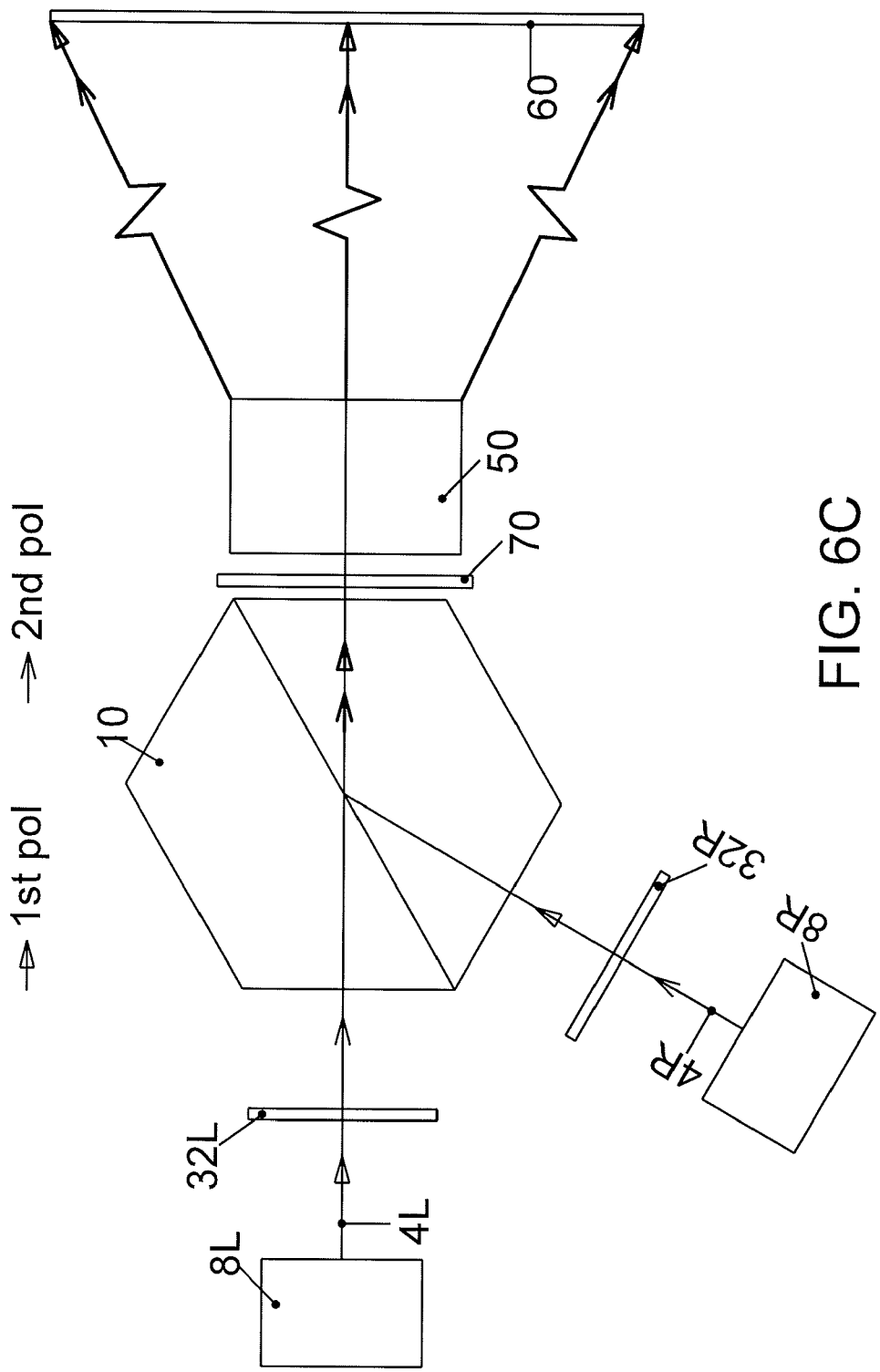
FIG. 6C is a schematic view of one of the first type embodiments of the projection display systems in accordance with the present invention having two illumination systems, two transmissive LCD panels, a polarizing beam-splitter with central angle of incidence substantially larger than 45° and a single projection lens.

The first type of the embodiments of the projection display systems in accordance with the present invention as shown in FIGS. 6A-6C, comprises of two illumination systems 8L and 8R, a polarizing beam-splitter 10 for combining image light, two transmissive LCD micro-display panels 32L and 32R, an optional waveplate 70, a projection lens 50 and an optional projection screen 60. The polarizing beam-splitter 10 reflects light in a first polarization and transmits light in a second polarization, or vice versa, the first and second polarizations are orthogonal to each other. The illumination systems 8L and 8R generate polarized light beams 4L and 4R in the first and second polarization, respectively. In the embodiment shown in FIG. 6A, the central angle of incidence of light at the beam-splitting surface of the polarizing beam-splitter 10 is about 45°; in the embodiment shown in FIG. 6B, the central angle of incidence is slightly larger than 45°; and in the embodiment shown in FIG. 6C, the central angle of incidence is substantially larger than 45°. The micro-display panels 32L and 32R are of the transmissive micro-display panel 32 described in the preamble.

The polarizing beam-splitter 10 is selected from polarizing devices described in the preamble. When the polarizing beam-splitter 10 reflects light in the second polarization and transmits light in the first polarization, the positions of the illumination system 8L and the micro-display panel 32L, and the illumination system 8R and the micro-display panel 32R are switched. The first and second polarizations can be s- and p-polarized, respectively, or vice versa.

The operation of the first type of the embodiments in accordance with the present invention of the projection display systems is described as follows with the help of FIGS. 6A-6C.

The polarized light beam 4L in the first polarization from the illumination system 8L is incident upon the micro-display panel 32L. Images are then encoded by the micro-display panel onto the output light by modulating the polarization state of the incident light. For "on" pixels, the polarization state of the image light is rotated to the second polarization. Thus the "on" pixel image light passes through the polarizing beam-splitter 10 and the optional waveplate 70 and is then projected onto the screen 60 by the projection lens 50. For "off" pixels, the polarization state of the output image light is unchanged, is still in the first polarization, thus it is absorbed by the internal polarizer within the microdisplay panel 32L and any residue light from the "off" pixels is further reduced by the polarizing beam-splitter 10 by reflecting the light out of the imaging path of the projection lens. Therefore, very high contrast images can be obtained.

Similarly, the polarized light beam 4R in the second polarization from the illumination system 8R is incident upon the micro-display panel 32R. Images are then encoded by the micro-display onto the output light by modulating the polarization states of the incident light. For "on" pixels, the polarization state of the image light is rotated to the first polarization. Thus the "on" pixel image light is reflected by the polarizing beam-splitter 10 and passes through the optional waveplate 70 and is then projected onto the screen 60 by the projection lens 50. For "off" pixels, the polarization state of the output image light is unchanged, is still in the second polarization, thus it is absorbed by the internal polarizer within the microdisplay panel 32R and any residue light from the "off" pixels is further reduced by the polarizing beam-splitter 10 by transmitting the light out of the imaging path of the projection lens. Therefore, very high contrast images can also be obtained.

If the optional projection screen 60 is reflective, then the projection display system operates as a front projector. If the optional projection screen 60 is transmissive, the projection display system is then a rear projector which may also consist of some additional mirrors to reduce the overall system size that are not shown here. This paragraph regarding the front or rear projection arrangements applies to all types of the embodiments in accordance with the present invention of the projection display systems described hereafter. It is, therefore, not to be repeated and its incorporation in the description of each embodiment type is assumed.

The illumination systems 8L and 8R can each comprise of a lamp emitting white light such as a UHP lamp and a polarization recovery means for converting un-polarized light into polarized light; in addition, a color filter wheel can be added to generate time-sequential colors, red, green and blue, or any other suitable color combinations. Alternatively, the illumination systems 8L and 8R can each comprise of red, green and blue color LED light sources or lasers, or any other suitable color combinations, and a polarization recovery means only if the light sources do not emit polarized light; time-sequential color light is generated by pulsing the LED or laser light sources.

If the light from the two illumination systems 8L and 8R is white light, then black and white images are shown on screen. If the light from the two illumination systems 8L and 8R are time-sequential colors red, green and blue or any other suitable color combinations, and the color images on the micro-display panels are synchronized with the color illumination light, then the full color images are shown on screen.

The first type of the embodiments in accordance with the present invention can be configured to work in one or combinations of the following 2D and 3D switchable modes:

In the first 2D and 3D switchable mode of the first type of the embodiments described above, the 3D stereo display mode is realized by using two orthogonal polarizations for the left- and right eye-images. In this mode, a non-depolarizing projection screen is used. Since the image light from the micro-display panel 32L is in the second polarization and the image light from the micro-display panel 32R is in the first polarization, if left-eye and right-eye image signals are fed to the two micro-display panels 32L and 32R, respectively, by wearing matching polarizing 3D glasses, viewers will be able to see 3D stereoscopic images on screen. In addition, if identical 2D image signals are fed to the two microdisplay panels 32L and 32R, normal 2D images are then displayed onscreen. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of cheap polarizing 3D glasses.

In the second 2D and 3D switchable mode of the first type of the embodiments described above, the 3D stereo display mode is realized using two different sets of primary colors for the left- and right-eye images. In this case, a non-depolarizing projection screen or an ordinary screen can be used. The light from the illumination system 8L consists of a first set of primary colors c1L, c2L and c3L, the light from the illumination system 8R consists of a second set of primary colors c1R, c2R and c3R. The first and second sets of primary colors are different and occupy different wavelength regions in the wavelength spectrum. More than three colors in each primary color set can be used as well. Thus, the image light from the micro-display panel 32L consists of only the first set of primary colors c1L, c2L and c3L, and the image light from the micro-display panel 32R only consists of the second set of primary colors c1R, c2R and c3R. If left-eye and right-eye image signals are fed to the two micro-display panels 32L and 32R, respectively, or vice versa, by wearing matching 3D color filter glasses, viewers will be able to see 3D stereoscopic images on screen. The left- and right-eye color filter glasses match the spectrum of the corresponding image sets. The left- and right-eye glasses only allow the corresponding eye color images to pass and block the other eye color images. In addition, if identical 2D image signals are fed to the two sets of microdisplay panels 32L and 32R, normal 2D images are then displayed onscreen with both the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of ordinary screens and relatively cheap plastic projection lens which may depolarize light, in addition, low cross-talk between the left-eye and right-eye images can be achieved due to the high contrast ratios of color filter glasses.

In the third 2D and 3D switchable mode of the first type of the embodiments described above, the 3D stereo display mode is realized by using two orthogonal polarizations and two different sets of colors for the left- and right eye-images. In this case, a non-depolarizing projection screen or an ordinary screen is used. The light from the illumination system 8L consists of a first set of primary colors c1L, c2L and c3L, the light from the illumination system 8R consists of a second set of primary colors c1R, c2R and c3R. The first and second sets of primary colors are different and occupy different wavelength regions in the wavelength spectrum. More than three colors in each primary color set can be used as well. The image light from the micro-display panel 32L consists of only the first set of primary colors c1L, c2L and c3L in the second polarization, and the image light from the micro-display panel 32R only consists of the second set of primary colors c1R, c2R and c3R in the first polarization. If left-eye and right-eye image signals are fed to the microdisplay panels 32L and 32R, respectively, or vice versa, and by wearing matching polarizing 3D glasses in the case where a non-depolarizing screen is used, or color filter glasses in the case where a non-depolarizing screen or an ordinary screen is used, viewers will be able to see 3D stereoscopic images on screen. The left- and right-eye polarizing or color filter glasses match the polarization or spectrum of the corresponding image sets, they only allow the corresponding polarization or color images of the corresponding eye to pass and block the images for the other eye. In addition, if identical 2D image signals are fed to the two sets of microdisplay panels 32L and 32R, normal 2D images are then displayed onscreen with the first and second sets of the primary colors combined.

Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This type of operation mode is desirable in some applications where users can have the flexibility to use either 3D polarizing glasses with a non-depolarizing screen or 3D color filter glasses with a non-depolarizing or an ordinary screen. It is especially suitable for portable projector applications.

In the first type of the embodiments of the present invention of the projection display systems, the two images onscreen from the two micro-display panels 32L and 32R are well aligned. This is one of the unique advantages of the present invention compared to any existing dual 3D projectors. It allows both high quality 2D and 3D images to be displayed. Existing dual 3D projectors can not be aligned well enough to be used as 2D projectors and they are mostly used as dedicated 3D projectors for displaying 3D images only. In some applications, it may be desirable to slightly off-set the images from the two micro-display panels by a half pixel vertically and horizontally. The off-set approach can be beneficial, for example, it can be used to increase the spatial resolution of displays for 2D images, similar to that of an image wobbling technique, yet in 3D mode, the half-pixel misalignment does not have much impact on the 3D images. However, in this case, the 2D image signals fed to the micro-display panels are not identical but each represents an interlaced half image of the complete 2D images.

The above paragraph regarding image alignment applies to all types of embodiments in accordance with the present invention. In the embodiments using two micro-display panels, the two images are from two micro-display panels. In the embodiments using six micro-display panels, the two images are replaced by two sets of the images from two sets of micro-display panels. For simplicity, the above paragraph will not be repeated and its incorporation in the description of each embodiment type is assumed with minor modifications accordingly.

The optional waveplate 70 is sometimes used to convert image light from linear polarized light into circular polarized light in 3D operation mode with polarized light. In this case, viewers need to wear matching 3D circular polarizing glasses. The use of circularly polarized light is sometimes beneficial because it allows viewers to tilt their head over a wider range than with linear polarized light while maintaining a good quality 3D viewing experience. This paragraph applies to all embodiment types in accordance with the present invention and thus its incorporation is assumed in the description of the embodiment types hereafter.

A person skilled in the art will appreciate that some additional common optical components, for example lens, may be needed in some of the above embodiments and these additional components are not shown in the figures. Without departing from the spirit of the present invention, other embodiments with different arrangements and layouts of the components can be used as well. This paragraph also applies to the second to eighth type of embodiments described below. Furthermore, a person skilled in the art will appreciate that the illumination systems 8 shown for the second to the fifth type of embodiments and the seventh type of embodiments can generate light in the first polarization.

Second Type of Embodiments

Figure 7A:
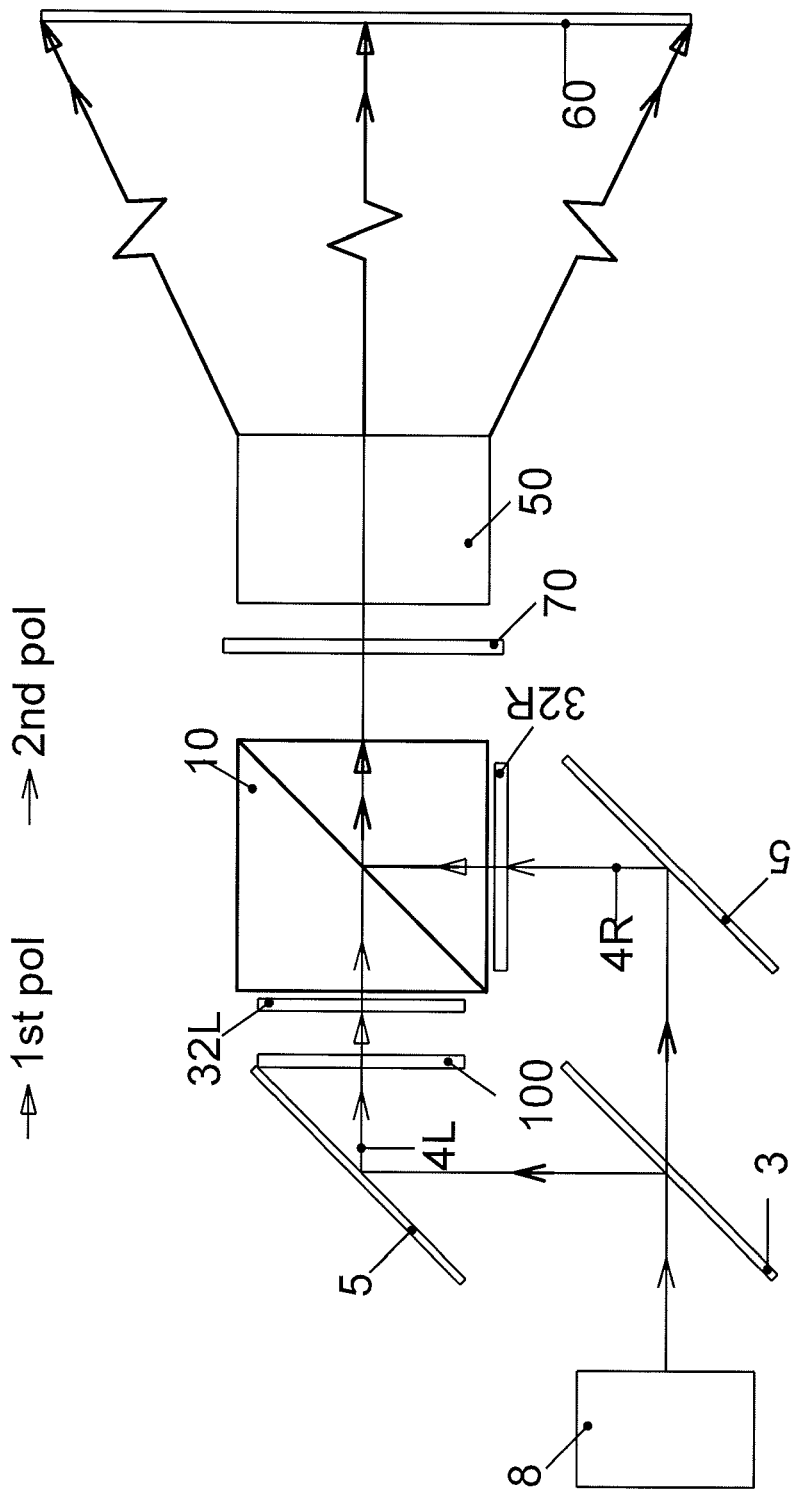
FIG. 7A is a schematic view of one of the second type embodiments of the projection display systems in accordance with the present invention having an illumination system, two transmissive LCD panels, a polarizing beam-splitter with the central angle of incidence on the beam-splitter surface about 45° and a single projection lens.
Figure 7B:
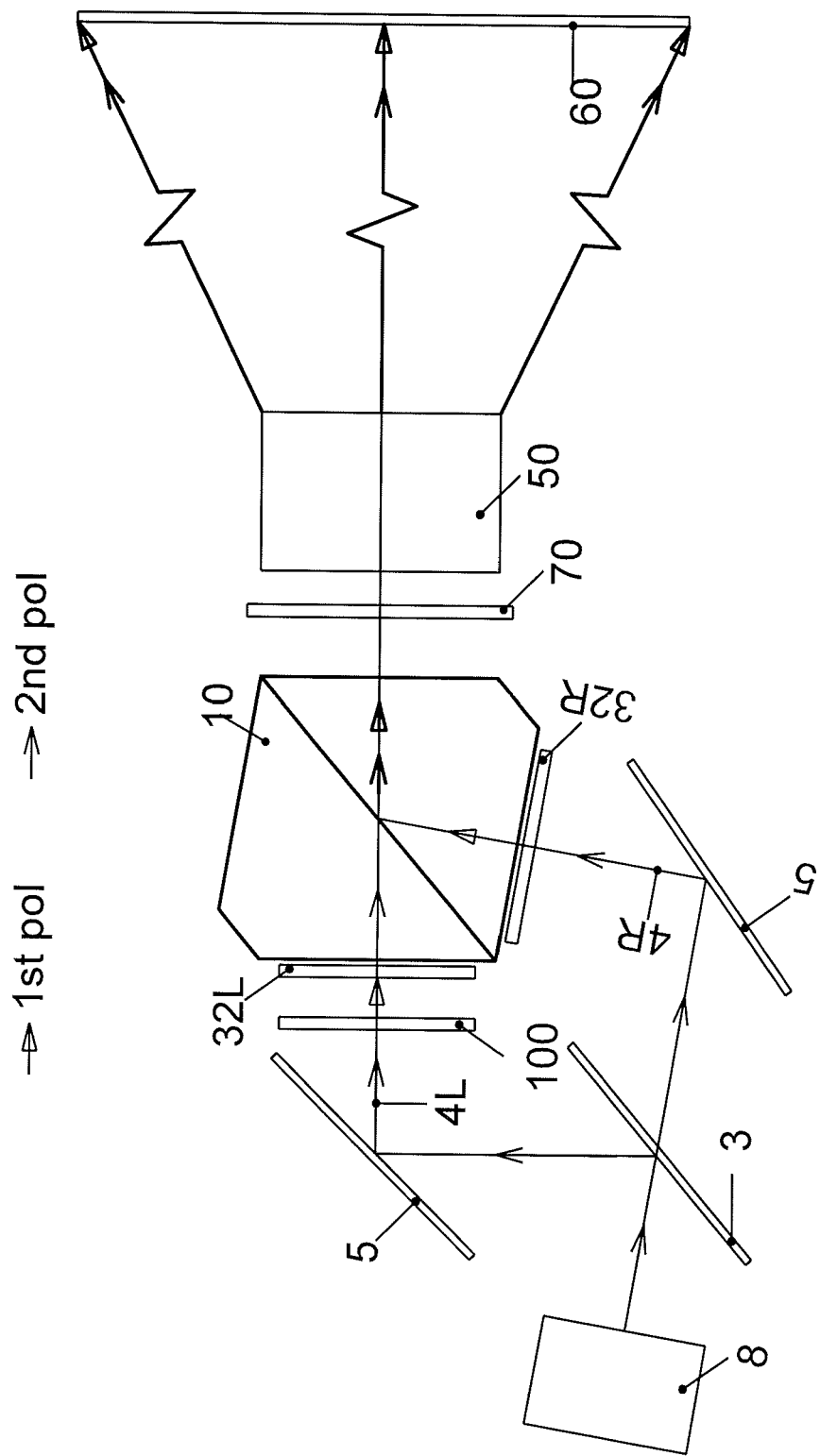
FIG. 7B is a schematic view of one of the second type embodiments of the projection display systems in accordance with the present invention having an illumination system, two transmissive LCD panels, a polarizing beam-splitter with central angle of incidence larger than 45° and a single projection lens.
Figure 7C:
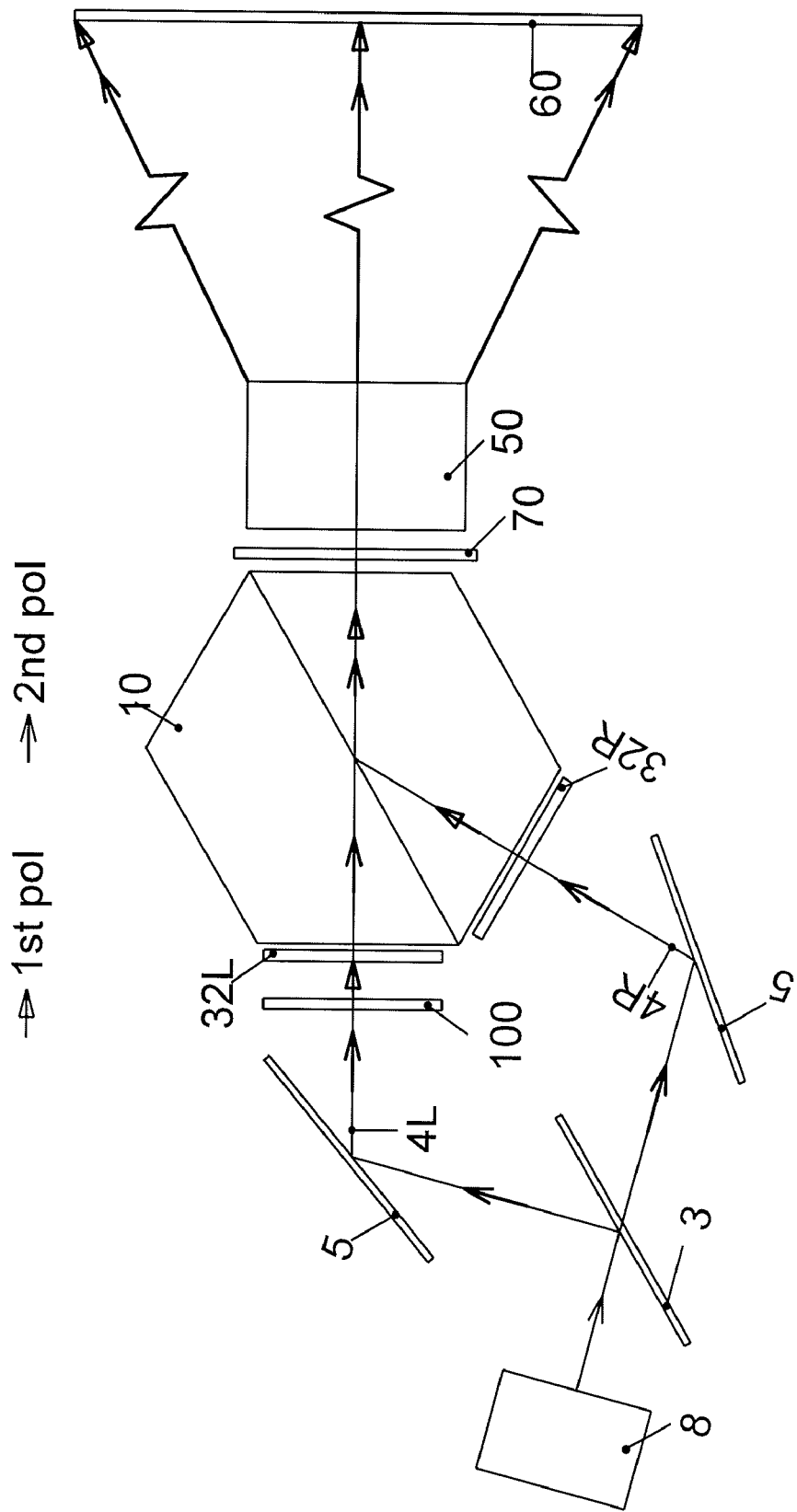
FIG. 7C is a schematic view of one of the second type embodiments of the projection display systems in accordance with the present invention having an illumination system, two transmissive LCD panels, a polarizing beam-splitter with central angle of incidence substantially larger than 45° and a single projection lens.

The second type of the embodiments of the projection display systems in accordance with the present invention as shown in FIGS. 7A-7C, comprises of an illumination system 8, a beam-splitter 3, two mirrors 5, a polarizing beam-splitter 10 for combining image light, two transmissive LCD microdisplay panels 32L and 32R, a optional waveplate 100, an optional waveplate 70, a projection lens 50 and an optional projection screen 60. The polarizing beam-splitter 10 reflects light in a first polarization and transmits light in a second polarization, or vice versa, the first and second polarizations are orthogonal to each other. The waveplate 100 converts light from the second polarization to the first polarization or vice versa. (An optional optical path length compensating plate, that does not change polarization, can be placed before microdisplay 32R, not shown in FIGS. 7A-7C). The illumination system 8 generates either polarized or non-polarized light. FIGS. 7A-7C show the embodiments in which the illumination system 8 generates the light in the second polarization. If the illumination system 8 generates light in the first polarization, the waveplate 100 is then placed before the microdisplay panel 32R (not shown in FIGS. 7A-7C). If the illumination system generates un-polarized light, then the beam-splitter 3 is a polarizing beam-splitter of the type described in the preamble which reflects light in the first polarization and transmits light in the second polarization, or vice versa; thus, the waveplate 100 is not required because the beam-splitter already provides two polarized beams with the second and first polarization states for the two micro-display panels 32L and 32R. In the embodiment shown in FIG. 7A, the central angle of incidence of light at the beam-splitting surface of the polarizing beam-splitter 10 is about 45°; in the embodiment shown in FIG. 7B, the central angle of incidence is slightly larger than 45°; and in the embodiment shown in FIG. 7C, the central angle of incidence is substantially larger than 45°. The micro-display panels 32L and 32R are transmissive microdisplay panels 32 as described in the preamble.

The polarizing beam-splitter 10 is selected from polarizing devices described in the preamble. The first and second polarizations can be s- and p-polarized, respectively, or vice versa.

The operation of the second type of the embodiments in accordance with the present invention of the projection display systems is described as follows with the help of FIGS. 7A-7C, assuming the light from the illumination system is in the second polarization and the polarizing beam-splitter 10 reflects light in the first polarization and transmits light in the second polarization.

The light in the second polarization from the illumination system 8 is split into two beams by the beam-splitter 3. The reflected and transmitted light beams in the second polarization from the beam-splitter 3 are reflected by the two mirrors 5 and become beams 4L and 4R. The polarized light beam 4L passes through the waveplate 100 and its polarization state is converted from the second polarization state to the first polarization state. The light is then incident upon the micro-display panel 32L. Images are then encoded by the micro-display onto the output light by modulating the polarization states of the incident light. For "on" pixels, the polarization state of the image light is rotated to the second polarization. Thus the "on" pixel image light passes through the polarizing beam-splitter 10 and the optional waveplate 70 and is then projected onto the screen 60 by the projection lens 50. For "off" pixels, the polarization state of the output image light is unchanged, is still in the first polarization, thus it is absorbed by the internal polarizer within the microdisplay panel 32L and any residue light from the "off" pixels is further reduced by the polarizing beam-splitter 10 by reflecting the light out of the imaging path of the projection lens. Therefore, very high contrast images can be obtained.

Similarly, the polarized light beam 4R in the second polarization is incident upon the micro-display panel 32R. Images are then encoded by the micro-display onto the output light by modulating the polarization states of the incident light. For "on" pixels, the polarization state of the image light is rotated to the first polarization. Thus the "on" pixel image light is reflected by the polarizing beam-splitter 10 and passes through the optional waveplate 70 and is then projected onto the screen 60 by the projection lens 50. For "off" pixels, the polarization state of the output image light is unchanged, is still in the second polarization, thus it is absorbed by the internal polarizer within the microdisplay panel 32R and any residue light from the "off" pixels is further reduced by the polarizing beam-splitter 10 by transmitting the light out of the imaging path of the projection lens. Therefore, very high contrast images can also be obtained.

The illumination system 8 can comprise of a lamp emitting white light such as a UHP lamp with or without a polarization recovery means for converting un-polarized light into polarized light; in addition, a color filter wheel can be added to generate time-sequential colors, red, green and blue, or any other suitable color combinations. Alternatively, the illumination system 8 can comprise of red, green and blue, color LED light sources or lasers, or any other suitable color combinations, with or without a polarization recovery means only if the light sources do not emit polarized light; time-sequential color lights are generated by pulsing the LED or laser light sources.

If the light from the illumination system 8 is white light then black and white images are shown on screen. If the light from the illumination system 8 consists of time-sequential colors, red, green and blue or any other suitable color combinations. The color images on the micro-display panels are synchronized with the color illumination light, then the full color images are shown on screen.

The second type of the embodiments in accordance with the present invention can be configured to work in one or combinations of the following 2D and 3D switchable modes:

In the first 2D and 3D switchable mode of the second type of the embodiments described above, the 3D stereo display mode is realized by using two orthogonal polarizations for the left- and right eye-images. In this case, a non-depolarizing projection screen is used. In addition, the beam-splitter 3 is a 50/50 beam-splitter which transmits and reflects equally about 50% of the incident light. Since the image light from the micro-display panel 32L is in the second polarization and the image light from the micro-display panel 32R is in the first polarization, if left-eye and right-eye image signals are fed to the two micro-display panels 32L and 32R, respectively, by wearing matching polarizing 3D glasses, viewers will be able to see 3D stereoscopic images on screen. In addition, if identical 2D image signals are fed to the two microdisplay panels 32L and 32R, normal 2D images are then displayed onscreen. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of cheap polarizing 3D glasses.

In the second 2D and 3D switchable mode of the second type of the embodiments described above, the 3D stereo display mode is realized using two different sets of primary colors for the left- and right-eye images. In this case, a non-depolarizing projection screen or an ordinary screen can be used. In addition, the beam-splitter 3 reflects light of a first set of primary colors c1L, c2L and c3L and transmits light of a second set of primary colors c1R, c2R and c3R. The first and second sets of primary colors are different and occupy different wavelength regions in the wavelength spectrum. The image light from the micro-display panel 32L consists of only the first set of primary colors c1L, c2L and c3L, and the image light from the micro-display panel 32R only consists of the second set of primary colors c1R, c2R and c3R. If left-eye and right-eye image signals are fed to the two micro-display panels 32L and 32R, respectively, or vice versa, by wearing matching 3D color filter glasses, viewers will be able to see 3D stereoscopic images on screen. The left- and right-eye color filter glasses match the spectrum of the corresponding image sets. The left- and right-eye glasses only allow the corresponding eye color images to pass and block the other eye color images. In addition, if identical 2D image signals are fed to the two sets of microdisplay panels 32L and 32R, normal 2D images are then displayed onscreen with the first and second sets of the primary colors combined. The 2D and 3D modes can be switched electronically and no hardware needs to be added or removed during switching. This operation mode is advantageous in some applications because it allows the use of ordinary screens and relatively cheap plastic projection lens which may depolarize light, in addition, low cross-talk between the left-eye and right-eye images can be obtained due to the high contrast ratios of color filter glasses.

In the third 2D and 3D switchable mode of the second type of the embodiments described above, the 3D stereo display mode is realized by using two orthogonal polarizations and two different sets of colors for the left- and right eye-images. In this case, a non-depolarizing projection screen or an ordinary screen is used. In addition, the beam-splitter 3 reflects light of a first set of primary colors c1L, c2L and c3L and transmits light of a second set of primary colors c1R, c2R and c3R. The first and second sets of primary colors are different and occupy different wavelength regions in the wavelength spectrum. More than three colors in each primary color set can be used as well. The image light from the micro-display panel 32L consists of only the first set of primary colors c1L, c2L and c3L in the second polarization, and the image light from the micro-display panel 32R only consists of the second set of primary colors c1R, c2R and c3R in the first polarization. If left-eye and right-eye image signals are fed to the microdisplay panels 32L and 32R, respectively, or vice versa, and by wearing matching polarizing 3D glasses in the case where a non-depolarizing screen is used, or color filter glasses in the case where a non-depolarizing screen or an ordinary screen is used, viewers will be able to see 3D stereoscopic images on screen. The left- and right-eye polarizing or color filter glasses match the polarization or spectrum of the corresponding image sets, they only allow the corresponding polarization or color images of the corresponding eye to pass and block the images for the other eye. In addition, if identical 2D image signals are fed to the two sets of microdisplay panels 32L and 32R, normal 2D images are then displayed onscreen with the first and second sets of the primary colors combined. The 2D and 3D modes can be switched electronically and no hardware needs to be added or removed during switching. This type of operation mode is desirable in some applications where users can have the flexibility to use either 3D polarizing glasses or 3D color filter glasses.

Third Type of Embodiments

The third type of the embodiments of the projection display systems in accordance with the present invention as shown in FIGS. 8A-8D, comprises of an illumination system 8, a wavelength selective polarization rotator 90, a polarizing beam-splitter 10 for separating unpolarized incident light and for combining polarized image light, two reflective micro-display panels 30L and 30R, an optional waveplate 70, a projection lens 50 and an optional projection screen 60. The polarizing beam-splitter 10 reflects light in a first polarization and transmits light in a second polarization, or vice versa, the first and second polarizations are orthogonal to each other. The illumination system 8 generates polarized light in the first polarization or second polarization state. FIGS. 8A-8D show the embodiments in which the illumination system 8 generates the light in the second polarization. In the embodiments shown in FIGS. 8A and 8D, the central angle of incidence of light at the beam-splitting surface of the polarizing beam-splitter 10 is about 45°; in the embodiment shown in FIG. 8B the central angle of incidence is slightly larger than 45°; and in the embodiment shown in FIG. 8C the central angle of incidence is substantially larger than 45°.

The polarizing beam-splitter 10 is selected from polarizing devices described in the preamble. The first and second polarizations can be s- and p-polarized, respectively, or vice versa. The micro-display panels 30L and 30R are of the type of the reflective micro-display panels 30 as described in the preamble. They can be LCOS panels with additional waveplates for compensating geometry depolarization. They can also be MEM panels with additional waveplates for rotating the polarization state of incident light by 90°; in addition, optional waveplates can be used as parts of the panels to compensate geometry depolarization. The wavelength selective polarization rotator 90 is described in the preamble.

Figure 8A:
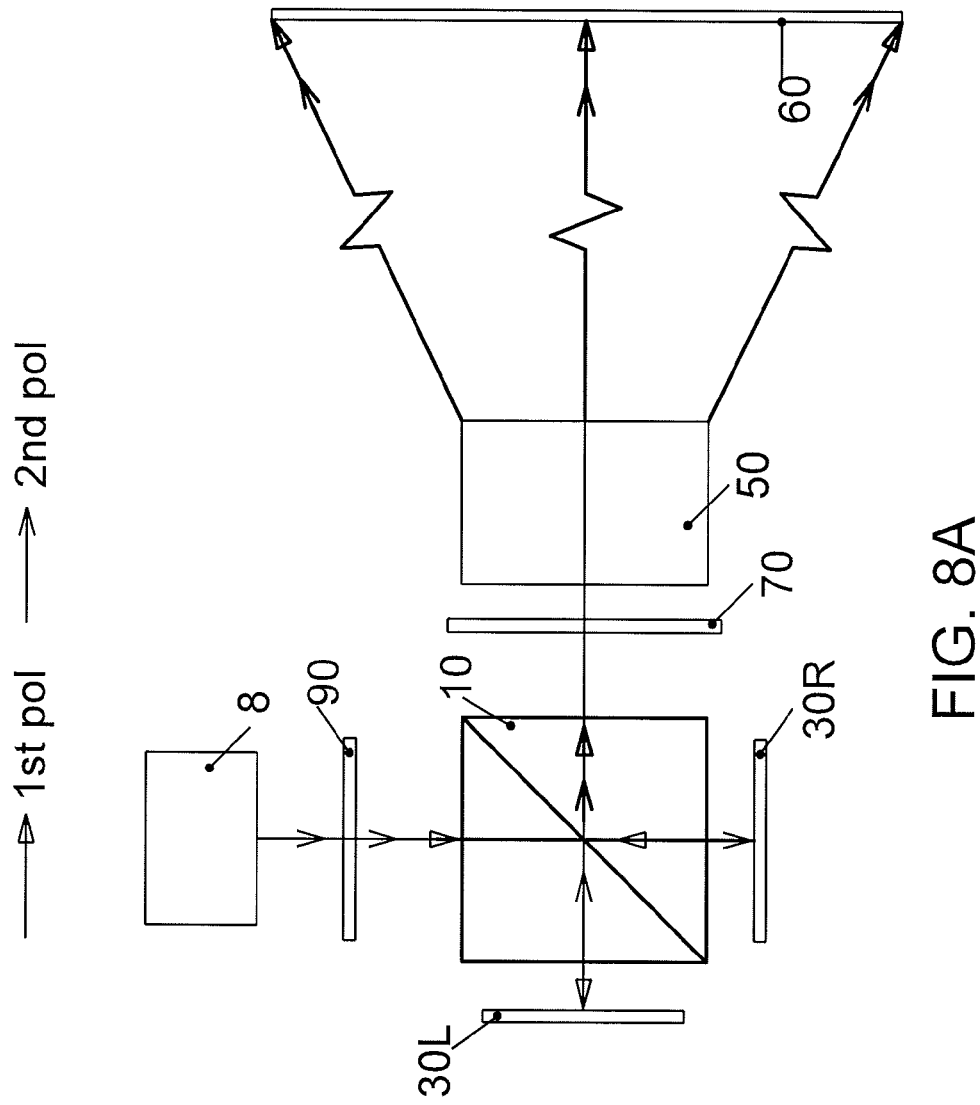
FIG. 8A is a schematic view of one of the third type embodiments of the projection display systems in accordance with the present invention having an illumination system, two reflective LCOS or MEM panels, a polarizing beam-splitter with the central angle of incidence on the beam-splitter surface about 45° and a single projection lens.
Figure 8B:
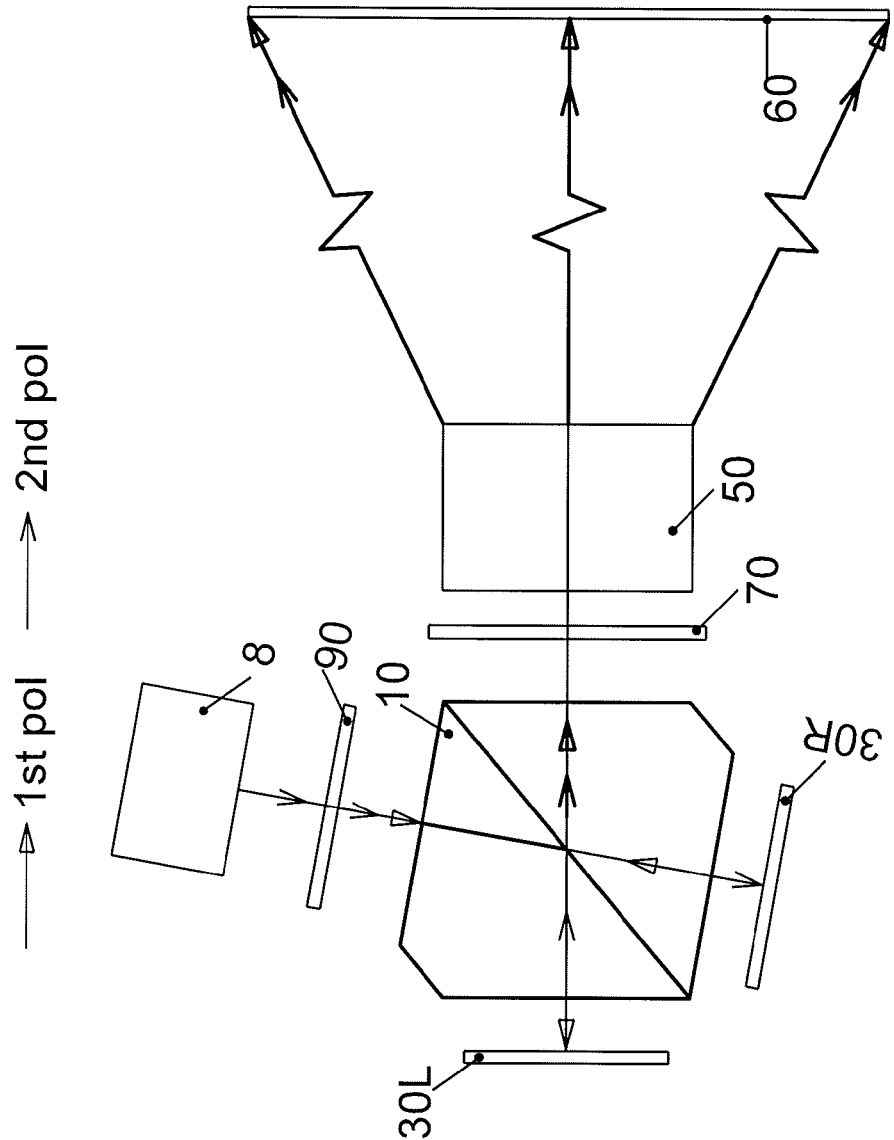
FIG. 8B is a schematic view of one of the third type embodiments of the projection display systems in accordance with the present invention having an illumination system, two reflective LCOS or MEM panels, a polarizing beam-splitter with central angle of incidence larger than 45° and a single projection lens.
Figure 8C:
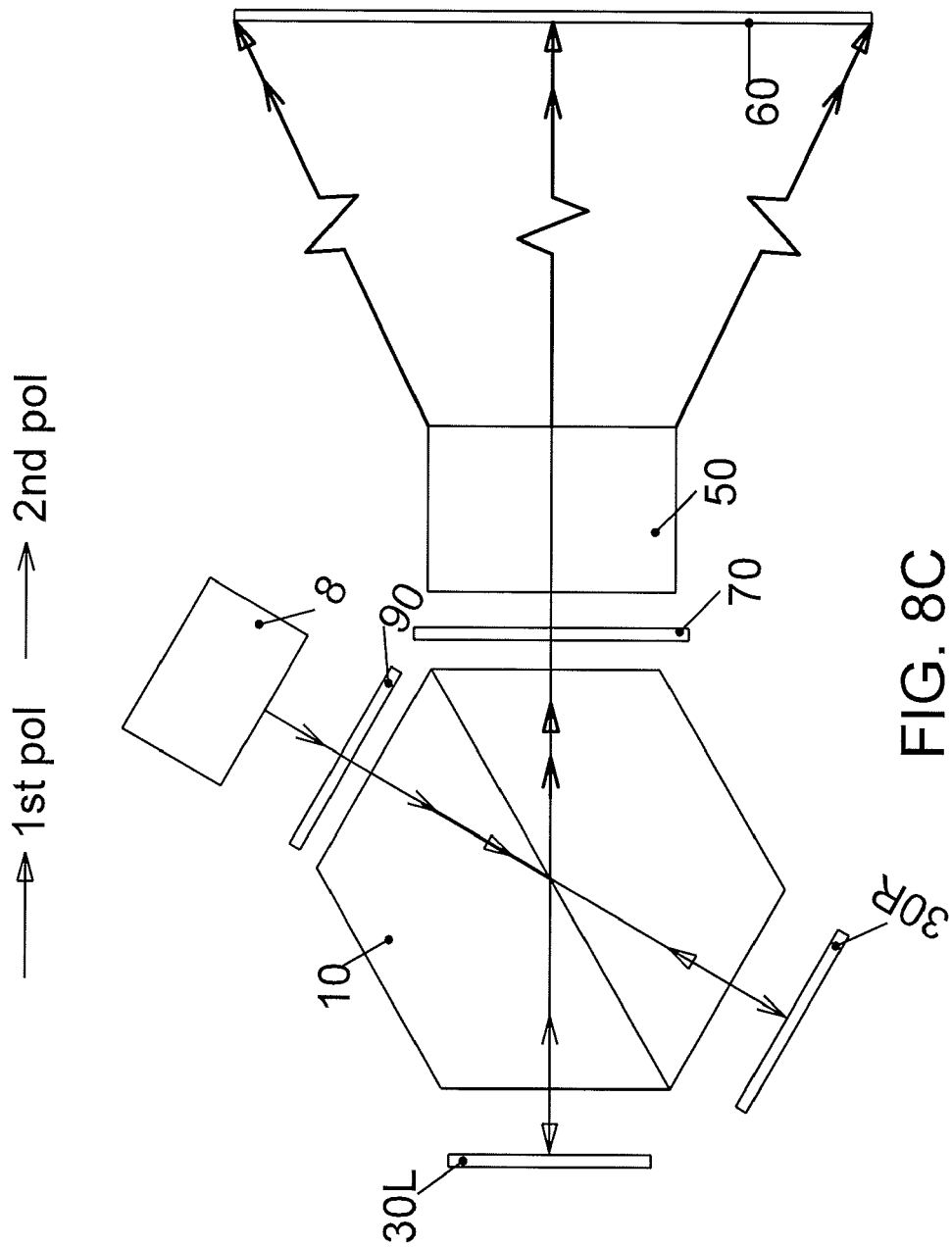
FIG. 8C is a schematic view of one of the third type embodiments of the projection display systems in accordance with the present invention having an illumination system, two reflective LCOS or MEM panels, a polarizing beam-splitter with central angle of incidence substantially larger than 45° and a single projection lens.
Figure 8D:
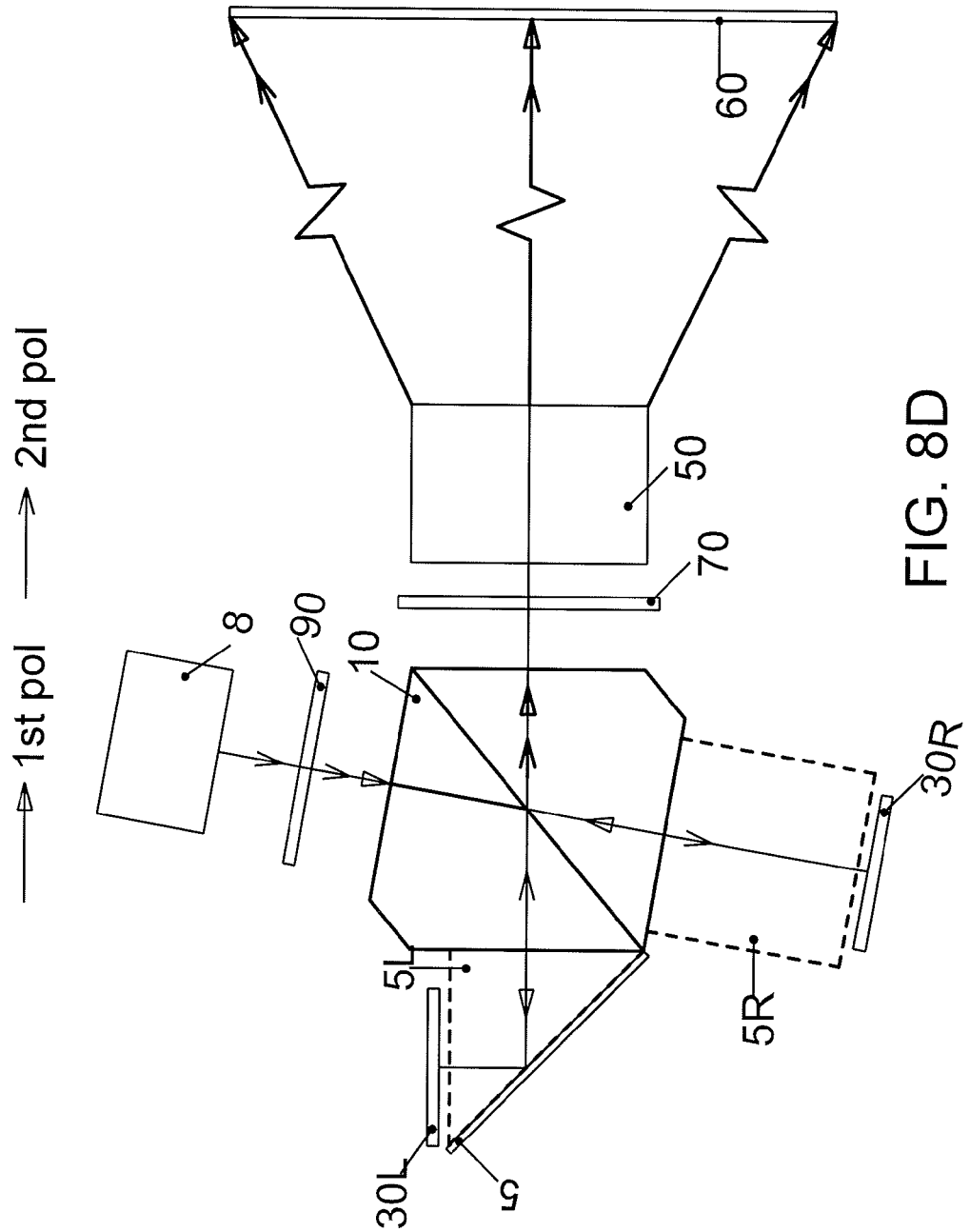
FIG. 8D is a schematic view of one of the third type embodiments of the projection display systems in accordance with the present invention having an illumination system, two reflective LCOS or MEM panels, an additional mirror, a polarizing beam-splitter with central angle of incidence larger than 45° and a single projection lens.

In the embodiment shown in FIG. 8D, an additional mirror 5 is added before one of the micro-display panels 30L (as shown in the figures) or 30R (not shown in the figures). The mirror 5 can be a plate as shown as solid lines in FIG. 8D, or it can be a prism 5L shown as dashed lines with an optical path matching prism 5R in front of the other micro-display panel. The additional plate mirror 5 or the prism mirror 5L and matching prism 5R are necessary for use with some types of MEM devices as disclosed in the U.S. patent application Ser. No. 11/770,247 by the same inventor. Additionally the polarizing beam-splitter 10 as shown in FIG. 8D operating with a central angle of incidence of slightly larger than 45° for light incident on the beam-splitting surface can also be configured for operation with a central angle of incidence of about 45°, (as shown in FIG. 8A) or substantially larger than 45° (as shown in FIG. 8C.).

The operation of the third type of the embodiments in accordance with the present invention of the projection display systems is described as follows with the help of FIGS. 8A-8D.

The polarized light from the illumination system 8 consists of a first set and a second set of primary colors: c1L, c2L and c3L, and c1R, c2R and c3R. The first and the second color sets are different and occupy different wavelength regions in the wavelength spectrum and they form two different color triangles in the CIE color diagram. More than three colors in each primary color set can be used as well. The wavelength selective polarization rotator selectively rotates the polarization state of some of the incident color light and keeps the rest unchanged. After the light from the illumination system 8 passes through the wavelength selective polarization rotator 90, the light having the first set of the primary colors c1L, c2L and c3L is in the first polarization state while the light having the second set of primary colors c1R, c2R and c3R is in the second polarization state.

The light having the first primary colors c1L, c2L, c3L in the first polarization state is thus reflected by the beam-splitter 10 towards the micro-display panel 30L. Images are then encoded by the micro-display onto the output reflected light by modulating the polarization states of the incident light. For "on" pixels, the polarization state of the image light is rotated to the second polarization. Thus the "on" pixel image light passes through the polarizing beam-splitter 10 and the optional waveplate 70 and is then projected onto the screen 60 by the projection lens 50. In the case where the micro-display panel 30L is a LCOS panel, the "off" pixels do not change the polarization state of incident light, thus the reflected "off" light from the micro-display panel 30L is sent back by the polarizing beam-splitter 10 along the direction of the light source. In the case where the micro-display panel 30L is a MEM panel, the "off" pixels reflect the incident light at different direction from the "on" pixel light, the reflected "off" light is absorbed by a light absorber and it does not reach to the projection lens.

Similarly, the light having the second primary colors c1R, c2R, c3R in the second polarization state is transmitted by the beam-splitter 10 towards the micro-display panel 30R. Images are then encoded by the micro-display onto the reflected output light by modulating the polarization states of the incident light. For "on" pixels, the polarization state of the image light is rotated to the first polarization. Thus the "on" pixel image light is reflected by the polarizing beam-splitter 10 and passes through the optional waveplate 70 and is then projected onto the screen 60 by the projection lens 50. In the case where the micro-display panel 30R is a LCOS panel, the "off" pixels do not change the polarization state of incident light, thus the reflected "off" light from the micro-display panel 30L is sent back by the polarizing beam-splitter 10 along the direction of the light source. In the case where the micro-display panel 30R is a MEM panel, the "off" pixels reflect the incident light at different direction from the "on" pixel light, the reflected "off" light is absorbed by a light absorber and it does not reach to the projection lens.

The illumination system 8 can comprise of a lamp emitting white light such as a UHP lamp and a polarization recovery means for converting un-polarized light into polarized light; in addition, a color filter wheel can be added to generate time-sequential colors, red, green and blue, or any other suitable color combinations. Alternatively, the illumination system 8 can comprise of red, green and blue, color LED light sources or lasers, or any other suitable color combinations, and a polarization recovery means, only if the light sources do not emit polarized light; time-sequential color lights are generated by pulsing the LED or laser light sources.

If the light from the illumination system 8 is white light then black and white images are shown on screen. If the light from the illumination system 8 consists of time-sequential colors, red, green and blue or any other suitable color combinations, and the color images on the micro-display panels are synchronized with the color illumination light, then full color images are shown on screen.

The third type of the embodiments in accordance with the present invention can be configured to work in one or combinations of the following 2D and 3D switchable modes:

In the first 2D and 3D switchable mode of the third type of the embodiments described above, the 3D stereo display mode is realized by using two orthogonal polarizations for the left- and right eye-images. In this case, a non-depolarizing projection screen is used. Since the image light from the micro-display panel 30L is in the second polarization and the image light from the micro-display panel 30R is in the first polarization, if left-eye and right-eye image signals are fed to the two micro-display panels 30L and 30R, respectively, by wearing matching polarizing 3D glasses, viewers will be able to see 3D stereoscopic images on screen. In addition, if identical 2D image signals are fed to the two microdisplay panels 30L and 30R, normal 2D images are then displayed onscreen. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of cheap polarizing 3D glasses.

In the second 2D and 3D switchable mode of the third type of the embodiments described above, the 3D stereo display mode is realized using two different sets of primary colors for the left- and right-eye images. In this case, a non-depolarizing projection screen or an ordinary screen can be used. The image light from the micro-display panel 30L consists of only the first set of primary colors c1L, c2L and c3L, and the image light from the micro-display panel 30R only consists of the second set of primary colors c1R, c2R and c3R. If left-eye and right-eye image signals are fed to the two micro-display panels 30L and 30R, respectively, or vice versa, by wearing matching 3D color filter glasses, viewers will be able to see 3D stereoscopic images on screen. The left- and right-eye color filter glasses match the spectrum of the corresponding image sets. The left- and right-eye glasses only allow the corresponding eye color images to pass and block the other eye color images. In addition, if identical 2D image signals are fed to the two sets of microdisplay panels 30L and 30R, normal 2D images are then displayed onscreen with the first and second sets of the primary colors combined. The 2D and 3D modes can be switched electronically and no hardware needs to be added or removed during switching. This operation mode is advantageous in some applications because it allows the use of ordinary screens and relatively cheap plastic projection lens which may depolarize light, in addition, low cross-talk between the left-eye and right-eye images can be obtained due to the high contrast ratios of color filter glasses.

In the third 2D and 3D switchable mode of the third type of the embodiments described above, the 3D stereo display mode is realized by using two orthogonal polarizations and two different sets of colors for the left- and right eye-images. In this case, a non-depolarizing projection screen or an ordinary screen is used. The image light from the micro-display panel 30L consists of only the first set of primary colors c1L, c2L and c3L in the second polarization, and the image light from the micro-display panel 30R only consists of the second set of primary colors c1R, c2R and c3R in the first polarization. If left-eye and right-eye image signals are fed to the microdisplay panels 30L and 30R, respectively, or vice versa, and by wearing matching polarizing 3D glasses in the case where a non-depolarizing screen is used, or color filter glasses in the case where a non-depolarizing screen or an ordinary screen is used, viewers will be able to see 3D stereoscopic images on screen. The left- and right-eye polarizing or color filter glasses match the polarization or spectrum of the corresponding image sets, they only allow the corresponding polarization or color images of the corresponding eye to pass and block the images for the other eye. In addition, if identical 2D image signals are fed to the two sets of microdisplay panels 30L and 30R, normal 2D images are then displayed onscreen with the first and second sets of the primary colors combined. The 2D and 3D modes can be switched electronically and no hardware needs to be added or removed during switching. This type of operation mode is desirable in some applications where users can have the flexibility to use either 3D polarizing glasses or 3D color filter glasses.

In the fourth 2D and 3D switchable mode of the third type of the embodiments described above, the 3D stereo display mode is realized by displaying the left- and right-eye images time sequentially at a fast speed. In this mode, a non-depolarizing projection screen or an ordinary screen can be used. The image light from the micro-display panel 30L consists of only the first set of primary colors c1L, c2L and c3L in the second polarization, and the image light from the micro-display panel 30R only consists of the second set of primary colors c1R, c2R and c3R in the first polarization. If left-eye signals are fed both to the micro-display panels 30L and 30R, and then followed by the right-eye signals being fed both to the micro-display panels 30L and 30R (there may be a blank period for reducing ghosting between the switching), the switching between the left- and right-eye images are fast enough, for example, 60 frames per second, by wearing synchronized LCD shutter glasses, viewers will be able to see 3D stereoscopic images on screen. In addition, if identical 2D image signals are fed to the microdisplay panels 30L and 30R, normal 2D images are then displayed onscreen. The 2D and 3D images consist of both the first and second set of the primary colors. The 2D and 3D modes can be switched electronically and no hardware needs to be added or removed during switching. This operation mode is advantageous in some applications because it allows the use of any type of screen.

The reflective micro-display panels 30L and 30R can be LCOS panels or MEM device panels as described in the preamble. Different alignments of the MEM devices with regarding to the polarizing beam-splitter can be used, depending on the specifications of the MEM devices.

Fourth Type of Embodiments

Figure 9A:
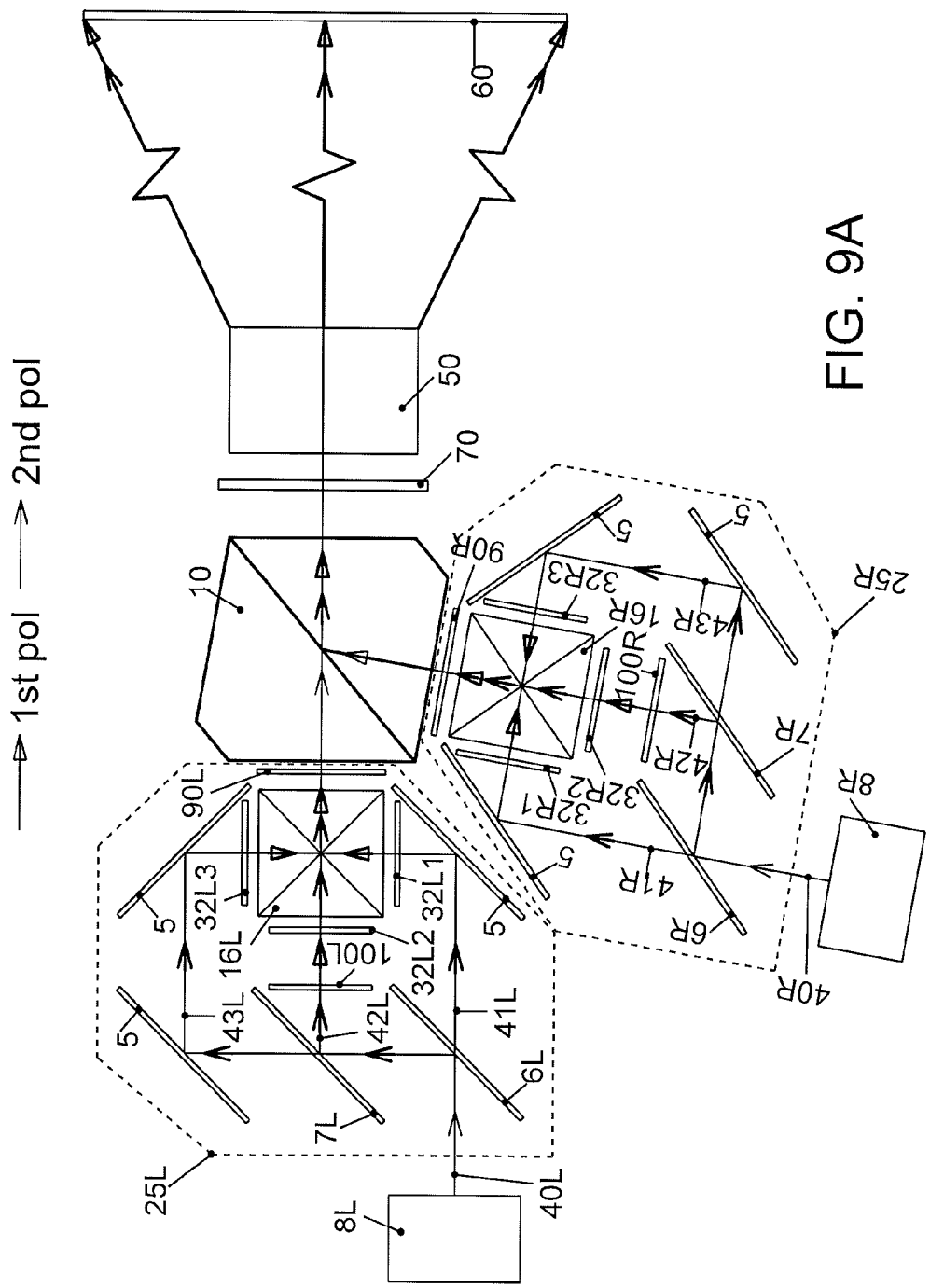
FIG. 9A is a schematic view of one of the fourth type embodiments of the projection display systems in accordance with the present invention having two illumination systems, six transmissive LCD panels, two X-cubes, and a polarizing beam-splitter with central angle of incidence larger than 45° and a single projection lens.
Figure 9B:
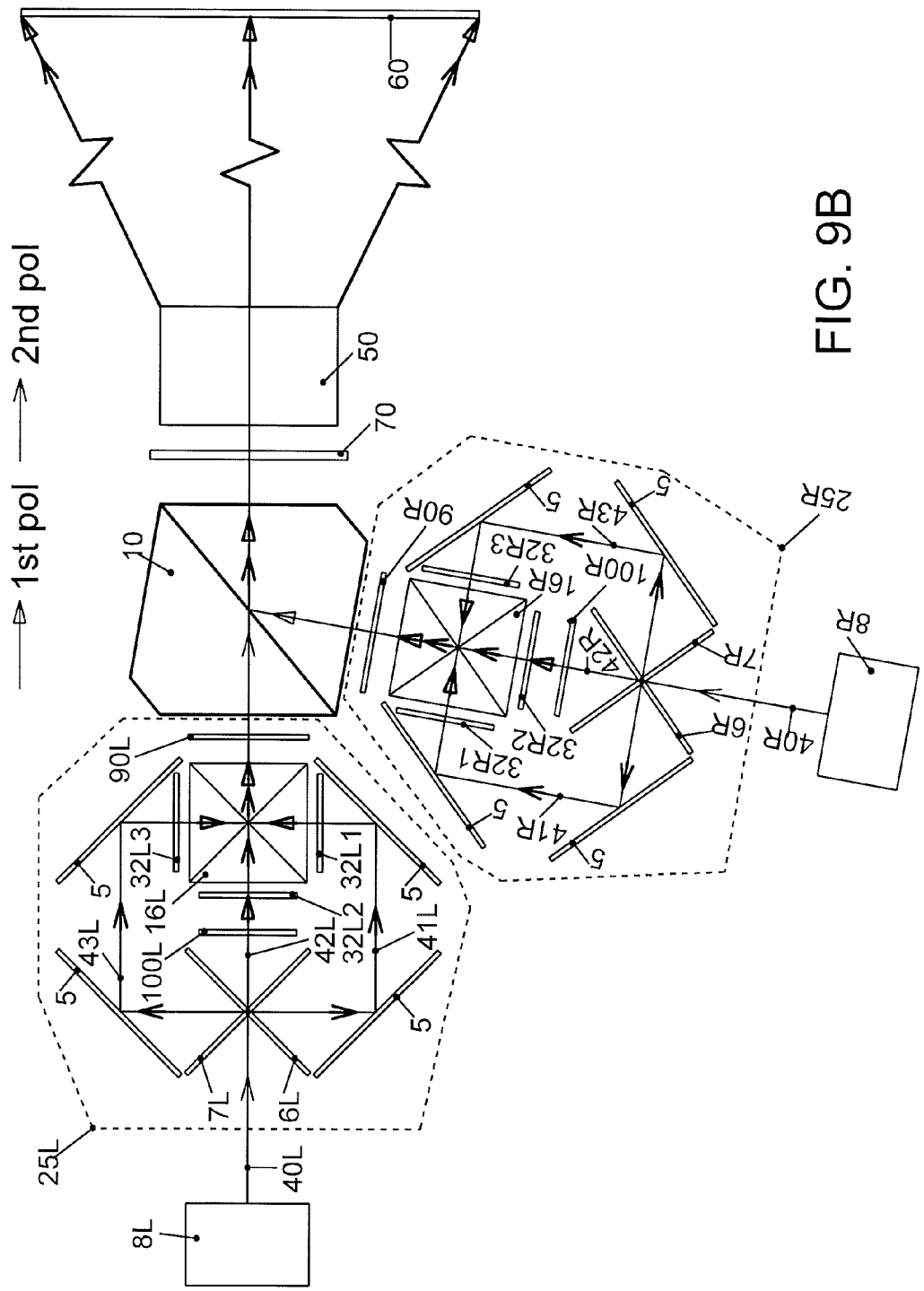
FIG. 9B is a schematic view of one of the fourth type embodiments of the projection display systems in accordance with the present invention having two illumination systems, six transmissive LCD panels, two X-cubes, a polarizing beam-splitter with central angle of incidence larger than 45° and a single projection lens.

The fourth type of the embodiments of the projection display systems in accordance with the present invention as shown in FIGS. 9A-9B, comprises of two illumination systems 8L and 8R for providing polarized light beams 40L and 40R having a first set of primary colors c1L, c2L, c3L and a second set of primary colors c1R, c2R and c3R, respectively, two imaging arms 25L and 25R, a polarizing beam-splitter 10 for combining image light, an optional waveplate 70, a projection lens 50 and an optional projection screen 60. The polarizing beam-splitter 10 reflects light in a first polarization and transmits light in a second polarization, or vice versa, the first and second polarizations are orthogonal to each other. The imaging arm 25L comprises of two dichroic filters 6L and 7L for separating color light beams; plural mirrors 5 for directing the color beams to the corresponding micro-display panels; a waveplate 100L; a first set of three transmissive micro-display panels 32L1, 32L2 and 32L3; a X-cube color combiner 16L for combining color images; and a wavelength selective polarization rotator 90L. Similarly, the imaging arm 25R also comprises of two dichroic filters 6R and 7R for separating color light beams; plural mirrors 5 for directing the color beams to the corresponding micro-display panels; a waveplate 100R; a second set of three transmissive micro-display panels 32R1, 32R2 and 32R3; a X-cube color combiner 16R for combining color images; and a wavelength selective polarization rotator 90R. In the embodiments shown in FIGS. 9A and 9B, the central angle of incidence of light at the beam-splitting surface of the polarizing beam-splitter 10 is slightly larger than 45°. Similar embodiments are possible where the polarizing beam-splitter 10 operates with a central angle of incidence of about 45° (as for example the PBS 10 shown in FIG. 8A) and also substantially larger than 45° (as for example the PBS 10 shown in FIG. 8C). Two different arrangements for dichroic filters and the mirrors are used in the embodiments shown in FIGS. 9A and 9B.

The polarizing beam-splitter 10 is selected from polarizing devices described in the preamble. The first and second polarizations can be s- and p-polarized, respectively, or vice versa. The two sets of the micro-display panels 32L1, 32L2 and 32L3, and 32R1, 32R2 and 32R3 are of the type of the transmissive micro-display panel 32 as described in the preamble. The wavelength selective polarization rotators 90L and 90R are the type of the wavelength selective polarization rotator 90 described in the preamble.

The operation of the fourth type of the embodiments in accordance with the present invention of the projection display systems is described as follows with the help of FIGS. 9A and 9B.

In the image arm 25L, light beam 40L in the second polarization from the illumination system 8L consists of the first set of three primary colors c1L, c2L and c3L, such as red, green and blue primary colors. The beam 40L is separated into three color beams 41L, 42L and 43L having colors c1L, c2L and c3L, respectively by the dichroic filters 6L and 7L. The three color beams are then directed to the associated three micro-display panels 32L1, 32L2 and 32L3 by the plural mirrors 5. In the cases of the micro-display panels 32L1 and 32L3, the panels encode images onto the output light by converting the polarization states of the incident light from the second polarization to the first polarization state for the "on" pixels; and for "off" pixels, the polarization state of the light is unchanged and thus the light is absorbed by the internal polarizers within the micro-display panels. In the case of the micro-display panel 32L2, the polarization state of the incident beam 42L is rotated from the second polarization state to the first polarization state by the waveplate 100L, the panel then encodes images on the output light by converting the polarization state of the incident light from the first polarization to the second polarization state for "on" pixels; for the "off" pixels, the polarization state of the light is unchanged and thus the light is absorbed by the internal polarizer within the micro-display panel. Therefore, the image light from the micro-display panel 32L1 is in the first polarization state with the c1L color; the image light from the micro-display panel 32L2 is in the second polarization state with the c2L color; and the image light from the micro-display panel 32L3 is in the first polarization state with the c3L color. The color X-cube 16L then combines all three image light beams into a single image light beam. In this case, preferably, the first polarization is s-polarized and the second polarization is p-polarized. The wavelength selective polarization rotator 90L selectively rotates the polarization state of the image light in colors c1L and c3L from the micro-display panel 32L1 and 32L3 from the first polarization state to the second polarization state, but keeps the polarization state of the image from micro-display panel 32L2 unchanged. Thus, the final emerging image light from the imaging arm 25L consists of three color c1L, c2L and c3L images in the second polarization state, these three color images are called the first set of color images. The final emerging image light passes through the polarizing beam-splitter 10, the optional waveplate 70, and the first set of color images are projected by the projection lens 50 onto the optional projection screen 60. Any residue light from the "off" pixels is further reduced by the polarizing beam-splitter 10 by reflecting the light out of the imaging path of the projection lens. Therefore, very high contrast images can be obtained.

Similarly, in the image arm 25R, light beam 40R in the second polarization from the illumination system 8R consists of the second set of three primary colors c1R, c2R and c3R, such as red, green and blue primary colors. The beam 40R is separated into three color beams 41R, 42R and 43R having color c1R, c2R and c3R, respectively, by the dichroic filters 6R and 7R. The three color beams are then directed to the associated three micro-display panels 32R1, 32R2 and 32R3 by the plural mirrors 5. In the cases of the micro-display panels 32R1 and 32R3, the panels encode images onto the output light by converting the polarization states of the incident light from the second polarization to the first polarization state for the "on" pixels; and for "off" pixels, the polarization state of the light is unchanged and thus the light is absorbed by the internal polarizers within the micro-display panels. In the case of the micro-display panel 32R2, the polarization state of the incident beam 42R is rotated from the second polarization state to the first polarization state by the waveplate 100R, the panel then encodes images on the output light by converting the polarization state of the incident light from the first polarization to the second polarization state for "on" pixels; for the "off" pixels, the polarization state of the light is unchanged and thus the light is absorbed by the internal polarizer within the micro-display panel. Thus, the image light from the micro-display panel 32R1 is in the first polarization state with the c1R color; the image light from the micro-display panel 32R2 is in the second polarization state with the c2R color; and the image light from the micro-display panel 32R3 is in the first polarization state with the c3R color. The color X-cube 16R then combines all three image light beams into a single image light beam. In this case, preferably, the first polarization is s-polarized and the second polarization is p-polarized. The wavelength selective polarization rotator 90R selectively rotates the polarization state of the image light in colors c2R from the micro-display panel 32R2 from the second polarization state to the first polarization state, but keeps the polarization state of the image light in colors c1R and c3R from micro-display panel 32R1 and 32R3 unchanged. Thus, the final emerging image light from the imaging arm 25R consists of three color c1R, c2R and c3R images in the first polarization state, these three color images are called the second set of color images. The final emerging image light is reflected by the polarizing beam-splitter and passes through the optional waveplate 70, and the second set of color images are projected by the projection lens 50 onto the optional projection screen 60. Any residue light from the "off" pixels is further reduced by the polarizing beam-splitter 10 by transmitting the light out of the imaging path of the projection lens. Therefore, very high contrast images can also be obtained.

The illumination systems 8L and 8R can each comprise of a lamp emitting white light such as a UHP lamp and a polarization recovery means for converting un-polarized light into polarized light. Alternatively, the illumination systems 8L and 8R can each comprise of red, green and blue, color LED light sources or lasers, or any other suitable color combinations, and a polarization recovery means only if the light sources do not emit polarized light.

The fourth type of the embodiments in accordance with the present invention can be configured to work in one or combinations of the following 2D and 3D switchable modes:

In the first 2D and 3D switchable mode of the fourth type of the embodiments described above, the 3D stereo display mode is realized by using two orthogonal polarizations for the left- and right eye-images. In this mode, a non-depolarizing projection screen is used. The first and second sets of primary colors c1L, c2L, c3L, and c1R, c2R, c3R, can be identical (or substantially similar), or different, thus, the first and second sets of images can be identical (or substantially similar), or different in colors. It is preferred to have the two sets of colors identical (or substantially similar), so that in 3D mode the left- and right-eye images are identical in colors. The first set of images from the image arm 25L having the first set of micro-display panels 32L1, 32L2 and 32L3 is in the second polarization and the second set of images from the image arm 25R having the second set of microdisplay panels 32R1, 32R2 and 32R3 is in the first polarization. If left-eye and right-eye image signals are fed to the first and second sets of micro-display panels, respectively, or vice versa, by wearing matching polarizing 3D glasses, viewers will be able to see 3D stereoscopic images on screen. In addition, if identical 2D image signals are fed to the two sets of microdisplay panels 32L1, 32L2 and 32L3 and 32R1, 32R2 and 32R3, normal 2D images are then displayed onscreen with the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of cheap polarizing 3D glasses.

In the second 2D and 3D switchable mode of the fourth type of the embodiments described above, the 3D stereo display mode is realized using two different sets of colors for the left- and right-eye images. In this mode, a non-depolarizing or an ordinary projection screen can be used. The first and second sets of primary colors c1L, c2L, c3L, and c1R, c2R, c3R, are different and occupy different wavelength regions in the wavelength spectrum, thus, the first and second sets of images are formed with different sets of primary colors. The first set of images from the image arm 25L having the first set of micro-display panels 32L1, 32L2 and 32L3 consists of only colors c1L, c2L and c3L, and the second set of images from the image arm 25R having the second set of microdisplay panels 32R1, 32R2 and 32R3 consists of only colors c1R, c2R and c3R. If left-eye and right-eye image signals are fed to the first and second sets of micro-display panels, respectively, or vice versa, by wearing matching color filter 3D glasses, viewers will be able to see 3D stereoscopic images on screen. The left- and right-eye color filter glasses match the spectrum of the corresponding image sets. The left- and right-eye glasses only allow the corresponding eye color images to pass and block the other eye color images. In addition, if identical 2D image signals are fed to the two sets of microdisplay panels 32L1, 32L2 and 32L3 and 32R1, 32R2 and 32R3, normal 2D images are then displayed onscreen with the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of ordinary screens and relatively cheap plastic projection lens which may depolarize light, in addition, low cross-talk between the left-eye and right-eye images can be obtained due to the high contrast ratios of color filter glasses.

In the third 2D and 3D switchable mode of the fourth type of the embodiments described above, the 3D stereo display mode is realized by using two orthogonal polarizations and two different sets of colors for the left- and right eye-images. In this case, a non-depolarizing projection screen or an ordinary screen is used. The first and second sets of primary colors c1L, c2L, c3L, and c1R, c2R, c3R, are different and occupy different wavelength regions in the wavelength spectrum, thus, the first and second sets of images are formed with different sets of primary colors. The first set of images from the image arm 25L having the first set of micro-display panels 32L1, 32L2 and 32L3 consist of colors c1L, c2L and c3L in the second polarization and the second set of images from the image arm 25R having the second set of microdisplay panels 32R1, 32R2 and 32R3 consists of only colors c1R, c2R and c3R in the first polarization. If left-eye and right-eye image signals are fed to the first and second sets of micro-display panels, respectively, or vice versa, and by wearing matching polarizing 3D glasses in the case where a non-depolarizing screen is used or color filter glasses in the case where a non-depolarizing screen or an ordinary screen is used, viewers will be able to see 3D stereoscopic images on screen. In addition, if identical 2D image signals are fed to the two sets of microdisplay panels 32L1, 32L2 and 32L3 and 32R1, 32R2 and 32R3, normal 2D images are then displayed onscreen with the first and second sets of the primary colors combined. Both 2D and 3D operation modes are highly light efficient. In switching from 2D to 3D mode, no light is wasted, the available light is equally shared between the left- and right-eye images. The 2D and 3D modes can be switched electronically and no hardware needs to be added or removed during switching. This operation mode is advantageous in some applications because of its flexibility in the use of screens or 3D glasses.

In the fourth 2D and 3D switchable mode of the fourth type of the embodiments described above, the 3D display mode is realized by displaying the left- and right-eye images time sequentially at a fast speed. In this mode, a non-depolarizing projection screen or an ordinary screen can be used. The first and second sets of primary colors c1L, c2L, c3L, and c1R, c2R, c3R, can be identical (or substantially similar), or different, thus, the first and second sets of images are formed with identical (or substantially similar), or different sets of primary colors. The first set of images from the image arm 25L having the first set of micro-display panels 32L1, 32L2 and 32L3 consist of colors c1L and c2L and c3L in the second polarization and the second set of images from the image arm 25R having the second set of microdisplay panels 32R1, 32R2 and 32R3 consists of only colors c1R, c2R and c3R in the first polarization. If left-eye signals are fed both to the first and second sets of micro-display panels, and then the right-eye signals are fed both to the first and second sets of micro-display panels, the switching between the left- and right-eye images are fast enough (for example, 60 frames per second), by wearing synchronized LCD shutter glasses, viewers will be able to see 3D stereoscopic images on screen. In addition, if identical 2D image signals are fed to the two sets of microdisplay panels 32L1, 32L2 and 32L3 and 32R1, 32R2 and 32R3, normal 2D images are then displayed onscreen. The 2D and 3D images consist of both the first and second set of the primary colors. The 2D and 3D modes can be switched electronically and no hardware needs to be added or removed during switching. This operation mode is advantageous in some applications because it allows the use of any type of screen.

Fifth Type of Embodiments

Figure 10:
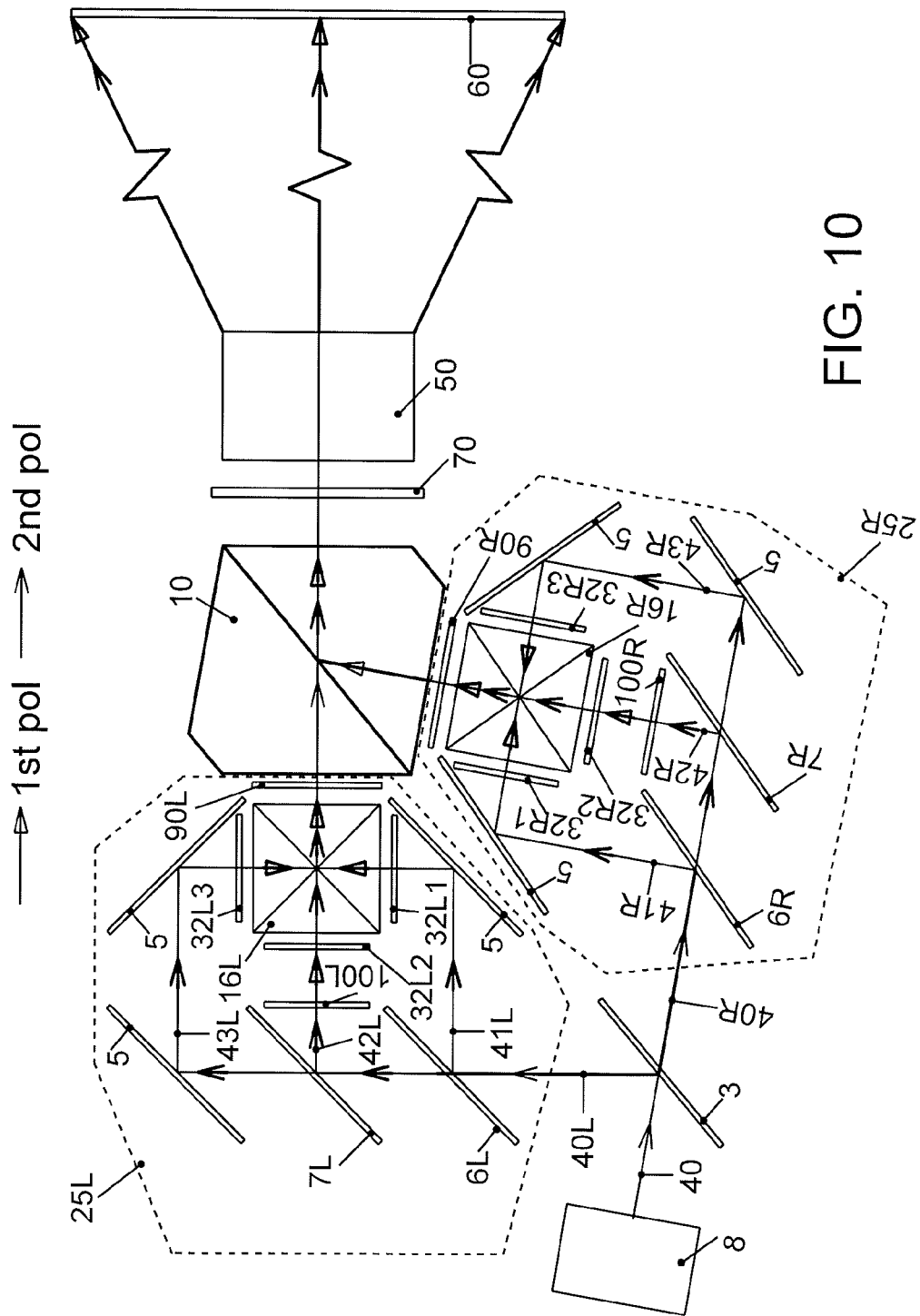
FIG. 10 is a schematic view of one of the fifth type embodiments of the projection display systems in accordance with the present invention having an illumination system, six transmissive LCD panels, two X-cubes, a polarizing beam-splitter with central angle of incidence larger than 45° and a single projection lens.

The fifth type of the embodiments of the projection display systems in accordance with the present invention as shown in FIG. 10, comprises of an illumination system 8 for providing a polarized or un-polarized light beam 40, a beam-splitter 3 for separating the polarized or un-polarized light 40 into two light beams 40L and 40R, two imaging arms 25L and 25R, a polarizing beam-splitter 10 for combining image light, an optional waveplate 70, a projection lens 50 and an optional projection screen 60. The polarizing beam-splitter 10 reflects light in a first polarization and transmits light in a second polarization, or vice versa, the first and second polarizations are orthogonal to each other. The imaging arm 25L comprises of two dichroic filters 6L and 7L for separating color light beams; plural mirrors 5 for directing the color beams to the corresponding micro-display panels; a waveplate 100L; a first set of three transmissive micro-display panels 32L1, 32L2 and 32L3; a X-cube color combiner 16L for combining color images; and a wavelength selective polarization rotator 90L. Similarly, the imaging arm 25R also comprises of two dichroic filters 6R and 7R for separating color light beams; plural mirrors 5 for directing the color beams to the corresponding micro-display panels; a waveplate 100R; a second set of three transmissive micro-display panels 32R1, 32R2 and 32R3; a X-cube color combiner 16R for combining color images; and a wavelength selective polarization rotator 90R. In the embodiment shown in FIG. 10, the central angle of incidence of light at the beam-splitting surface of the polarizing beam-splitter 10 is slightly larger than 45°. Similar embodiments are possible where the polarizing beam-splitter 10 has a central angle of incidence of about 45° and also substantially larger than 45°.

The illumination system 8 generates either polarized or non-polarized light. FIG. 10 shows the embodiment in which the illumination system 8 generates the light in the second polarization. If the illumination system 8 generates light in the first polarization, a waveplate is then used to convert light from the first polarization state to the second polarization state. If the illumination system generates un-polarized light, then the beam-splitter 3 is a polarizing beam-splitter of the type described in the preamble which reflects light in the first polarization state and transmits light in the second polarization state, or vice versa; Thus, a waveplate is required in one of the beams, either 40L or 40R, to convert the light to the desired polarization (not shown in FIG. 10).

The polarizing beam-splitter 10 is selected from polarizing devices described in the preamble. The first and second polarizations can be s- and p-polarized, respectively, or vice versa. The two sets of the micro-display panels 32L1, 32L2 and 32L3, and 32R1, 32R2 and 32R3 are the type of the transmissive micro-display panels 32 as described in the preamble. The wavelength selective polarization rotators 90L and 90R are the type of the wavelength selective polarization rotator 90 described in the preamble.

The operation of the fifth type of the embodiments in accordance with the present invention of the projection display systems is described as follows with the help of FIG. 10, assuming the light from the illumination system is in the second polarization and the polarizing beam-splitter 10 reflects light in the first polarization and transmits light in the second polarization.

In the image arm 25L, light beam 40L in the second polarization consists of the first set of three primary colors c1L, c2L and c3L, such as red, green and blue primary colors. The beam 40L is separated into three color beams 41L, 42L and 43L having colors c1L, c2L and c3L, respectively by the dichroic filters 6L and 7L. The three color beams are then directed to the associated three micro-display panels 32L1, 32L2 and 32L3 by the plural mirrors 5. In the case of the micro-display panels 32L1 and 32L3, the panels encode images onto the output light by converting the polarization states of the incident light from the second polarization to the first polarization state for the "on" pixels; and for "off" pixels, the polarization state of the light is unchanged and thus the light is absorbed by the internal polarizers within the micro-display panels. In the case of the micro-display panel 32L2, the polarization state of the incident beam 42L is rotated from the second polarization state to the first polarization state by the waveplate 100L, the panel then encodes images on the output light by converting the polarization state of the incident light from the first polarization to the second polarization state for "on" pixels; for the "off" pixels, the polarization state of the light is unchanged and thus the light is absorbed by the internal polarizer within the micro-display panel. Therefore, the image light from the micro-display panel 32L1 is in the first polarization state with the c1L color; the image light from the micro-display panel 32L2 is in the second polarization state with the c2L color; and the image light from the micro-display panel 32L3 is in the first polarization state with the c3L color. The color X-cube 16L then combines all three image light beams into a single image light beam. In this case, preferably, the first polarization is s-polarized and the second polarization is p-polarized. The wavelength selective polarization rotator 90L selectively rotates the polarization state of the image light in colors c1L and c3L from the micro-display panel 32L1 and 32L3 from the first polarization state to the second polarization state, but keeps the polarization state of the image from micro-display panel 32L2 unchanged. Thus, the final emerging image light from the imaging arm 25L consists of three color c1L, c2L and c3L images in the second polarization state, these three color images are called the first set of color images. The final emerging image light passes through the polarizing beam-splitter, the optional waveplate 70, and the first set of color images are projected by the projection lens 50 onto the optional projection screen 60. Any residue light from the "off" pixels is further reduced by the polarizing beam-splitter 10 by reflecting the light out of the imaging path of the projection lens. Therefore, very high contrast images can be obtained.

Similarly, in the image arm 25R, light beam 40R in the second polarization consists of the second set of three primary colors c1R, c2R and c3R, such as red, green and blue primary colors. The beam 40R is separated into three color beams 41R, 42R and 43R having color c1R, c2R and c3R, respectively, by the dichroic filters 6R and 7R. The three color beams are then directed to the associated three micro-display panels 32R1, 32R2 and 32R3 by the plural mirrors 5. In the cases of the micro-display panels 32R1 and 32R3, the panels encode images onto the output light by converting the polarization states of the incident light from the second polarization to the first polarization state for the "on" pixels; and for "off" pixels, the polarization state of the light is unchanged and thus the light is absorbed by the internal polarizers within the micro-display panels. In the case of the micro-display panel 32R2, the polarization state of the incident beam 42R is rotated from the second polarization state to the first polarization state by the waveplate 100R, the panel then encodes images on the output light by converting the polarization state of the incident light from the first polarization to the second polarization state for "on" pixels; for the "off" pixels, the polarization state of the light is unchanged and thus the light is absorbed by the internal polarizer within the micro-display panel. Thus, the image light from the micro-display panel 32R1 is in the first polarization state with the c1R color; the image light from the micro-display panel 32R2 is in the second polarization state with the c2R color; and the image light from the micro-display panel 32R3 is in the first polarization state with the c3R color. The color X-cube 16R then combines all three image light beams into a single image light beam. In this case, preferably, the first polarization is s-polarized and the second polarization is p-polarized. The wavelength selective polarization rotator 90R selectively rotates the polarization state of the image light in colors c2R from the micro-display panel 32R2 from the second polarization state to the first polarization state, but keeps the polarization state of the image light in colors c1R and c3R from micro-display panel 32R1 and 32R3 unchanged. Thus, the final emerging image light from the imaging arm 25R consists of three color c1R, c2R and c3R images in the first polarization state, these three color images are called the second set of color images. The final emerging image light is reflected by the polarizing beam-splitter and passes through the optional waveplate 70, and the second set of color images are projected by the projection lens 50 onto the optional projection screen 60. Any residue light from the "off" pixels is further reduced by the polarizing beam-splitter 10 by transmitting the light out of the imaging path of the projection lens. Therefore, very high contrast images can also be obtained.

The illumination system 8 can comprise of a lamp emitting white light such as a UHP lamp, alternatively, the illumination system 8 can comprise of red, green and blue color LED light sources or lasers. In the case where the beam-splitter 3 is a polarizing beam-splitter, no polarization recovery means is required within the illumination system. Otherwise, a polarization recovery means is part of the illumination system if the light sources do not emit polarized light.

The fifth type of the embodiments in accordance with the present invention can be configured to work in one or combinations of the following 2D and 3D switchable modes.

In the first 2D and 3D switchable mode of the fifth type of the embodiments described above, the 3D stereo display mode is realized by using two orthogonal polarizations for the left- and right eye-images. In this mode, a non-depolarizing projection screen is used. In addition, the beam-splitter 3 is a 50/50 beam-splitter which transmits and reflects equally about 50% of incident light. The first and second sets of primary colors c1L, c2L, c3L, and c1R, c2R, c3R are substantially similar. The first set of images from the image arm 25L having the first set of micro-display panels 32L1, 32L2 and 32L3 is in the second polarization and the second set of images from the image arm 25R having the second set of microdisplay panels 32R1, 32R2 and 32R3 is in the first polarization. If left-eye and right-eye image signals are fed to the first and second sets of micro-display panels, respectively, or vice versa, by wearing matching polarizing 3D glasses, viewers will be able to see 3D stereoscopic images on screen. In addition, if identical 2D image signals are fed to the two sets of microdisplay panels 32L1, 32L2 and 32L3 and 32R1, 32R2 and 32R3, normal 2D images are then displayed onscreen with the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of cheap polarizing 3D glasses.

In the second 2D and 3D switchable mode of the fifth type of the embodiments described above, the 3D stereo display mode is realized using two different sets of colors for the left- and right-eye images. In this mode, a non-depolarizing or an ordinary projection screen can be used. In addition, the beam-splitter 3 reflects light of a first set of primary colors c1L, c2L and c3L and transmits light of a second set of primary colors c1R, c2R and c3R. The first and second sets of primary colors c1L, c2L, c3L, and c1R, c2R, c3R, are different and occupy different wavelength regions in the wavelength spectrum, thus, the first and second sets of images are formed with different sets of primary colors. The first set of images from the image arm 25L having the first set of micro-display panels 32L1, 32L2 and 32L3 consists of only colors c1L, c2L and c3L, and the second set of images from the image arm 25R having the second set of microdisplay panels 32R1, 32R2 and 32R3 consists of only colors c1R, c2R and c3R. If left-eye and right-eye image signals are fed to the first and second sets of micro-display panels, respectively, or vice versa, by wearing matching color filter 3D glasses, viewers will be able to see 3D stereoscopic images on screen. The left- and right-eye color filter glasses match the spectrum of the corresponding image sets. The left- and right-eye glasses only allow the corresponding eye color images to pass and block the other eye color images. In addition, if identical 2D image signals are fed to the two sets of microdisplay panels 32L1, 32L2 and 32L3 and 32R1, 32R2 and 32R3, normal 2D images are then displayed onscreen with the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of ordinary screens and relatively cheap plastic projection lens which may depolarize light, in addition, low cross-talk between the left-eye and right-eye images can be obtained due to the high contrast ratios of color filter glasses.

In the third 2D and 3D switchable mode of the fifth type of the embodiments described above, the 3D stereo display mode is realized by using two orthogonal polarizations and two different sets of colors for the left- and right eye-images. In this case, a non-depolarizing projection screen or an ordinary screen is used. The first and second sets of primary colors c1L, c2L, c3L, and c1R, c2R, c3R, are different and occupy different wavelength regions in the wavelength spectrum, thus, the first and second sets of images are formed with different sets of primary colors. In addition, the beam-splitter 3 reflects light of a first set of primary colors c1L, c2L and c3L and transmits light of a second set of primary colors c1R, c2R and c3R. The first set of images from the image arm 25L having the first set of micro-display panels 32L1, 32L2 and 32L3 consist of colors c1L and c2L and c3L in the second polarization and the second set of images from the image arm 25R having the second set of microdisplay panels 32R1, 32R2 and 32R3 consists of only colors c1R, c2R and c3R in the first polarization. If left-eye and right-eye image signals are fed to the first and second sets of micro-display panels, respectively, or vice versa, and by wearing matching polarizing 3D glasses in the case where a non-depolarizing screen is used or color filter glasses in the case where a non-depolarizing screen or an ordinary screen is used, viewers will be able to see 3D stereoscopic images on screen. In addition, if identical 2D image signals are fed to the two sets of microdisplay panels 32L1, 32L2 and 32L3 and 32R1, 32R2 and 32R3, normal 2D images are then displayed onscreen with the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because of its flexibility in the use of screens or 3D glasses.

In the fourth 2D and 3D switchable mode of the fifth type of the embodiments described above, the 3D display mode is realized by displaying the left- and right-eye images time sequentially at a fast speed. In this mode, a non-depolarizing projection screen or an ordinary screen can be used. In addition, the beam-splitter 3 is a 50/50 beam-splitter which transmits and reflects equally about 50% of incident light. Preferably, the first and second sets of primary colors c1L, c2L, c3L, and c1R, c2R, c3R are substantially similar. The first set of images from the image arm 25L having the first set of micro-display panels 32L1, 32L2 and 32L3 consist of colors c1L and c2L and c3L in the second polarization and the second set of images from the image arm 25R having the second set of microdisplay panels 32R1, 32R2 and 32R3 consists of only colors c1R, c2R and c3R in the first polarization. If left-eye signals are fed both to the first and second sets of microdisplay panels, and then the right-eye signals are fed both to the first and second sets of micro-display panels, the switching between the left- and right-eye images are fast enough (for example, 60 frames per second), by wearing synchronized LCD shutter glasses, viewers will be able to see 3D stereoscopic images on screen. In addition, if identical 2D image signals are fed to the two sets of microdisplay panels 32L1, 32L2 and 32L3, and 32R1, 32R2 and 32R3, normal 2D images are then displayed onscreen. The 2D and 3D images consist of both the first and second set of the primary colors. The 2D and 3D modes can be switched electronically and no hardware needs to be added or removed during switching. This operation mode is advantageous in some applications because it allows the use of any type of screen.

Sixth Type of Embodiments

The sixth type of the embodiments of the projection display systems in accordance with the present invention as shown in FIGS. 11A-11D, comprises of an illumination system 8 or three illumination systems 8a, 8b and 8c; plural mirrors 5; three sets of polarizing image combiners 26a, 26b and 26c; a color combining prism 16 for combining image light, an optional waveplate 70, a projection lens 50 and an optional projection screen 60. In the embodiments shown in FIGS. 11A, and 11C, three separate illumination systems 8a, 8b and 8c are used which provides three color beams 40a, 40b and 40c having colors c1, c2 and c2, respectively. In the embodiments shown in FIGS. 11B and 11D, only one illumination system 8 is used which provides the light beam 40 that is subsequently separated into three color beams 40a, 40b and 40c by two dichroic color filters 6 and 7. The color beams 40a, 40b and 40c also have colors c1, c2 and c3, respectively. The polarizing image combiner 26a comprises of a polarizing beam-splitter 10a and two reflective micro-display panels 30L1 and 30R1. Similarly, the polarizing image combiner 26b comprises of a polarizing beam-splitter 10b and two reflective micro-display panels 30L2 and 30R2. Also, the polarizing image combiner 26c comprises of a polarizing beam-splitter 10c and two reflective micro-display panels 30L3 and 30R3.

Figure 11A:
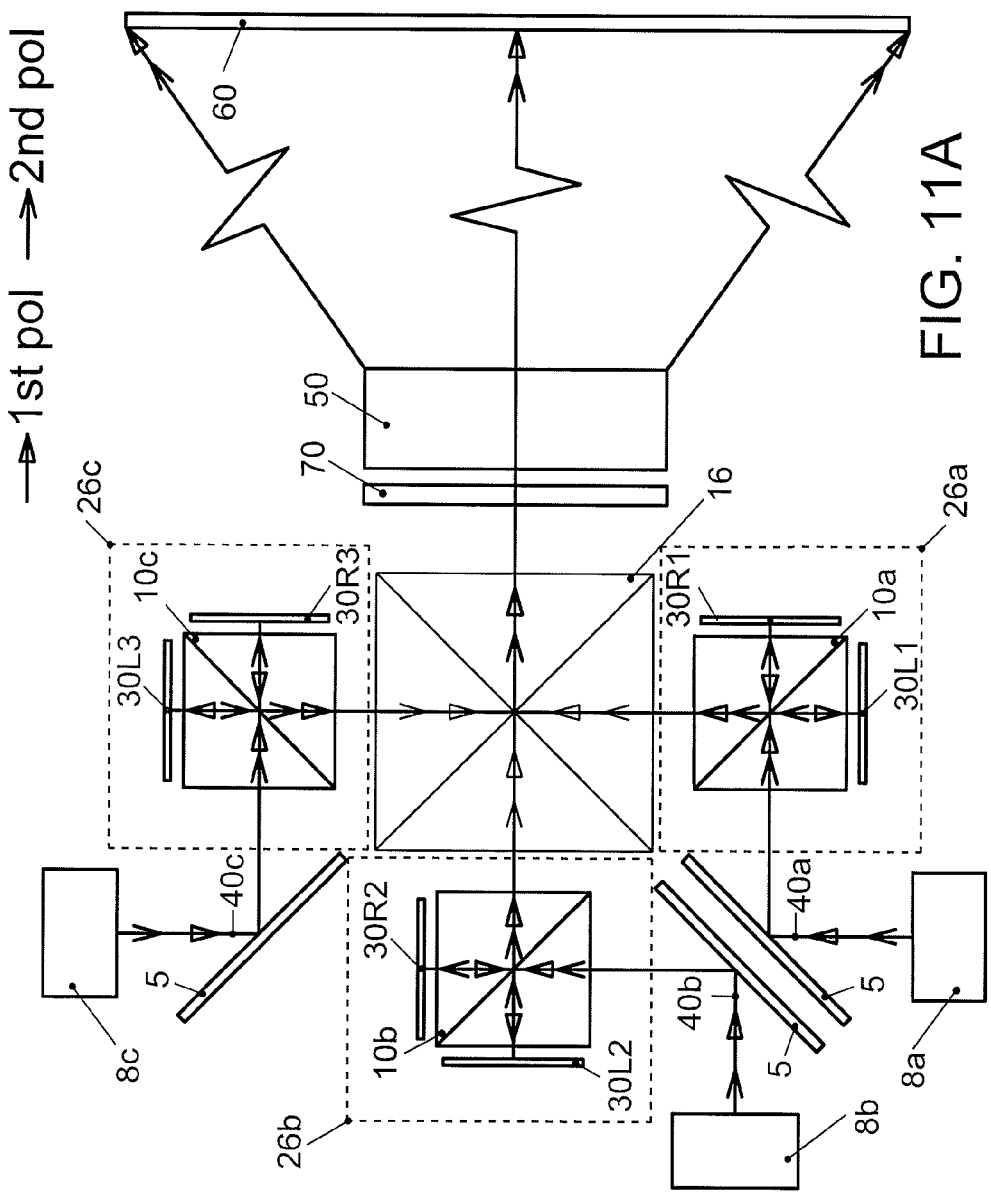
FIG. 11A is a schematic view of one of the sixth type embodiments of the projection display systems in accordance with the present invention having three illumination systems, six reflective LCOS or MEM panels, an X-cube, three polarizing beam-splitters with the central angle of incidence on the beam-splitter surface about 45°, and a single projection lens.
Figure 11B:
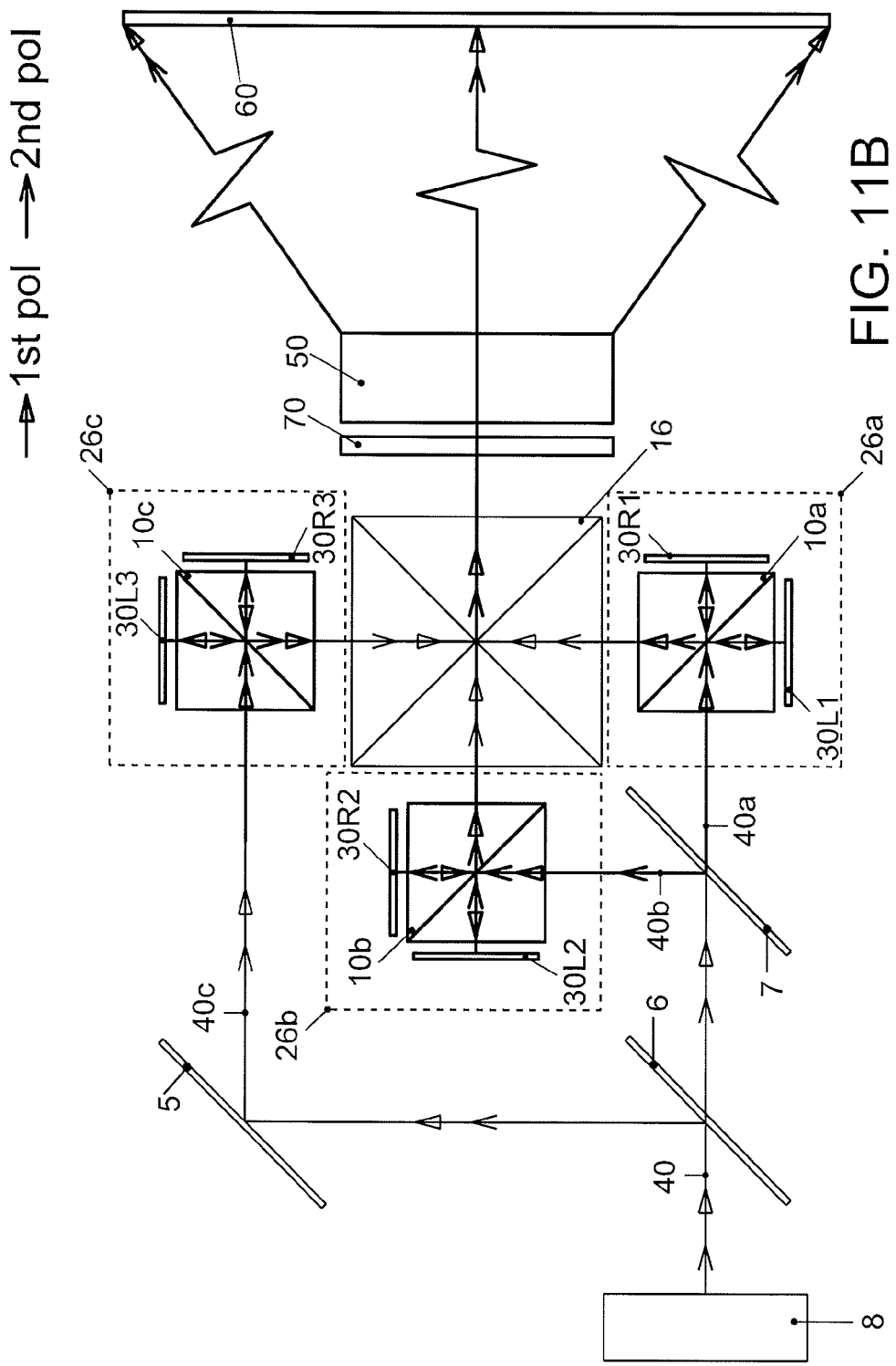
FIG. 11B is a schematic view of one of the sixth type embodiments of the projection display systems in accordance with the present invention having an illumination system, six reflective LCOS or MEM panels, an X-cube, three polarizing beam-splitters with the central angle of incidence on the beam-splitter surface about 45°, and a single projection lens.
Figure 11C:
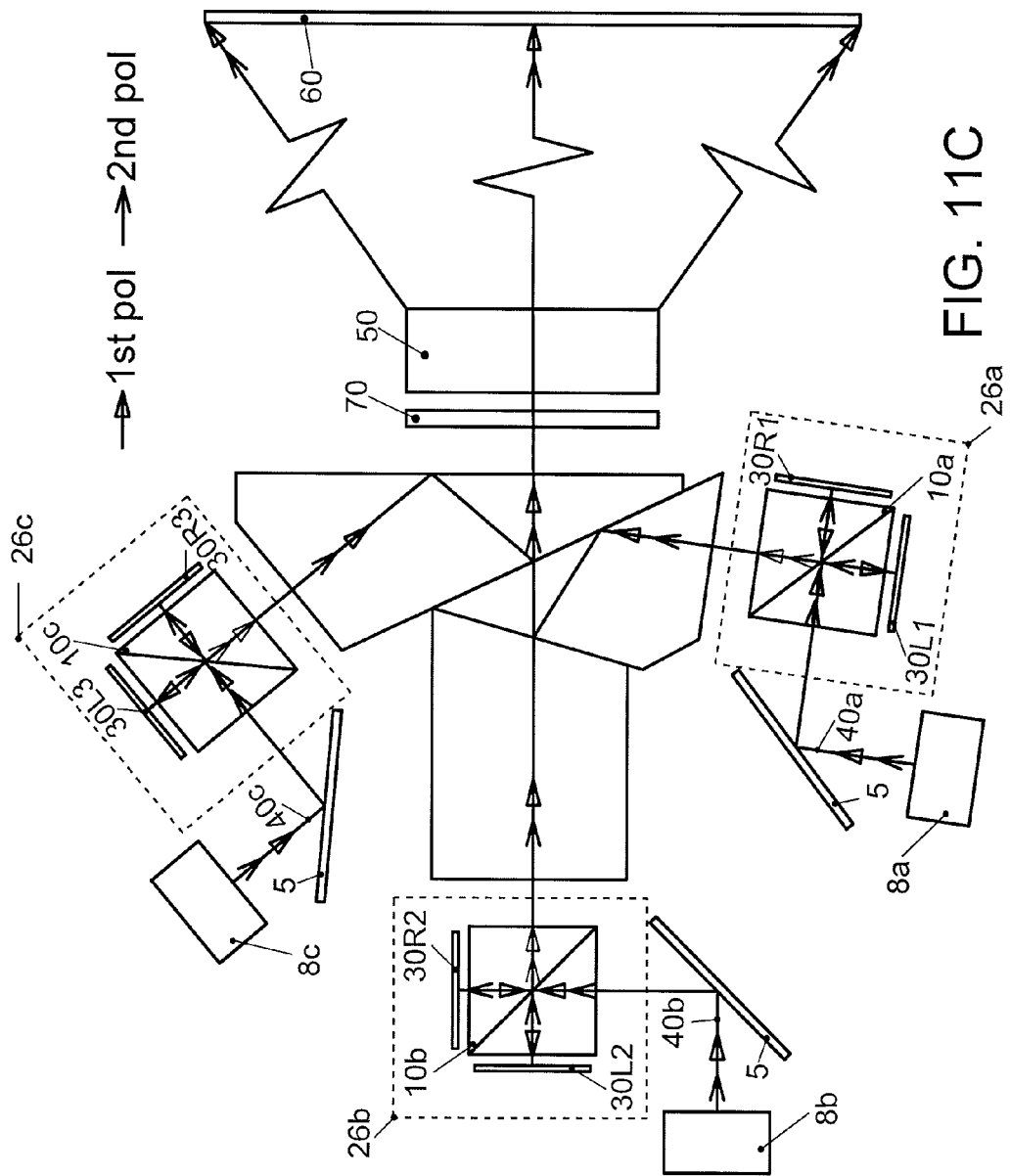
FIG. 11C is a schematic view of one of the sixth type embodiments of the projection display systems in accordance with the present invention having three illumination systems, six reflective LCOS or MEM panels, a Philips prism, three polarizing beam-splitters with the central angle of incidence on the beam-splitter surface about 45°, and a single projection lens.

In the case where three illumination systems 8a, 8b and 8c are used as shown in the embodiments in FIGS. 11A and 11C, preferably, the light sources comprise of color LEDs or lasers. In the case where a single illumination system 8 is used as shown in the embodiments in FIGS. 11B and 11D, preferably, the illumination system comprises of a white light source, such as an UHP lamp.

In the embodiments shown in FIGS. 11A and 11B, the color combiner 16 is an X-cube which transmits c2 color and reflects c1 and c3 colors; in the embodiments shown in FIGS. 11C and 11D, the color combiner 16 is a Philips prism which also transmits c2 color and reflects c1 and c3 colors.

The reflective micro-displays panels 30L1, 30R1, 30L2, 30R2, 30L3, 30R3 are described in the preamble as reflective micro-display panel 30. They can be LCOS panels with additional waveplates for compensating geometry depolarization.

They can also be MEM panels with additional waveplates for rotating the polarization state of incident light by 90°; in addition, optional waveplates can be used as parts of the panels to compensate geometry depolarization.

The polarizing beam-splitters 10a, 10b and 10c are selected from the types of the polarizing beam-splitters 10 described in the preamble that reflect light in a first polarization and transmits light in a second polarization, or vice versa, the first and second polarizations are orthogonal to each other. The first and second polarizations can be s- and p-polarized, or vice versa. In the embodiments shown in FIGS. 11A-11D the central angle of incidence of the polarizing beam-splitters 10a, 10b and 10c is about 45°. Other similar embodiments to each of the embodiments shown in FIGS. 11A-11D are possible where the central angle of incidence of the polarization beam-splitters 10a, 10b and 10c are each slightly larger than 45° and also each substantially larger than 45°. The three polarizing beam-splitters 10a, 10b and 10c can be identical and operate over a large band of wavelengths covering colors c1, c2 and c3, or they can be different, and only operate at the specific band of wavelengths such as c1, c2 and c3, respectively.

The operation of the sixth type of the embodiments in accordance with the present invention of the projection display systems is described as follows with the help of FIGS. 11A-11D.

In the first set of the polarizing image combiner 26a, the un-polarized light beam 40a from the illumination system consists of light both in the first and second polarization states. The polarizing beam-splitter 10a reflects the light in the first polarization towards the micro-display panel 30L1 and transmits the light in the second polarization towards the micro-display panel 30R1. The reflective micro-display panels 30L1 and 30R1 encode images onto the output light by rotating the polarization state of the "on" pixel light by 90°, from the first polarization state to the second polarization state in the case of the micro-display panel 30L1; and from the second polarization state to the first polarization state in the case of the micro-display panel 30R1. Therefore, the image light from the two micro-display panels 30L1 and 30R1 are in the second and first polarization states, respectively. The polarizing beam-splitter 10a then combines the image light and directs the image light to the color combiner 16. In the case of the micro-display panels 30L1 and 30R1 are LCOS panels, the "off" pixels do not change the polarization state of incident light, thus the reflected "off" light from both the micro-display panels 30L1 and 30R1 are sent back by the polarizing beam-splitter 10a along the direction of the light source. In the case of the micro-display panels 30L1 and 30R1 are MEM panels, the "off" pixels reflect the incident light at different direction from the "on" pixel light, the reflected "off" light is absorbed by a light absorber and it does not reach to the color combiner 16.

Similarly, in the second set of the polarizing image combiner 26b, the un-polarized light beam 40b from the illumination system consists of light both in the first and second polarization states. The polarizing beam-splitter 10b reflects the light in the first polarization towards the micro-display panel 30L2 and transmits the light in the second polarization towards the micro-display panel 30R2. The reflective micro-display panels 30L2 and 30R2 encode images onto the output light by rotating the polarization state of the "on" pixel light by 90°, from the first polarization state to the second polarization state in the case of the micro-display panel 30L2; and from the second polarization state to the first polarization state in the case of the micro-display panel 30R2. Therefore, the image light from the two micro-display panels 30L2 and 30R2 are in the second and first polarization states, respectively. The polarizing beam-splitter 10b then combines the image light and directs the image light to the color combiner 16. In the case where the micro-display panels 30L2 and 30R2 are LCOS panels, the "off" pixels do not change the polarization state of incident light, thus the reflected "off" light from both the micro-display panels 30L2 and 30R2 are sent back by the polarizing beam-splitter 10a along the direction of the light source. In the case where the micro-display panels 30L2 and 30R2 are MEM panels, the "off" pixels reflect the incident light at different direction from the "on" pixel light, the reflected "off" light is absorbed by a light absorber and it does not reach to the color combiner 16.

Also, in the third set of the polarizing image combiner 26c, the un-polarized light beam 40c from the illumination system consists of light both in the first and second polarization states. The polarizing beam-splitter 10c reflects the light in the first polarization towards the micro-display panel 30L3 and transmits the light in the second polarization towards the micro-display panel 30R3. The reflective micro-display panels 30L3 and 30R3 encode images onto the output light by rotating the polarization state of the incident light for the "on" pixel light by 90°, from the first polarization state to the second polarization state in the case of the micro-display panel 30L3; and from the second polarization state to the first polarization state in the case of the micro-display panel 30R3. Therefore, the image light from the two micro-display panels 30L3 and 30R3 are in the second and first polarization states, respectively. The polarizing beam-splitter 10c then combines the image light and directs the image light to the color combiner 16. In the case where the micro-display panels 30L3 and 30R3 are LCOS panels, the "off" pixels do not change the polarization state of incident light, thus the reflected "off" light from both the micro-display panels 30L3 and 30R3 are sent back by the polarizing beam-splitter 10a along the direction of the light source. In the case where the micro-display panels 30L3 and 30R3 are MEM panels, the "off" pixels reflect the incident light at different direction from the "on" pixel light, the reflected "off" light is absorbed by a light absorber and it does not reach to the color combiner 16.

The color combiner 16 combines the color image light from the polarizing image combiners 26a, 26b and 26c. The combined image light then passes through the optional waveplate 70 which can convert linear polarized light into circular polarized light that can be advantageous. The projection lens 50 then project the images onto the optional screen 60. The X-cube prism may be preferred when image light c1, c2 and c3 each consists of a narrow range of wavelengths such as light from LEDs and lasers while the Philips prism is preferred when image light c1, c2 and c3 each consists of a relatively broadband of wavelengths. The colors c1, c2 and c3 can be red, green and blue, or any suitable primary color combinations.

In the sixth type of the embodiments in accordance with the present invention of the projection display systems, the images from the micro-display panels 30L1, 30L2 and 30L3 are in the second polarization state, they form the first set of primary color images. Therefore, the micro-display panels 30L1, 30L2 and 30L3 are called the first set of micro-display panels. Similarly, the image light from the micro-display panels 30R1, 30R2 and 30R3 is in the first polarization state, they form the second set of primary color images. Therefore, the micro-display panels 30R1, 30R2 and 30R3 are called the second set of micro-display panels.

The sixth type of the embodiments in accordance with the present invention can be configured to work in one or combinations of the following 2D and 3D switchable modes.

In the first 2D and 3D switchable mode of the sixth type of the embodiments described above, the 3D stereo display mode is realized by using two orthogonal polarizations for the left- and right eye-images. In this mode, a non-depolarizing projection screen is used. The first set of color images from the first set of micro-display panels 30L1, 30L2 and 30L3 is in the second polarization, and the second set of color images from the second set of microdisplay panels 30R1, 30R2 and 30R3 are in the first polarization. If left-eye and right-eye image signals are fed to the first and second sets of microdisplay panels, respectively, or vice versa, by wearing matching polarizing 3D glasses, viewers will be able to see 3D stereoscopic images on screen. In addition, if identical 2D image signals are fed to the two sets of microdisplay panels 30L1, 30L2 and 30L3, and 30R1, 30R2 and 30R3, normal 2D images are then displayed onscreen. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of cheap polarizing 3D glasses.

In the second 2D and 3D switchable mode of the seventh type of the embodiments described above, the 3D display mode is realized by displaying the left- and right-eye images time sequentially at a fast speed. In this mode, a non-depolarizing projection screen or an ordinary screen can be used. The first set of color images from the first set of micro-display panels 30L1, 30L2 and 30L3 are in the second polarization state, and the second set of color images from the second set of microdisplay panels 30R1, 30R2 and 30R3 are in the first polarization state. If left-eye signals are fed both to the first and second sets of micro-display panels, and then the right-eye signals are fed both to the first and second sets of micro-display panels, the switching between the left- and right-eye images are fast enough (for example, 60 frames per second), by wearing synchronized LCD shutter glasses, viewers will be able to see 3D stereoscopic images on screen. In addition, if identical 2D image signals are fed to the two sets of microdisplay panels 30L1, 30L2 and 30L3, and 30R1, 30R2 and 30R3, normal 2D images are then displayed onscreen. The 2D and 3D modes can be switched electronically and no hardware needs to be added or removed during switching. This operation mode is advantageous in some applications because it allows the use of any type of screen.

There are variations of the sixth type of the embodiments, in which the illumination systems 8 or 8a, 8b and 8c, and the image combining devices 26a, 26b and 26c can be arranged to allow the three color beams 40a, 40b and 40c perpendicular to the plane of the drawing paper surface, instead of within the plane of the drawing paper surface. These variations are useful when available space is limited. The operation of these variations is similar to the above sixth type of the embodiments with some minor modifications.

Seventh Type of Embodiments

The seventh type of the embodiments of the projection display systems in accordance with the present invention as shown in FIGS. 12A-12D, comprises of an illumination system 8 or three illumination systems 8a, 8b and 8c; plural mirrors 5; three optional clean-up polarizers 35a, 35b and 35c; three sets of polarizing image combiners 26a, 26b and 26c; a color combining prism 16 for combining image light, an optional wavelength selective polarization rotator 90, an optional waveplate 70, a projection lens 50 and an optional projection screen 60. In the embodiments shown in FIGS. 12A and 12C, three separate illumination systems 8a, 8b and 8c are used which provide three polarized color beams 40a, 40b and 40c having colors c1, c2 and c2, respectively. In the embodiments shown in FIGS. 12B and 12D, only one illumination system 8 is used which provides the polarized light 40 that is subsequently separated into three polarized color beams 40a, 40b and 40c by two dichroic color filters 6 and 7. The color beams 40a, 40b and 40c also have colors c1, c2 and c3, respectively. The polarizing image combiner 26a comprises of an optional polarizer 35a, a wavelength selective polarization rotator 90a1, a polarizing beam-splitter 10a, two reflective micro-display panels 30L1 and 30R1 and an optional wavelength selective polarization rotator 90a2. Similarly, the polarizing image combiner 26b comprises of an optional polarizer 35b, a wavelength selective polarization rotator 90b1, a polarizing beam-splitter 10b, two reflective micro-display panels 30L2 and 30R2 and an optional wavelength selective polarization rotator 90b2. Also, the polarizing image combiner 26c comprises of an optional polarizer 35c, a wavelength selective polarization rotator 90c1, a polarizing beam-splitter 10c, two reflective micro-display panels 30L3 and 30R3 and an optional wavelength selective polarization rotator 90c2.

Figure 12A:
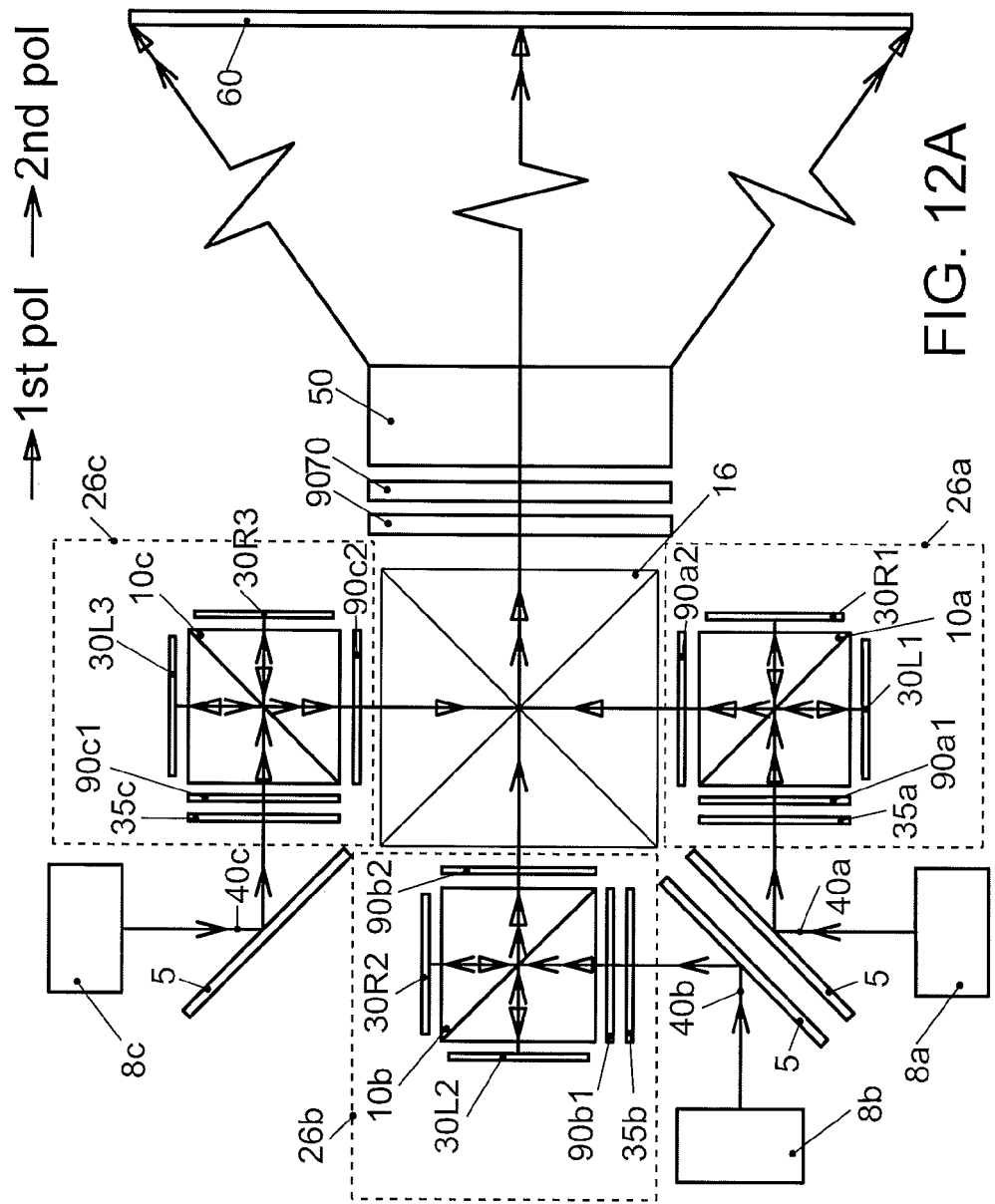
FIG. 12A is a schematic view of one of the seventh type embodiments of the projection display systems in accordance with the present invention having three illumination systems, six reflective LCOS or MEM panels, an X-cube, three polarizing beam-splitters with the central angle of incidence on the beam-splitter surface about 45°, and a single projection lens.
Figure 12B:
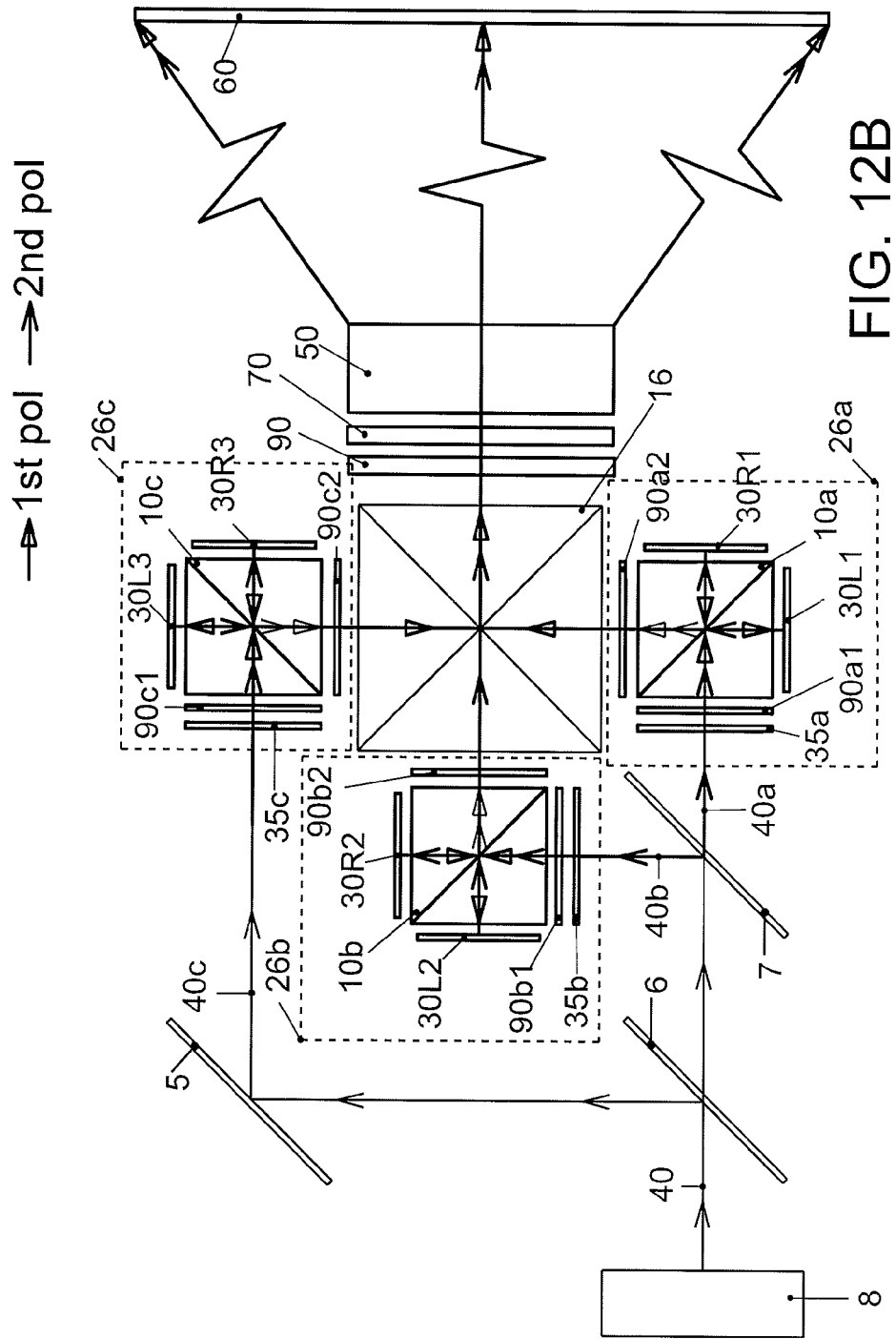
FIG. 12B is a schematic view of one of the seventh type embodiments of the projection display systems in accordance with the present invention having an illumination system, six reflective LCOS or MEM panels, an X-cube, three polarizing beam-splitters with the central angle of incidence on the beam-splitter surface about 45°, and a single projection lens.
Figure 12C:
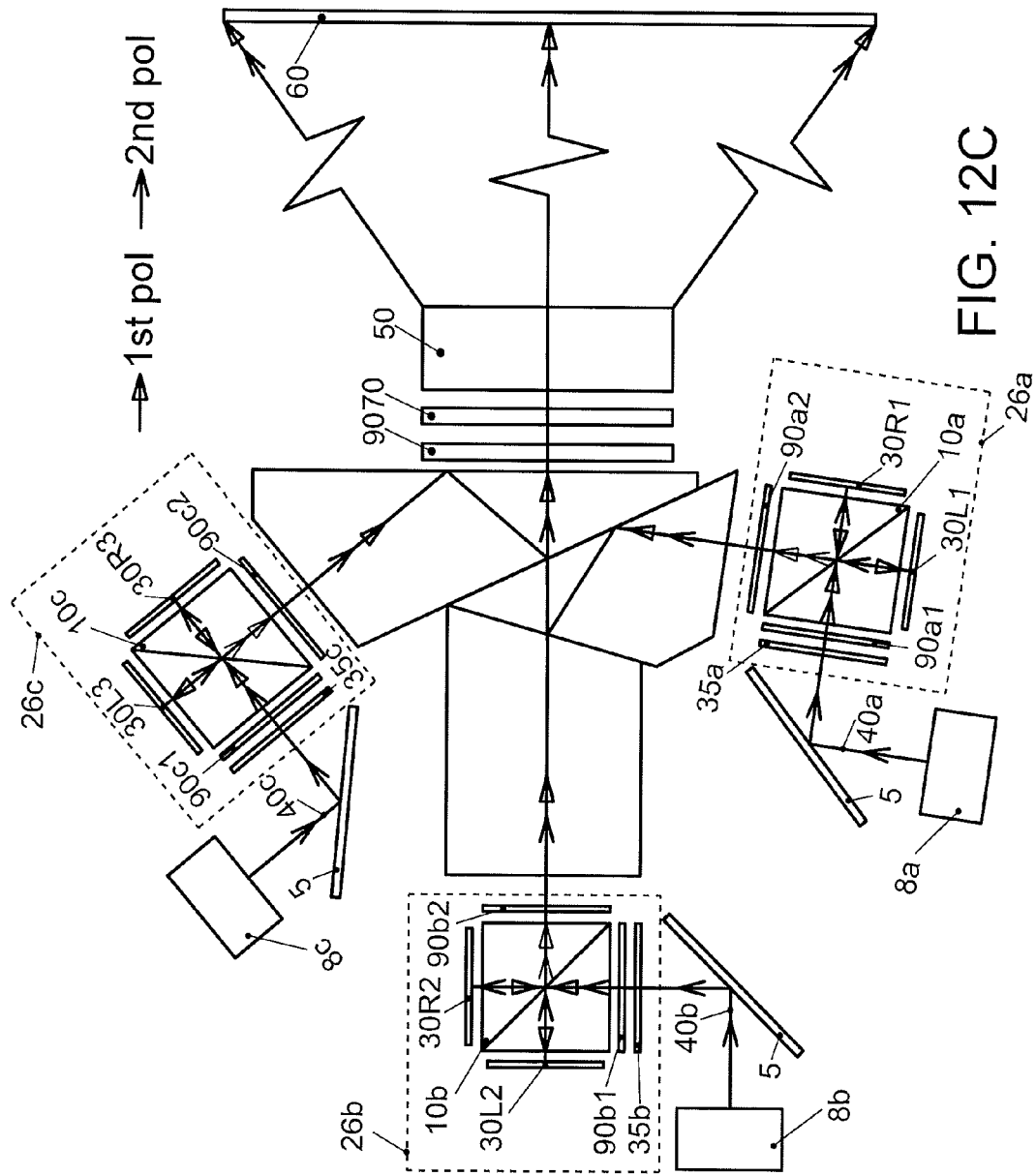
FIG. 12C is a schematic view of one of the seventh type embodiments of the projection display systems in accordance with the present invention having three illumination systems, six reflective LCOS or MEM panels, a Philips prism, three polarizing beam-splitters with the central angle of incidence on the beam-splitter surface about 45°, and a single projection lens.

In the case where three illumination systems 8a, 8b and 8c are used as shown in the embodiments in FIGS. 12A and 12C, preferably, the light sources comprise of color LEDs or lasers. In the case where a single illumination system 8 is used as shown in the embodiments in FIGS. 12B and 12D, preferably, the illumination system comprises of a white light source, such as an UHP lamp. Also, polarization recovery means in the illumination systems are used to convert un-polarized light from the light sources to polarized light, if the light sources do not emit polarized light. Although the light from illumination systems 8a, 8b and 8c or 8 can be either in the first or second polarization state, for the simplicity of the following descriptions, the second polarization is assumed as shown in the FIGS. 12A-12D.

The colors c1, c2 and c3 can be red, green and blue, or any suitable primary color combinations. In addition, color c1 consists of two sub-colors c1L and c1R. The two sub-colors are similar in color appearance, for example, both in the red spectrum of the visible, but have different wavelength regions in the wavelength spectrum. Similarly, color c2 consists of two sub-colors c2L and c2R which are similar but have different wavelength regions in the wavelength spectrum. Also, color c3 consists of two sub-colors c3L and c3R which are similar but have different wavelength regions in the wavelength spectrum. Colors c1L, c2L, c3L form a first set of primary colors, and colors c1R, c2R and c3R form a second set of primary colors. The first and second sets of the primary colors c1L, c2L, c3L, and c1R, c2R, c3R are different and occupy different wavelength regions in the wavelength spectrum.

Figure 12D:
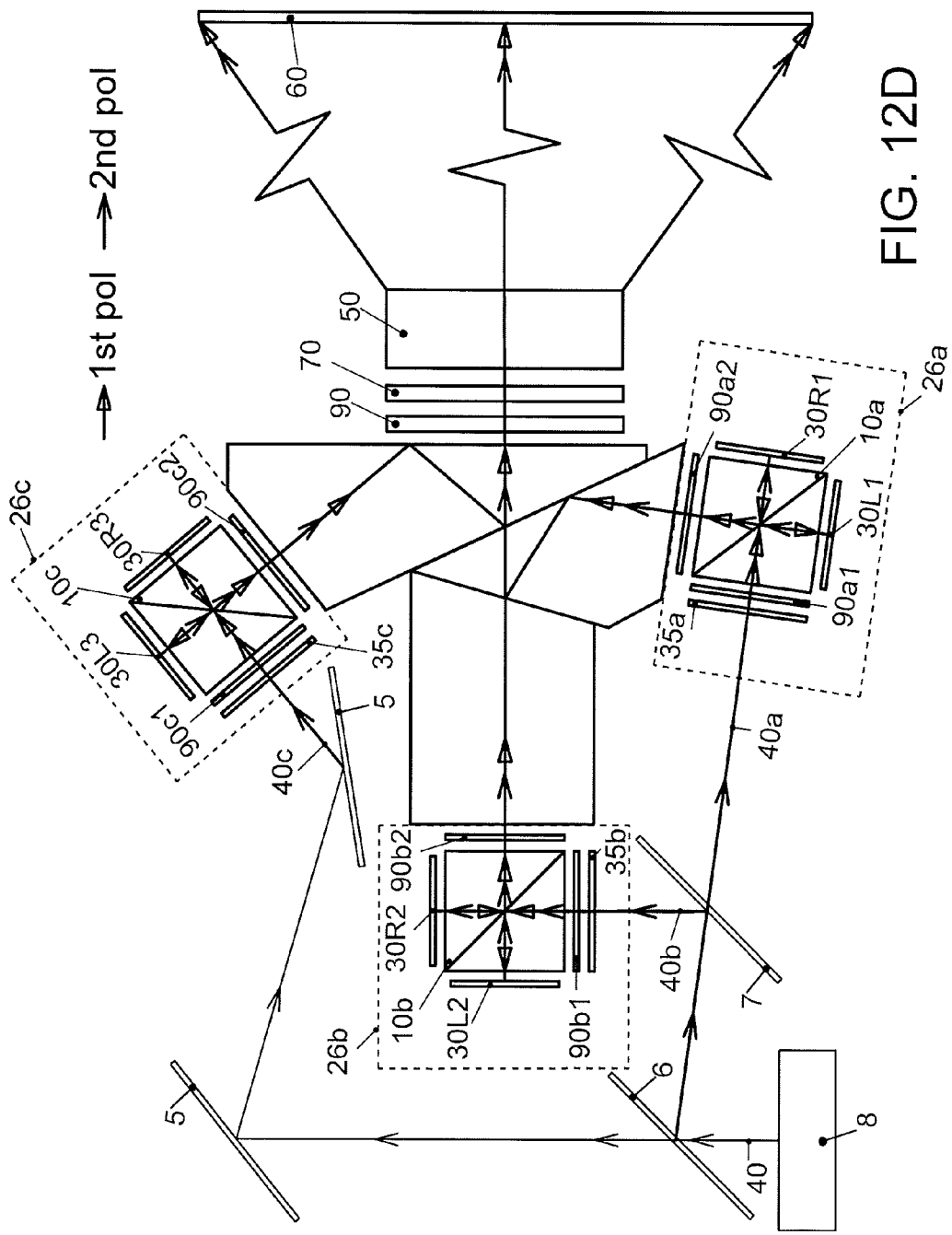
FIG. 12D is a schematic view of one of the seventh type embodiments of the projection display systems in accordance with the present invention having an illumination system, six reflective LCOS or MEM panels, a Philips prism, three polarizing beam-splitters with the central angle of incidence on the beam-splitter surface about 45°, and a single projection lens.

In the embodiments shown in FIGS. 12A and 12B, the color combiner 16 is an X-cube which transmits c2 color and reflects c1 and c3 colors; in the embodiments shown in FIGS. 12C and 12D, the color combiner 16 is a Philips prism which also transmits c2 color and reflects c1 and c3 colors. The Philips prism is preferred when image light c1, c2 and c3 each consists of light in both the first and second polarizations.

The reflective micro-displays panels 30L1, 30R1, 30L2, 30R2, 30L3, 30R3 are described in the preamble as reflective micro-display panel 30. They can be LCOS panels with additional waveplates for compensating geometry depolarization. They can also be MEM panels with additional waveplates for rotating the polarization state of incident light by 90°; in addition, optional waveplates can be used as parts of the panels to compensate geometry depolarization.

The polarizing beam-splitters $10a$, $10b$ and $10c$ are selected from the types of the polarizing beam-splitters 10 described in the preamble that reflect light in a first polarization and transmits light in a second polarization, or vice versa, the first and second polarizations are orthogonal to each other. The first and second polarizations can be s- and p-polarized, or vice versa. In the embodiments shown in FIGS. 12A-12D the central angle of incidence of the polarizing beam-splitters $10a$, $10b$ and $10c$ is about 45°. Other similar embodiments to the embodiments shown in FIGS. 12A-12D are possible where the central angle of incidence of the polarizing beam-splitters $10a$, $10b$ and $10c$ are each slightly larger than 45° and also each substantially larger than 45°. The three polarizing beam-splitters $10a$, $10b$ and $10c$ can be identical and operate over a large band of wavelengths covering colors c1, c2 and c3, or they can be different, and only operate at the specific band of wavelengths such as c1, c2 and c3, respectively.

The wavelength selective polarization rotators 90, $90a1$, $90a2$, $90b1$, $90b2$, $90c1$, $90c2$ are the type of the wavelength selective polarization rotator 90 described in the preamble.

The operation of the fifth type of the embodiments in accordance with the present invention of the projection display systems is described as follows with the help of FIGS. 12A-12D.

In the first set of the polarizing image combiner $26a$, the polarized light beam $40a$ from the illumination system having color c1 in the second polarization state is directed to the optional clean-up polarizer $35a$ which removes residue light in the undesired polarization if required. The color light beam having color c1 consists of the two sub-colors c1L and c1R. The wavelength selective polarization rotator $90a1$ rotates the polarization state of one of the sub-colors from the second polarization state to the first polarization state and keeps the polarization state of the other sub-color light unchanged. For simplicity of explanation, it is assumed that the sub-color light c1L and c1R are in the first and second polarization states, respectively, after leaving the wavelength selective polarization rotator $90a1$. Thus, the polarizing beam-splitter $10a$ reflects the sub-color light c1L in the first polarization towards the micro-display panel 30L1 and transmits the sub-color light c1R in the second polarization towards the micro-display panel 30R1. The reflective micro-display panels 30L1 and 30R1 encode images onto the output light by rotating the polarization state of the incident light for the "on" pixels by 90°, thus, from the first polarization state to the second polarization state in the case of the micro-display panel 30L1; and from the second polarization state to the first polarization state in the case of the micro-display panel 30R1. Therefore, the image light from the two micro-display panels 30L1 and 30R1 are in the second and first polarization states, respectively. The polarizing beam-splitter $10a$ then combines the image light and directs the image light to the color combiner 16. In the case of the micro-display panels 30L1 and 30R1 are LCOS panels, the "off" pixels do not change the polarization state of incident light, thus the reflected "off" light from both the micro-display panels 30L1 and 30R1 are sent back by the polarizing beam-splitter $10a$ along the direction of the light source. In the case where the micro-display panels 30L1 and 30R1 are MEM panels, the "off" pixels reflect the incident light at different direction from the "on" pixel light, the reflected "off" light is absorbed by a light absorber and it does not reach to the color combiner 16. The optional wavelength selective polarization rotator $90a2$ can rotate the polarization state of the image light in color c1L from the micro-display panel 30L1 from the second polarization state to the first polarization state, but keeps the polarization state of the image light in color c1R from the micro-display panel 30R1 unchanged, still in the first polarization state. This polarization state rotation operation is advantageous in some embodiments when X-cube is used for combining color images as shown in FIGS. 12A and 12B, but is not necessary when the Philips prism is used for combining color images as shown in FIGS. 12C and 12D where the polarization rotator $90a2$ is not used.

Similarly, in the second set of the polarizing image combiner $26b$, the polarized light beam $40b$ from the illumination system having color c2 in the second polarization state is directed to the optional clean-up polarizer $35b$ which removes residue light in the undesired polarization if required. The color light beam having color c2 consists of the two sub-colors c2L and c2R. The wavelength selective polarization rotator $90b1$ rotates the polarization state of one of the sub-colors from the second polarization state to the first polarization state and keeps the polarization state of the other sub-color light unchanged. For simplicity of explanation, it is assumed that the sub-color light c2L and c2R are in the first and second polarization states, respectively, after leaving the wavelength selective polarization rotator $90b1$. Thus, the polarizing beam-splitter $10b$ reflects the sub-color light c2L in the first polarization towards the micro-display panel 30L2 and transmits the sub-color light c2R in the second polarization towards the micro-display panel 30R2. The reflective micro-display panels 30L2 and 30R2 encode images onto the output light by rotating the polarization state of the "on" pixel light by 90°, from the first polarization state to the second polarization state in the case of the micro-display panel 30L2; and from the second polarization state to the first polarization state in the case of the micro-display panel 30R2. Therefore, the image light from the two micro-display panels 30L2 and 30R2 are in the second and first polarization states, respectively. The polarizing beam-splitter $10b$ then combines the image light and directs the image light to the color combiner 16. In the case where the micro-display panels 30L2 and 30R2 are LCOS panels, the "off" pixels do not change the polarization state of incident light, thus the reflected "off" light from both the micro-display panels 30L2 and 30R2 are sent back by the polarizing beam-splitter $10b$ along the direction of the light source. In the case where the micro-display panels 30L2 and 30R2 are MEM panels, the "off" pixels reflect the incident light at different direction from the "on" pixel light, the reflected "off" light is absorbed by a light absorber and it does not reach to the color combiner 16. The optional wavelength selective polarization rotator $90b2$ can rotate the polarization state of the image light in color c2R from the micro-display panel 30R2 from the first polarization state to the second polarization state, but keeps the polarization state of the image light in color c2L from the micro-display panel 30L2 unchanged, still in the second polarization state. This polarization state rotation operation is advantageous in some embodiments when X-cube is used for combining color images as shown in FIGS. 12A and 12B, but is not necessary when the Philips prism is used for combining color images as shown in FIGS. 12C and 12D where the polarization rotator $90b2$ is not used.

Also, in the third set of the polarizing image combiner $26c$, the polarized light beam $40c$ from the illumination system having color c3 in the second polarization state is directed to the optional clean-up polarizer $35c$ which removes residue light in the undesired polarization if required. The color light beam having color c3 consists of the two sub-colors c3L and c3R. The wavelength selective polarization rotator 90$c1$ rotates the polarization state of one of the sub-colors from the second polarization state to the first polarization state and keeps the polarization state of the other sub-color light unchanged. For simplicity of explanation, it is assumed that the sub-color light c3L and c3R are in the first and second polarization states, respectively, after leaving the wavelength selective polarization rotator 90$c1$. Thus, the polarizing beam-splitter 10$c$ reflects the sub-color light c3L in the first polarization towards the micro-display panel 30L3 and transmits the sub-color light c3R in the second polarization towards the micro-display panel 30R3. The reflective micro-display panels 30L3 and 30R3 encode images onto the output light by rotating the polarization state of the "on" pixel light by 90°, thus, from the first polarization state to the second polarization state in the case of the micro-display panel 30L3; and from the second polarization state to the first polarization state in the case of the micro-display panel 30R3. Therefore, the image light from the two micro-display panels 30L3 and 30R3 are in the second and first polarization states, respectively. The polarizing beam-splitter 10$c$ then combines the image light and directs the image light to the color combiner 16. In the case where the micro-display panels 30L3 and 30R3 are LCOS panels, the "off" pixels do not change the polarization state of incident light, thus the reflected "off" light from both the micro-display panels 30L3 and 30R3 are sent back by the polarizing beam-splitter 10$c$ along the direction of the light source. In the case where the micro-display panels 30L3 and 30R3 are MEM panels, the "off" pixels reflect the incident light at different direction from the "on" pixel light, the reflected "off" light is absorbed by a light absorber and it does not reach to the color combiner 16. The optional wavelength selective polarization rotator 90$c2$ can rotate the polarization state of the image light in color c3L from the micro-display panel 30L3 from the second polarization state to the first polarization state, but keeps the polarization state of the image light in color c3R from the micro-display panel 30R3 unchanged, still in the first polarization state. This polarization state rotation operation is advantageous in some embodiments when X-cube is used for combining color images as shown in FIGS. 12A and 12B, but is not necessary when the Philips prism is used for combining color images as shown in FIGS. 12C and 12D where the polarization rotator 90$c2$ is not used.

The color combiner 16 combines the color image light from the polarizing image combiners 26$a$, 26$b$ and 26$c$. The combined image light then passes through the optional wavelength selective polarization rotator 90, the optional waveplate 70 which can convert linear polarized light into circular polarized light that can be advantageous in some 3D operation modes. The projection lens 50 then project the images onto the optional screen 60.

In the seventh type of the embodiments in accordance with the present invention of the projection display systems, the images from the micro-display panels 30L1, 30L2 and 30L3 are in colors c1L, c2L and c3L, they form the first set of primary color images. Therefore, the micro-display panels 30L1, 30L2 and 30L3 are called the first set of micro-display panels. Similarly, the image light from the micro-display panels 30R1, 30R2 and 30R3 is in colors c1R, c2R and c3R, respectively, they form the second set of primary color images. Therefore, the micro-display panels 30R1, 30R2 and 30R3 are called the second set of micro-display panels. The seventh type of the embodiments in accordance with the present invention can be configured to work in one or combinations of the following 2D and 3D switchable modes.

In the first 2D and 3D switchable mode of the seventh type of the embodiments described above, the 3D stereo display mode is realized by using two orthogonal polarizations for the left- and right eye-images. In this mode, a non-depolarizing projection screen is used. There are several approaches to get the two sets of the images from the two sets of the micro-display panels to have two different polarizations representing the left- and right-eye images. In the first approach, the optional wavelength selective polarization rotators 90$a$, 90$b$, 90$c$ and 90 are not used, thus the first set of the images from the first set of the micro-display panels 30L1, 30L2 and 30L3 are in the second polarization states having colors c1L, c2L and c3L, respectively, and the second set of the images from the second set of the micro-display panels 30R1, 30R2 and 30R3 are in the first polarization state having colors c1R, c2R and c3R, respectively. In the second approach, the optional wavelength selective polarization rotators 90$a$, 90$b$, 90$c$ and 90 are used together, for example, the wavelength selective polarization rotator 90 can be used to rotate the polarization states of the image light from the micro-display panels 30L1 and 30L3 in colors c1L and c3L, respectively, from the first polarization state to the second polarization state, the image light from the micro-display panel 30R2 in color c2R from the second polarization state to the first polarization state, but keep the polarization states of the image light from the micro-display panels 30R1, 30L2 and 30R3 unchanged, as a result, the first set of the images from the first set of the micro-display panels 30L1, 30L2 and 30L3 are in the second polarization states having colors c1L, c2L and c3L, respectively, and the second set of the images from the second set of the micro-display panels 30R1, 30R2 and 30R3 are in the first polarization state having colors c1R, c2R and c3R, respectively. If left-eye and right-eye image signals are fed to the first and second sets of micro-display panels, respectively, or vice versa, by wearing matching polarizing 3D glasses, viewers will be able to see 3D stereoscopic images on screen. In addition, if identical 2D image signals are fed to the two sets of microdisplay panels 30L1, 30L2, 30L3 and 30R1 and 30R2 and 30R3, normal 2D images are then displayed onscreen with the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of cheap polarizing 3D glasses.

In the second 2D and 3D switchable mode of the seventh type of the embodiments described above, the 3D stereo display mode is realized using two different sets of colors for the left- and right-eye images. In this mode, a non-depolarizing or an ordinary projection screen can be used. In addition, the optional wavelength selective polarization rotators 90$a2$, 90$b2$, 90$c2$ and 90 can be used as well. The first set of color images from the first set of micro-display panels 30L1, 30L2 and 30L3 consist of only colors c1L, c2L and c3L, and the second set of color images from the second set of microdisplay panels 30R1, 30R2 and 30R3 consists of only colors c1R, c2R and c3R. If left-eye and right-eye image signals are fed to the first and second sets of micro-display panels, respectively, or vice versa, by wearing matching color filter 3D glasses, viewers will be able to see 3D stereoscopic images on screen. The left- and right-eye color filter glasses match the spectrum of the corresponding image sets. The left- and right-eye glasses only allow the corresponding eye color images to pass and block the other eye color images. In addition, if identical 2D image signals are fed to the two sets of microdisplay panels 30L1, 30L2, 30L3 and 30R1 and 30R2 and 30R3, normal 2D images are then displayed onscreen with the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of ordinary screens and relatively cheap plastic projection lens which may depolarize light, in addition, low cross-talk between the left-eye and right-eye images can be obtained due to the high contrast ratios of color filter glasses.

In the third 2D and 3D switchable mode of the seventh type of the embodiments described above, the 3D stereo display mode is realized by using two orthogonal polarizations and two different sets of colors for the left- and right eye-images. In this case, a non-depolarizing projection screen or an ordinary screen is used. There are several approaches to get the two sets of the images from the two sets of the micro-display panels to have two different polarizations representing the left- and right-eye images. In the first approach, the optional wavelength selective panels, 90a, 90b, 90c and 90 are not used, thus the first set of the images from the first set of the micro-display panels 30L1, 30L2 and 30L3 are in the second polarization states having colors c1L, c2L and c3L, respectively, and the second set of the images from the second set of the micro-display panels 30R1, 30R2 and 30R3 are in the first polarization state having colors c1R, c2R and c3R, respectively. In the second approach, the optional wavelength selective polarization rotators 90a, 90b, 90c and 90 are used together, for example, the wavelength selective polarization rotator 90 can be used to rotate the polarization states of the image light from the micro-display panels 30L1 and 30L3 in colors c1L and c3L, respectively, from the first polarization state to the second polarization state, the image light from the micro-display panel 30R2 in color c2R from the second polarization state to the first polarization state, but keep the polarization states of the image light from the micro-display panels 30R1, 30L2 and 30R3 unchanged, as a result, the first set of the images from the first set of the micro-display panels 30L1, 30L2 and 30L3 are in the second polarization states having colors c1L, c2L and c3L, respectively, and the second set of the images from the second set of the micro-display panels 30R1, 30R2 and 30R3 are in the first polarization state having colors c1R, c2R and c3R, respectively. If left-eye and right-eye image signals are fed to the first and second sets of micro-display panels, respectively, or vice versa, and by wearing matching polarizing 3D glasses in the case where a non-depolarizing screen is used or color filter glasses in the case where a non-depolarizing screen or an ordinary screen is used, viewers will be able to see 3D stereoscopic images on screen. In addition, if identical 2D image signals are fed to the two sets of microdisplay panels 30L1, 30L2, 30L3 and 30R1, 30R2 and 30R3, normal 2D images are then displayed onscreen with the first and second sets of the primary colors combined. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because of its flexibility in the use of screens or 3D glasses.

In the fourth 2D and 3D switchable mode of the seventh type of the embodiments described above, the 3D display mode is realized by displaying the left- and right-eye images time sequentially at a fast speed. In this mode, a non-depolarizing projection screen or an ordinary screen can be used. In addition, the optional wavelength selective polarization rotators 90a2, 90b2, 90c2 and 90 can be used. The first set of color images from the first set of micro-display panels 30L1, 30L2 and 30L3 consist of colors c1L and c2L and c3L, and the second set of color images from the second set of microdisplay panels 30R1, 30R2 and 30R3 consists of only colors c1R, c2R and c3R. If left-eye signals are fed both to the first and second sets of micro-display panels, and then the right-eye signals are fed both to the first and second sets of micro-display panels, the switching between the left- and right-eye images are fast enough (for example, 60 frames per second), by wearing synchronized LCD shutter glasses, viewers will be able to see 3D stereoscopic images on screen. In addition, if identical 2D image signals are fed to the two sets of micro-display panels 30L1, 30L2, 30L3, and 30R1, 30R2 and 30R3, normal 2D images are then displayed onscreen. Both 2D and 3D operation modes are highly light efficient. The 2D and 3D images consist of both the first and second set of the primary colors. The 2D and 3D modes can be switched electronically and no hardware needs to be added or removed during switching. This operation mode is advantageous in some applications because it allows the use of any type of screen.

There are variations of the seventh type of the embodiments, in which the illumination systems 8 or 8a, 8b and 8c, and the image combining devices 26a, 26b and 26c can be arranged to allow the three polarized color beams 40a, 40b and 40c to be directed perpendicular to the plane of the drawing paper surface, instead of within the plane of the drawing paper surface. These variations are useful when there is space limitation. The operation of the variations is similar to the above seventh type of the embodiments with some minor modifications.

Eighth Type of Embodiments

Figure 13A:
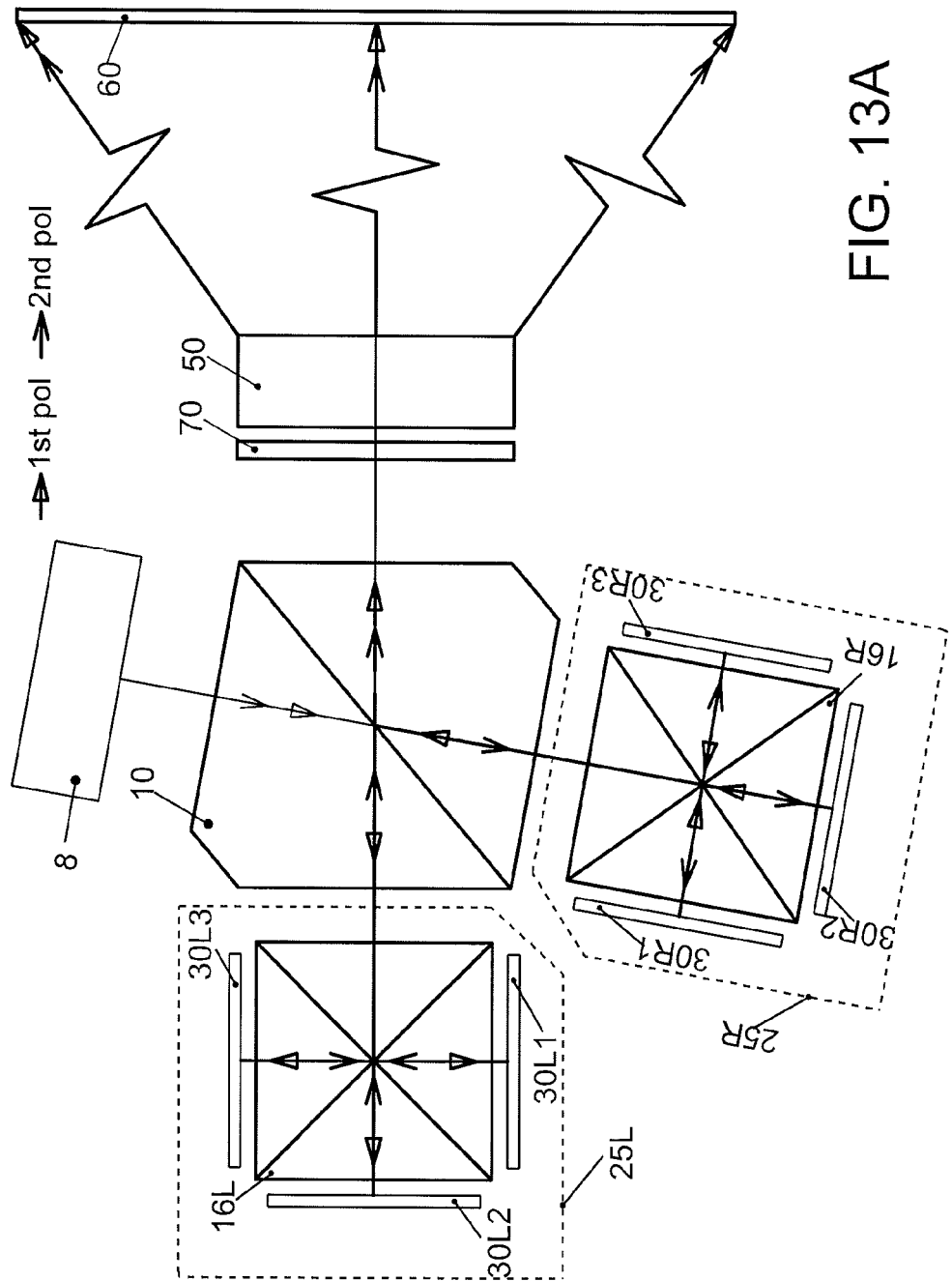
FIG. 13A is a schematic view of one of the eighth type embodiments of the projection display systems in accordance with the present invention having an illumination system, six reflective LCOS or MEM panels, two X-cubes, a polarizing beam-splitter with central angle of incidence greater than 45° and a single projection lens.
Figure 13B:
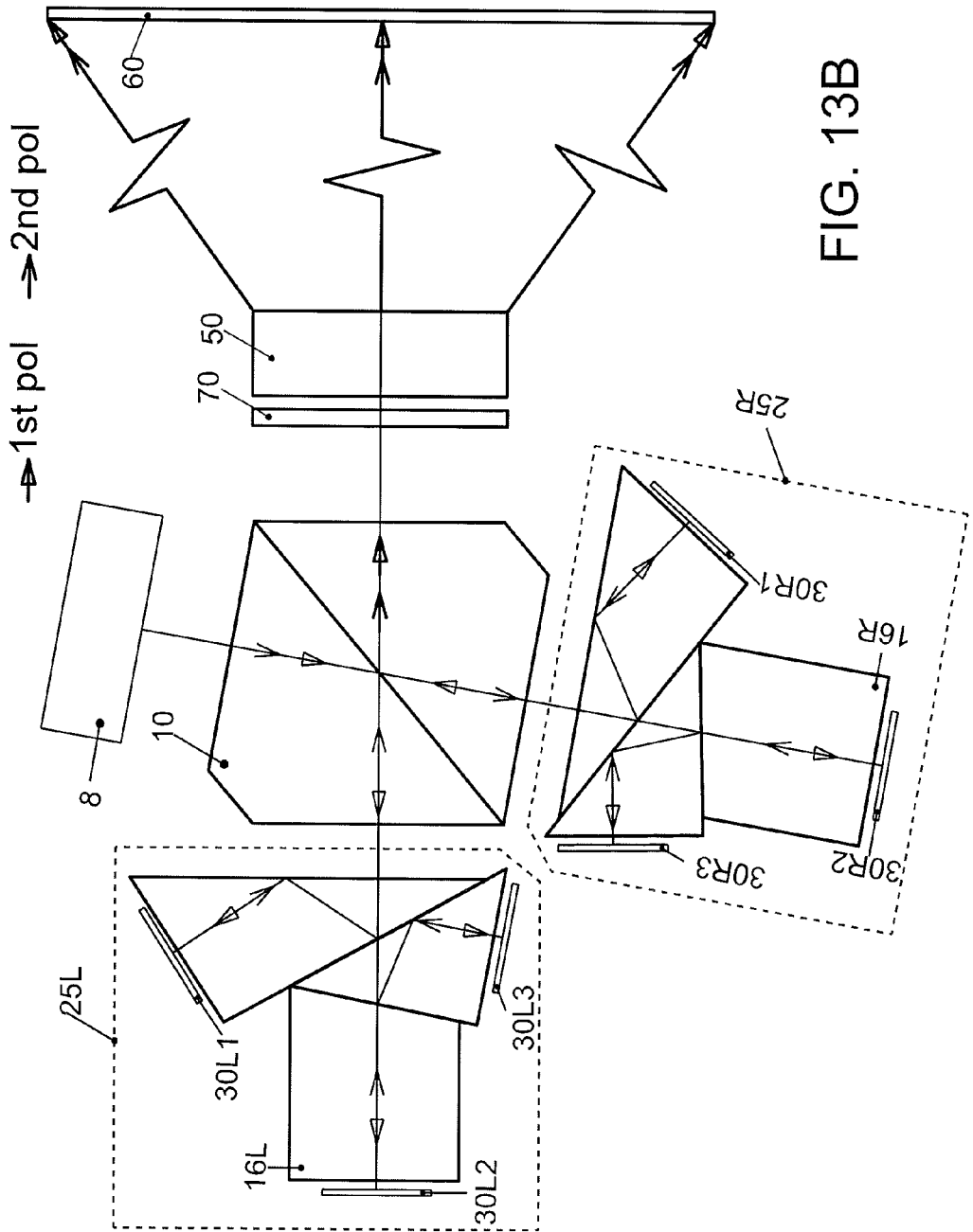
FIG. 13B is a schematic view of one of the eighth type embodiments of the projection display systems in accordance with the present invention having an illumination system, six reflective LCOS or MEM panels, two Philips prisms, a polarizing beam-splitter with central angle of incidence greater than 45° and a single projection lens.

The eighth type of the embodiments of the projection display systems in accordance with the present invention as shown in FIGS. 13A and 13B, comprises of an illumination system 8 for providing un-polarized light; a polarizing beam-splitter 10; two imaging arms 25L and 25R; an optional waveplate 70; a projection lens 50 and an optional projection screen 60. The polarizing beam-splitter 10 reflects light in a first polarization and transmits light in a second polarization, or vice versa, the first and second polarizations are orthogonal to each other. The imaging arm 25L comprises of a color separating and combining prism 16L and a first set of three micro-display panels 30L1, 30L2 and 30L3. Similarly, the imaging arm 25R also comprises of a color separating and combining prism 16R and a second set of three micro-display panels 30R1, 30R2 and 30R3.

In the embodiment shown in FIG. 13A, the color separating and combining prisms 16L and 16R are X-cubes which transmit c2 color and reflects c1 and c3 colors; in the embodiments shown in FIG. 13B, the color separating and combining prisms 16L and 16R are Philips prisms which also transmit c2 color and reflects c1 and c3 colors.

The reflective micro-displays panels 30L1, 30R1, 30L2, 30R2, 30L3, 30R3 are described in the preamble as reflective micro-display panel 30. They can be LCOS panels with additional waveplates for compensating geometry depolarization. They can also be MEM panels with additional waveplates for rotating the polarization state of incident light by 90°; in addition, optional waveplates can be used as parts of the panels to compensate geometry depolarization.

The polarizing beam-splitter 10 is selected from the type of the polarizing beam-splitter 10 described in the preamble. The first and second polarizations can be s- and p-polarized, or vice versa. In the embodiments shown in FIGS. 13A and 13B, the central angle of incidence of light at the beam-splitting surface of the polarizing beam-splitter 10 is slightly larger than 45°; similar embodiments are possible where the central angle of incidence is about 45°, and also where the central angle of incidence is substantially larger than 45°.

The operation of the fifth type of the embodiments in accordance with the present invention of the projection display systems is described as follows with the help of FIGS. 13A and 13B.

The un-polarized light from the illumination system 8 consists of colors c1, c2 and c3, such as red, green or blue or any suitable color combinations. The un-polarized light having the first and second polarizations is first split into two beams having the first and second polarization states, respectively, by the polarizing beam-splitter 10; the reflected light in the first polarization state towards the image arm 25L and the transmitted light in the second polarization state towards the image arm 25R.

In the image arm 25L, the color separating and combining prism 16L separates the incident polarized light in the first polarization into three polarized color beams having colors c1, c2 and c3, respectively. The three polarized color beams are incident onto the first set of micro-display panels 30L1, 30L2 and 30L3. The first set of the reflective micro-display panels 30L1, 30L2 and 30L3 encode images onto the output light by rotating the polarization state of the "on" pixel light by 90° relative to the incident light, thus, from the first polarization state to the second polarization state. Subsequently, the three output image lights are combined by the color separating and combining prism 16L and form the first set of color images in the second polarization state. The first set of color image light then passes through the polarizing beam-splitter 10, the optional waveplate 70 and the projection lens 50, finally, the images are then projected onto the optional screen 60. For "off" pixel light from the first set of micro-display panels 30L1, 30L2 and 30L3, if the micro-display panels are LCOS panels, the polarization state of the "off" pixel light is unchanged, thus it is sent back by the polarizing beam-splitter 10 along the direction of the light source; if the micro-display panels 30L1, 30L2 and 30L3 are MEM panels, the "off" pixel light is reflected by the panels at different directions from the "on" pixel light and does not enter the projection lens 50 and is absorbed by a light absorber.

Similarly, in the image arm 25R, the color separating and combining prism 16R separates the incident polarized light in the second polarization into three polarized color beams having colors c1, c2 and c3, respectively. The three polarized color beams are incident onto the second set of micro-display panels 30R1, 30R2 and 30R3. The second set of the reflective micro-display panel 30R1, 30R2 and 30R3 encode images onto the output light by rotating the polarization state of the "on" pixel light by 90° relative to the incident light, thus, from the second polarization state to the first polarization state. Subsequently, the three output image lights are combined by the color separating and combining prism 16R and form the second set of color images in the first polarization state. The second set of color image light is then reflected by the polarizing beam-splitter 10, and passes through the optional waveplate 70 and the projection lens 50, and finally, the images are then projected onto the optional screen 60. For "off" pixel light from the second set of micro-display panels 30R1, 30R2 and 30R3, if the micro-display panels are LCOS panels, the polarization state of the "off" pixel light is unchanged, thus it is sent back by the polarizing beam-splitter 10 along the direction of the light source; if the micro-display panels 30R1, 30R2 and 30R3 are MEM panels, the "off" pixel light is reflected by the panels at different directions from the "on" pixel light and does not enter the projection lens 50 and is absorbed by a light absorber.

The eighth type of the embodiments in accordance with the present invention can be configured to work in one or combinations of the following 2D and 3D switchable modes:

In the first 2D and 3D switchable mode of the eighth type of the embodiments described above, the 3D stereo display mode is realized by using two orthogonal polarizations for the left- and right eye-images. In this mode, a non-depolarizing projection screen is used. The first set of color images from the first set of micro-display panels 30L1, 30L2 and 30L3 is in the second polarization, and the second set of color images from the second set of microdisplay panels 30R1, 30R2 and 30R3 are in the first polarization. If left-eye and right-eye image signals are fed to the first and second sets of microdisplay panels, respectively, or vice versa, by wearing matching polarizing 3D glasses, viewers will be able to see 3D stereoscopic images on screen. In addition, if identical 2D image signals are fed to the two sets of microdisplay panels 30L1, 30L2 and 30L3, and 30R1, 30R2 and 30R3, normal 2D images are then displayed onscreen. Both 2D and 3D operation modes are highly light efficient. In switching from 2D to 3D mode, no light is wasted, the available light is equally shared between the left-and right-eye images. The 2D and 3D modes can be switched electronically and no hardware needs to be added or removed during switching. This operation mode is advantageous in some applications because it allows the use of cheap polarizing 3D glasses.

In the second 2D and 3D switchable mode of the eighth type of the embodiments described above, the 3D display mode is realized by displaying the left- and right-eye images time sequentially at a fast speed. In this mode, a non-depolarizing projection screen or an ordinary screen can be used. The first set of color images from the first set of micro-display panels 30L1, 30L2 and 30L3 is in the second polarization, and the second set of color images from the second set of micro-display panels 30R1, 30R2 and 30R3 are in the first polarization. If left-eye signals are fed both to the first and second sets of micro-display panels, and then the right-eye signals are fed both to the first and second sets of micro-display panels, the switching between the left- and right-eye images are fast enough (for example, 60 frames per second), by wearing synchronized LCD shutter glasses, viewers will be able to see 3D stereoscopic images on screen. In addition, if identical 2D image signals are fed to the two sets of microdisplay panels 30L1, 30L2 and 30L3, and 30R1, 30R2 and 30R3, normal 2D images are then displayed onscreen. The 2D and 3D modes can be switched electronically and no hardware needs to be added or removed during switching. This operation mode is advantageous in some applications because it allows the use of any type of screen.

I claim:

1. A stereoscopic 3D projection apparatus wherein left and right eye stereoscopic images are created using different sets of primary colors, comprising:

a polarizing beam splitter having first and second input ports and an output port;

at least one polarized light source providing a source, separate from said polarizing beam splitter, of a first light beam having a first state of polarization and containing a first set of primary colors and a source, separate from said polarizing beam splitter, of a second light beam having a second state of polarization and containing a second set of primary colors, wherein said first and second sets of primary colors are different and said first state of polarization and said second state of polarization are different and orthogonal to each other;

a first light modulator arrangement for spatially modulating the polarization state of the first light beam to encode a first image thereon in said first set of primary colors, wherein in the encoded beam "on" pixels all have the same polarization state and "off" pixels all have the same polarization state regardless of color;

a second light modulator arrangement for spatially modulating the polarization state of the second light beam to encode a second image thereon in said second set of primary colors, wherein in the encoded beam "on" pixels all have the same polarization state and "off" pixels all have the same polarization state regardless of color;

said first and second input ports of said polarizing beam splitter being configured to admit said first and second encoded light beams, and wherein light of one polarization state incident on the first port is transmitted to the output port and light of another polarization state incident on the second port is reflected to said output port so that said transmitted and reflected light is combined into a common output beam at said output port; and projection optics for projecting said first and second images contained in said common output beam onto a display screen whereby said first and second images are viewable as a stereoscopic image with color filter glasses.

2. The projection apparatus of claim 1, wherein said first and second light modulators operate in a time sequential mode to encode said images onto each of the primary colors of said respective sets of primary colors with said respective polarizations.

3. The projection apparatus of claim 1, wherein said light modulator arrangements operate in a transmission mode, and said first and second beams are transmitted through said light modulator arrangements into said respective input ports to become encoded with said respective first and second images.

4. The projection apparatus of claim 3, wherein at least one polarized light source comprises a common polarized light source providing a third light beam, and a beam splitter is provided to split said third light beam into separate beams containing first and second sets of primary colors.

5. The projection apparatus of claim 4, wherein said third beam is polarized in one state of polarization, and one of said separate beams is passed though a waveplate to change the state of polarization thereof, whereby said separate beams provide said first and second light beams containing said first and second sets of primary colors.

6. The projection apparatus of claim 1, wherein said light modulator arrangements operate in the reflection mode, said polarizing beam splitter has a third input port, said at least one polarized light source comprises a common polarized light source producing a third light beam that is launched into said polarizing beam splitter through said third input port, and wherein said third light beam comprising said first set of primary colors in said first polarization and said second set of primary colors in said second polarization and is split by said polarizing beam splitter into said first and second beams which are reflected by said first and second light modulator arrangements.

7. The projection apparatus of claim 6, wherein said common light source produces said two sets of primary colors that cover different wavelengths in the light spectrum.

8. The projection apparatus of claim 6, further comprising a color selective polarization rotator for producing coincident beams containing said first and second sets of primary colors having said first and second polarizations, and wherein said first and second coincident beams are split by said polarizing beam splitter into said first and second light beams.

9. The projection apparatus of claim 8, further comprising a redirector between one of said first and second ports and the corresponding light modulator arrangement for changing the direction of the light, and whereby said redirector is selected from the group consisting of a mirror and a prism, and when said redirector is a prism, a matching prism is located in front of the other light modulator wherein said light modulators are reflective MEM devices.

10. The projection apparatus of claim 3, further comprising first and second subsystems providing respectively said first and second light beams prior to said polarizing beam-splitter, said first and second subsystems each comprising a respective light source, and wherein the light sources of the respective beams produce light beams containing said first and second sets of primary colors.

11. The projection apparatus of claim 10, wherein each said subsystem further comprises dichroic filters for separating color light beams, and redirectors for directing said separated color light beams through said light modulator arrangement.

12. The projection apparatus of claim 11, wherein said light modulator arrangement comprises a plurality of individual light modulators, one for each color beam.

13. The projection apparatus of claim 12, wherein each subsystem comprises an X-cube for recombining said color beams after being encoded by said light modulator arrangement to form said respective first and second images.

14. The projection apparatus of claim 13, further comprising color selective polarization rotators upstream of the respective first and second input ports of the polarizing beam splitter to selectively rotate the plane of polarization of the light emerging from each subsystem so that the color components of the light emerging from each subsystem have the same state of polarization, and the sets of color components emerging from the respective subsystems have different states of polarization.

15. The projection apparatus of claim 10, further comprising a common light source producing light of a given polarization state of said first or second polarization, and a beamsplitter for directing light from said common light source into said respective subsystems, said beamsplitter producing said light beams containing said first and second sets of primary colors.

16. A 3D stereoscopic projection apparatus wherein left and right eye stereoscopic images are created using different sets of primary colors, comprising a plurality of subsystems, each subsystem comprising:

a polarizing beam splitter having first and second input ports and an output port;

at least one polarized light source providing a source, separate from said beam splitter, of a first light beam having a first state of polarization and containing a first primary sub-color and a source, separate from said beam splitter, of a second light beam having a second state of polarization and containing a second primary sub-color, wherein said first and second primary sub-colors are of different wavelength but similar in color appearance and said first state of polarization and said second state of polarization are different and orthogonal to each other;

a first light modulator arrangement for spatially modulating the polarization state of the first light beam to encode a first image thereon;

a second light modulator arrangement for spatially modulating the polarization state of the second light beam to encode a second image thereon; and said first and second input ports of said polarizing beam splitter being configured to admit said first and second encoded light beams, and wherein light of one polarization state incident on the first input port is transmitted to the output port and light of another polarization state incident on the second port is reflected to said output port so that said transmitted and reflected light is combined into a common output beam at said output port; and wherein the source of light for each said subsystem is of a different color, and said projection apparatus further comprises:

a color combiner for combining the output beam of each said subsystem into a common output beam; and projection optics for projecting said common output beam onto a display screen whereby said first and second images are viewable as stereoscopic image with color filter glasses.

17. The projection apparatus of claim 16, wherein said color combiner is selected from the group consisting of X-cubes and Philip prisms.

18. The projection apparatus of claim 16, wherein said subsystems have a common light source with a first or second polarization, and color-selective beam splitters are provided to produce separate source beams having respective colors for each of said subsystems.

19. The projection apparatus of claim 16, wherein each subsystem comprises a source of a composite polarized light beam comprising a pair of sub-colors, and wherein the sub-colors from each pair form separate sets of primary colors, a color-selective polarization rotator for rotating the state of polarization of one of said sub-colors, a third input port of said polarizing beam splitter for admitting said sub-colors in different states of polarization, and said polarizing beam splitter splits said composite light beam into said first and second light beams emerging through said first and second input ports of said polarizing beam splitter, and said light modulator arrangements operate in the reflection mode, reflecting said respective first and second light beams back into said polarizing beam splitter through said first and second input ports.

20. The projection apparatus of claim 19, wherein said sets of primary colors cover different wavelengths in the light spectrum, and each set of primary colors being capable of recreating a full color image.

21. The projection apparatus of claim 20, further comprising a common polarized light source containing said sets of primary colors, and a color-sensitive beam splitter-redirector arrangement for splitting a beam from said polarized light source into the polarized light beam of each said subsystem.

22. The projection apparatus of claim 20, wherein each of said sub-systems further comprising a color-selective polarization rotator downstream of the output port of each said polarizing beam splitter.

23. The projection apparatus of claim 22, wherein said first and second light modulator arrangements in each subsystem produce a pair of left- and right-eye stereo images in different colors and in different states of polarization, said stereo images being viewable on a non-depolarizing screen with polarizing glasses and on an ordinary screen with color filter glasses.

* * * * *